US012776591B2

(12) United States Patent
Clavijo et al.

(10) Patent No.: US 12,776,591 B2
(45) Date of Patent: Oct. 27, 2026

(54) OPEN WAVEGUIDE ANTENNA AND SYSTEM HAVING THE SAME

(71) Applicant: ROGERS CORPORATION, Chandler, AZ (US)

(72) Inventors: Sergio Clavijo, Phoenix, AZ (US); John Sanford, Escondido, CA (US); Karl Edward Sprentall, Medford, MA (US); Dirk Baars, Phoenix, AZ (US); Jared Kenneth Spink, Scottsdale, AZ (US); Pramod Srinivas Bhat, Chandler, AZ (US)

(73) Assignee: ROGERS CORPORATION, Chandler, AZ (US)

( * ) Notice: Subject to any disclaimer, the term of this patent is extended or adjusted under 35 U.S.C. 154(b) by 93 days.

(21) Appl. No.: 18/910,124

(22) Filed: Oct. 9, 2024

(65) Prior Publication Data

US 2025/0070482 A1 Feb. 27, 2025

Related U.S. Application Data

(62) Division of application No. 17/943,450, filed on Sep. 13, 2022, now Pat. No. 12,148,997.

(Continued)

(51) Int. Cl.
*H01Q 13/22* (2006.01)
*H01Q 1/22* (2006.01)

(Continued)

(52) U.S. Cl.
CPC ......... *H01Q 21/068* (2013.01); *H01Q 1/2283* (2013.01); *H01Q 1/3233* (2013.01); *H01Q 13/22* (2013.01)

(58) Field of Classification Search
CPC ....... H01Q 13/20; H01Q 13/22; H01Q 21/068
See application file for complete search history.

(56) References Cited

U.S. PATENT DOCUMENTS 3,015,100 A 12/1961 Walter
4,618,865 A 10/1986 Lamensdorf et al.

(Continued)

OTHER PUBLICATIONS

Simons "Chapter 10 Coplanar Waveguide Transitions" In: "Coplanar waveguide circuits, components, and systems" (Jan. 2001) John Wiley & Sons, Inc., pp. 288-345.

(Continued)

*Primary Examiner* — Daniel Munoz
(74) *Attorney, Agent, or Firm* — CANTOR COLBURN LLP

(57) ABSTRACT

A waveguide antenna system, includes: an electromagnetic, EM, transition portion having a transition region having a signal feed interface and an open waveguide section, the EM transition portion configured to couple EM energy from the signal feed interface to a guided waveguide mode of EM energy to the open waveguide section via the transition region; and a leaky waveguide antenna portion configured and disposed to radiate electromagnetic energy received from the open waveguide section; wherein the EM transition portion is electromagnetically coupled to the leaky waveguide antenna portion, the EM transition portion being configured to support a transfer of electromagnetic energy from a signal feed structure to the leaky waveguide antenna portion.

14 Claims, 55 Drawing Sheets

Related U.S. Application Data

(60) Provisional application No. 63/286,839, filed on Dec. 7, 2021, provisional application No. 63/244,018, filed on Sep. 14, 2021.

(51) Int. Cl.
*H01Q 1/32* (2006.01)
*H01Q 21/06* (2006.01)

(56) References Cited

U.S. PATENT DOCUMENTS

| | | | | |
|---|---|---|---|---|
| 5,943,023 | A | 8/1999 | Sanford | |
| 6,043,787 | A * | 3/2000 | Sanford | H01Q 13/02 343/786 |
| 10,903,582 | B2 * | 1/2021 | Peng | H01Q 21/0068 |
| 2005/0146477 | A1 | 7/2005 | Kelly et al. | |
| 2006/0132374 | A1 | 6/2006 | Wang | |
| 2020/0343612 | A1 | 10/2020 | Shi | |
| 2021/0028549 | A1 | 1/2021 | Doyle et al. | |
| 2023/0085413 | A1 | 3/2023 | Clavijo et al. | |

OTHER PUBLICATIONS

JP OA for the corresponding Japanese Application No. 2024-516509; Date of Mailing: Mar. 17, 2026; 12 pages.

* cited by examiner

OPEN WAVEGUIDE ANTENNA AND SYSTEM HAVING THE SAME

CROSS REFERENCE TO RELATED APPLICATIONS

This application claims the benefit of U.S. Provisional Application Ser. No. 63/244,018, filed Sep. 14, 2021, and claims the benefit of U.S. Provisional Application Ser. No. 63/286,839, filed Dec. 7, 2021, both of which are incorporated herein by reference in their entireties.

BACKGROUND

The present disclosure relates generally to an open waveguide antenna, and more particularly to an open waveguide antenna system.

Previous generations of mmWave systems have been constructed utilizing several special purpose MMIC (Monolithic Microwave Integrated Circuit) devices, which typically includes, a transmitter integrated circuit, a receiver integrated circuit, and a local oscillator circuit to synchronize these systems together. An example of this construction is a Continental ARS-4A long range radar sensor, an example of which can be found at http://img009.hc360.cn/k2/M0A/BF/43/wKhQxVq53tuEEmCQAAAAACS5hks768.pdf. By virtue of the distributed nature of the transmitter and receiver MMIC in these systems, the distance between radiators and MMICs could be reduced, resulting in a tolerable insertion loss despite the electrically large antenna aperture produced by the radar. Recently, CMOS MMIC devices have become available, which combine TX and RX functionality into a single chip. From a cost perspective, these systems are advantageous, reducing not only die cost, but assembly and manufacturing costs for the radar manufacturer. This has the effect of centralizing the MMIC, and increasing the transmission line distances between antenna and MMIC. Additionally, this centralization reduces the complexity of RF signal routing between devices.

The two trends of lengthening transmission lines and reducing complexity of routed signals have made alternative methods of connecting the antenna to the MMIC more attractive. A common RF interconnection method is to use an etched trace on a printed circuit board. This transmission line structure is typically a microstrip (signal layer separated from ground by a dielectric) or co-planar waveguide (microstrip with grounding structures next to the trace on the signal layer). This type of transmission line will exhibit an insertion loss of around 1 dB per inch at 79 GHz when produced on a “best in class” PCB material, and 2 dB per inch when produced on a typical PCB material.

As MMICs have become increasingly integrated, and the number of routed RF transmission lines on the PCB has decreased, an old transmission structure becomes more applicable. Waveguides had been explored theoretically in the 1890s, and practically adopted since the 1940s. At 79 GHz a rectangular waveguide will exhibit an insertion loss of around 0.25 dB per inch. Applied to a 3 inch long transmission line, in practice a 79 Ghz system would lose 50% of its power in a microstrip line built on a best in class laminate, 75% of its power on a typical PCB, but only about 16% of its power in waveguide. In a radar system, this difference in loss is seen both from the MMIC Transmitter block to the antenna, and from the antenna to the MMIC receiver block. Thus, the “two way” loss is double that of the above loss figures. This makes the reduction in loss even more attractive to the designers of radar systems.

For designers employing waveguide feed networks in mmWave radar or communications systems, there are three additional considerations that dictate system architecture and performance. The first is how to transfer the power from the MMIC to the waveguide (the transition), the second is how to transfer power from the waveguide into free space (the antenna), and finally for most systems, cost is a critical consideration in addition to the system performance.

Two primary methods have been described for the transfer of power between the MMIC and waveguide.

The first transition approach is the utilization of a transition from the package to a printed circuit board. This transition often involves several sub transitions. First power is transferred from the semiconductor die to a fan-out or re-distribution layer in the device package, and then the power is transferred from the re-distribution layer to a printed circuit board, typically through a ground signal ground (GSG) configuration implemented in a ball grid array. The signal/power is then routed through a grounded coplanar waveguide structure, transitioned to a microstrip structure, which then excites a radiator which is used to launch into a waveguide. This approach has the advantage of utilizing well established technology but also has the following disadvantages: (i) the requirement to produce controlled impedance structures on the host printed circuit board; (ii) the cost and supply chain complexity of utilizing a low loss PCB material on the host printed circuit board; and (iii) multiple sets of transition losses: MMIC to RDL, RDL to BGA, BGA to PCB, PCB to Waveguide, where these transition losses partially negate the benefit of utilizing a waveguide, particularly for short transmission line lengths.

The second transition approach that has been proposed is to launch directly from the package into the waveguide. An example description of this approach is provided on page 30 of the following document: https://www.ipcei-me.eu/wp-content/uploads/2020/11/4-Pack-Trends-for-mm-wave-Radar-Infineon-Maciej-Wojnowski.pdf. This approach negates the following disadvantages of the first approach: (i) the requirement to produce controlled impedance structures on the host printed circuit board; (ii) the cost and supply chain complexity of utilizing a low loss PCB material on the host printed circuit board; and (iii) a net reduction in Transition losses, namely BGA to PCB. The reduction of PCB cost and supply chain complexity is expected to be attractive to the developers of mmWave radar and communication systems.

In the design of mmWave radar or communication systems, antenna selection and design is a significant consideration. In radar systems, there are two primary-use cases: first, radar systems intended to operate over a long range; and second, radar systems required to operate over a shorter range, but with a wider coverage area. In the field of automotive sensors, these are typically referred to as Long Range Radars, which are utilized for functions like adaptive cruise control, and Corner Radars or Short Range Radars, which are used for functions like blind spot detection, lane change assist, or parking assistance.

A long range radar is typically expected to cover the lanes ahead of or behind the vehicle. Corner radars are used to supplement the coverage of the long range radar, with the aim of providing 360 degree coverage around the vehicle. It is also desirable to have redundancy in coverage, so a corner radar will typically try to cover a 120 degree azimuth field of view, while a long range radar may typically cover a 60-90 degree azimuth field of view. For reference, the elevation plane is typically oriented in the direction of the height of the vehicle, while the azimuth plane is perpendicular to the elevation plane. In the case where vehicles are expected to operate at a higher level of autonomy, for example SAE level 3 or level 4 autonomy, the vehicle may also employ mid range radars, which operate with an azimuth coverage between that of a corner radar and a long range radar. For vehicle total cost of ownership, it may also be desirable to produce corner radars which have enhanced range, thereby eliminating the need for the mid-range radar.

The antenna architecture is typically first selected for its field of view, and then for its bandwidth, though the type of antenna will also depend on the type of antenna feed. In printed circuit board based feed networks, the antenna is also typically formed on the PCB, and in waveguide structures, it is desirable to use a similar construction method to the way a waveguide is produced. Polarization is another consideration that designers use when selecting an antenna. Finally, side-lobe levels are significant in many radar and communication systems. For long range radar antennas, where the field of view (related to the azimuth half power beamwidth of the antenna) is smaller, a series-fed microstrip patch antenna is typically used. Parallel series-fed lines can be used to further reduce the field of view, increasing the gain of the antenna and subsequently the range of the radar system.

To achieve a wide field of view, either comb-line (sometimes referred to as side fed patch) or slot antennas are typically employed.

A substrate integrated waveguide (SIW) plus a slot antenna can also be employed with a printed circuit board feed network. A slot antenna will typically exhibit some of the widest field of views, but brings additional PCB fabrication complexity.

In waveguide-based feed networks, two fundamental antenna types are most often employed. For high gain applications, a waveguide fed horn will typically be used. This can provide both a high gain, and wide bandwidth (>15% fractional bandwidth). For wide field of view applications, a slot antenna is often used. The slot antenna formed in an air metal waveguide will exhibit bandwidth larger than its counterpart from a substrate integrated waveguide, but is smaller than desired (eg. 2 GHz at 79 GHz, when 4-5 GHz is desirable).

Bandwidth requirements are highly dependent on the application. For a Doppler effect radar system, two primary benefits can be derived from a wide bandwidth (eg. 4-5 Ghz): (i) a wide fractional bandwidth can be utilized to provide a high distance resolution (proportional to the speed of light divided by bandwidth), ie a 4 GHz bandwidth will provide 3.5 cm range resolution. This is most desirable when the radar is detecting an object that is close to the sensor. For example, whether a car is 1 meter or 1.05 meters away is a critical piece of information when performing parking assistance, but whether a car is 200 meters away or 200.05 meters away is not important when performing adaptive cruise control; and, (ii) a wide fractional bandwidth can also be used to provide the ability for a radar system to employ a smaller instantaneous bandwidth (ie 500 Mhz), but switch frequencies within that wider fractional bandwidth to avoid interference. As corner, or short range, radars provide a wider angular coverage, they are more susceptible to interference from an adjacent vehicle. Additionally, as the number of vehicles on the road employing corner radar is constantly increasing, the interference issue is constantly getting worse.

In summary, within the field of waveguide fed antennas applied to radar, a narrow field of view antenna can be produced with a large bandwidth, but the large bandwidth is not an important feature due to the application of the radar. In the application where a large (wide) bandwidth would be important, the narrow field of view of the horn antenna is not desirable. Therefore, in the field of waveguide fed radar antennas, there exists a performance gap which provides value to the market, but currently cannot be achieved cost effectively, the combination of a wide fractional bandwidth (eg. 4-5 Ghz at 79 Ghz) and a wide field of view (for example a half power azimuth beam width of 120 degrees).

Rogers Corporation has developed a technology to address the antenna issue, a specific embodiment of a dielectric resonator antenna. The dielectric resonator antenna invented by Rogers Corporation offers a combination of wide field of view and broad bandwidth that is desirable for corner radar applications. However, to date it has been utilized with a PCB based substrate integrated waveguide feed network, which has the above mentioned issues with insertion loss between the MMIC and the antenna. While it is certainly possible, and in some cases desirable, to combine the dielectric resonator antenna with a waveguide feed network, the added cost of both systems may preclude its use from some high volume applications. So, there exists an unmet need for a waveguide fed wide field of view, wide band width antenna which can be acquired at a competitive price with respect to the waveguide plus slot antenna alone.

Though the above background focuses on automotive radar, scenarios can be envisioned where these requirements would translate to non-automotive applications, for example, a set of radars utilized in a factory automation scenario (at 60 Ghz) could also experience a similar set of challenges.

Regarding waveguide fabrication, there are two primary approaches being utilized to produce waveguide plus antenna(s) for high volume radar applications today: (i) multilayer molded traditional waveguides; and (ii) bandgap waveguides. Evaluating the relative benefits of both systems is largely an exercise in comparing complexity and therefore cost.

Traditional waveguides are formed by molding multiple layers of plastic, metallizing those layers, and bonding the layers together with an electrically conductive adhesive, or in another way to provide a consistent and reliable electrical connection from one layer to another. An example of such a stack up can be found in U.S. Pat. Publ. 2020/0313304. The complexity in this system is derived from the number of metalized plastic layers (up to 7 for complex structures, 2-3 for simple structures), and the need to bond the layers together with a robust electrical connection between layers.

A bandgap waveguide utilizes a specialized structure to form the interior walls of the waveguide. This is referred to as an "electromagnetic bandgap structure", or "artificial magnetic conductor". The principal benefit of this structure is that a robust electrical connection between the top and bottom of the waveguide is not required in this structure, reducing the complexity of the waveguide assembly. This benefit has shown to have market value.

However, this structure could introduce some additional complexity into the mold tolerance requirements, and in the typical construction requires four metal layers. The complexity of fabrication grows in a non-linear fashion as the number of layers in the structure increases, and the cost of materials also increases with the number of metal layers. Therefore, there exists an unserved need in the market place for a solution with: (i) a feed network which can be excited from an antenna-in-package, or similar MMIC package, excitation; (ii) provision for a low insertion loss, for example 0.25-0.5 dB/in at 79 Ghz; (iii) capability of being fabricated with a minimum of cost and complexity; (iv) potential to offer an antenna solution which provides a wide field of view and large bandwidth, for example, 120 degrees half power beamwidth, and a 5 Ghz bandwidth with a center frequency of 78.5 GHz; (v) alternatively, a system which offers the first three points with reduced cost and complexity and provides a high gain, with an optionally broad bandwidth, which would be desirable for other applications such as long range radar; (vi) a feed network which can be excited from a PCB, or form an antenna-in-package, or similar MMIC, excitation; (vii) low insertion loss, for example 0.25-0.5 dB/in at 79 GHz; (viii) capability of being fabricated with only one metalized layer, and potentially one dielectric layer (optionally metallized plastic only, dielectric in preferred embodiment); (ix) an antenna that offers a solution which provides a wide field of view and large bandwidth, for example, 120 degrees half power beamwidth, and a 5 Ghz bandwidth with a center frequency of 78.5 GHz; and, (x) alternatively, a system that can offer high gain and optionally large bandwidth.

Some dielectric resonator antennas may be tailored to desired patterns over large bandwidth, but have substantial losses in gain when incorporated in antenna systems due to loss in the required feed structures and transitions. Some molded traditional waveguide antennas may be incorporated into antenna systems that minimize losses in the feed and transition for high gain, but these offer a smaller useable bandwidth (i.e. <3 GHz).

While existing antennas may be suitable for their intended purpose, there remains a need for a pattern tailorable, high gain, antenna system (with minimal feed and transition losses) that can be tailored for high gain with controlled shape of antenna pattern versus angle over a large bandwidth (i.e. >4 GHz) up to millimeter wave frequency bands.

The following publications may be considered as useful background art: U.S. Pat. Nos. 3,015,100; 6,043,787; and, U.S. Pat. Publ. 2020/0313304.

BRIEF SUMMARY

An embodiment includes an open waveguide antenna as defined by the appended independent claims. Further advantageous modifications of the open waveguide antenna are defined by the appended dependent claims.

An embodiment includes a waveguide antenna system, having: an electromagnetic, EM, transition portion having a transition region having a signal feed interface and an open waveguide section, the EM transition portion configured to couple EM energy from the signal feed interface to a guided waveguide mode of EM energy to the open waveguide section via the transition region; and a leaky waveguide antenna portion configured and disposed to radiate electromagnetic energy received from the open waveguide section; wherein the EM transition portion is electromagnetically coupled to the leaky waveguide antenna portion, the EM transition portion being configured to support a transfer of electromagnetic energy from a signal feed structure to the leaky waveguide antenna portion.

An embodiment includes a waveguide antenna system, having: a plurality of the waveguide antenna system as disclosed herein above configured for antenna-on-package applications.

An embodiment includes a waveguide antenna system, having: a plurality of the waveguide antenna system as disclosed herein above configured for patch-on-printed-circuit-board applications.

An embodiment includes an open waveguide signal feed system, having: a printed circuit board having a signal feed and a signal feed output; an open waveguide having a signal feed input port; a transition region disposed between and in signal communication with the signal feed output and the signal feed input port; wherein the signal feed comprises a microstrip, a coplanar waveguide, or a stripline; wherein the signal feed output comprises a patch or a probe.

An embodiment includes an open waveguide section, having: at least one bend in a trough waveguide, the at least one bend being in a direction of propagation of an electromagnetic wave in the trough waveguide, the trough waveguide having a trough having first and second opposing sidewalls, a septum disposed therebetween, a first base disposed between the first sidewall and the septum, and a second base disposed between the septum and the second sidewall, wherein all surfaces internal to the trough of at least the first sidewall, the second sidewall, the septum, the first base, and the second base, are electrically conductive; and an electromagnetic radiation suppressor strategically configured and disposed to suppress undesirable electromagnetic radiation that may emanate from the at least one bend in the absence of such electromagnetic radiation suppressor.

An embodiment includes an open waveguide antenna, having: a trough having first and second opposing sidewalls, a septum disposed therebetween, a first base disposed between the first sidewall and the septum, and a second base disposed between the septum and the second sidewall; wherein one or more of surfaces internal to the trough of at least the first sidewall, the second sidewall, the septum, the first base, and the second base, are electrically conductive; wherein the first base has a first sequence of undulations that are longitudinally disposed along a length of the trough; wherein the first sequence of undulations alternatively and sequentially follow a first curved path and a second curved path, the second curved path being asymmetric to the first curved path; wherein the second base has a second sequence of undulations that are longitudinally disposed along the length of the trough; wherein the second sequence of undulations alternatively and sequentially follow the second curved path and the first curved path; wherein the first curved path and the second curved path alternate from one side of the septum to the other side of the septum along the length of the trough.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered or illustrated alike in the accompanying Figures.

Figure 1B:
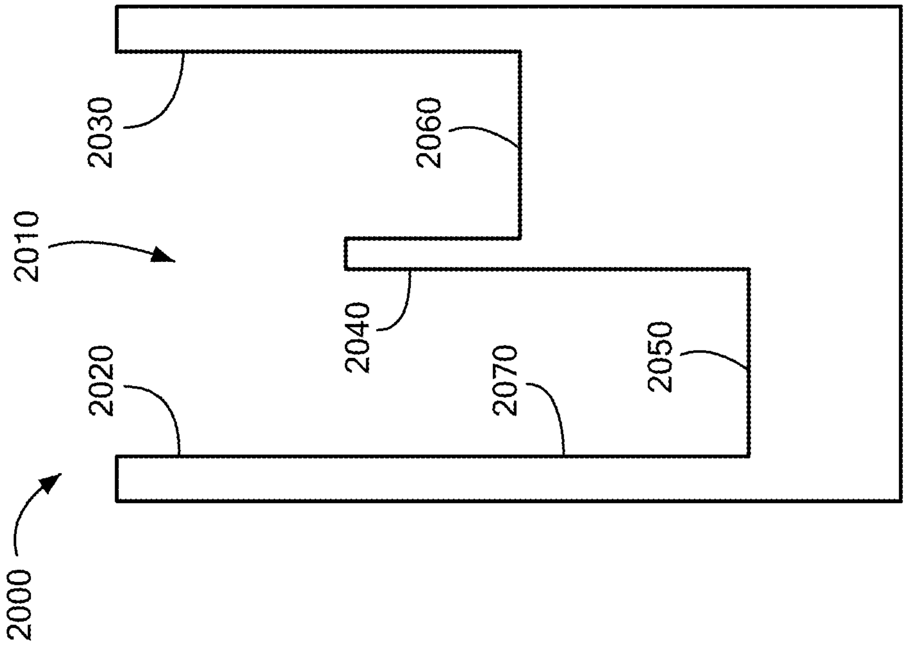
FIGS. 1A, 1B, and 1C, respectively depict; a cross section end view of an example trough waveguide, a cross section end view of an example trough waveguide antenna, and a transparent cross section side view of the example trough waveguide antenna of FIG. 1B, in accordance with an embodiment.

One skilled in the art will understand that the drawings, further described herein below, are for illustration purposes only. It will be appreciated that for simplicity and clarity of illustration, elements shown in the figures have not necessarily been drawn to scale. For example, the dimensions or scale of some of the elements may be exaggerated relative to other elements for clarity. Further, where considered appropriate, reference numerals may be repeated among the figures to indicate corresponding or analogous elements, or analogous elements may not be repetitively enumerated in all figures where it will be appreciated and understood that such enumeration where absent is inherently disclosed.

DETAILED DESCRIPTION

As used herein, the phrase "embodiment" means "embodiment disclosed and/or illustrated herein", which may not necessarily encompass a specific embodiment of an invention in accordance with the appended claims, but nonetheless is provided herein as being useful for a complete understanding of an invention in accordance with the appended claims.

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Additionally, common features may be commonly illustrated in the various figures but may not be specifically enumerated in all figures for simplicity, but would be recognized by one skilled in the art as being an explicitly disclosed feature even though it may not be enumerated in a particular figure. Accordingly, the following example embodiments are set forth without any loss of generality to, and without imposing limitations upon, the claimed invention disclosed herein.

An embodiment, as shown and described by the various figures and accompanying text, provides an antenna system that can be adapted from a patch feed (i.e. on an antenna-in-package or circuit board structure) through a transition into an open waveguide antenna structure with minimal losses throughout the structure, allowing for tailorable, high gain antenna systems that can be used over a large bandwidth (i.e. >4 GHz) and up to millimeter wave frequencies.

For simplicity of integration, and illustration herein, the feed structure used may be a patch, but other feed structures such as probes (e.g., a coax line, a plated hole in a printed circuit board, or the like), loops, or apertures, are also possible, and contemplated herein. The patch structure may be ideally part of an antenna chip in package to minimize distances, allow for miniaturization, and reduce cost, by avoiding an additional RF layer. However, patches may also be formed on any type of substrate layer, including a buildup layer, or a layer in a printed circuit board.

The open waveguide antenna can be specifically designed to allow for desired antenna radiation patterns. For example, a wide field of view can be obtained, as is often useful in a corner radar application for automotive safety systems. In other cases, it may be desired to achieve maximum gain over a narrower field of view, such as in forward facing long distance automotive radar applications. The variables of the open waveguide antenna that can be adjusted to achieve the desired pattern may include size of the open radiating aperture, angle of radiating aperture, baseplane undulations, or dielectric discontinuities creating radiation. Furthermore, a dielectric cover or lens structure may be added over the metal open waveguide to further optimize the pattern. Where multiple antenna channels are needed, such as in the aforementioned corner radar application, multiple open waveguide antenna structures can be combined into one piece for ease of manufacture, with individual open waveguide antenna elements being separated by a distance 0.5 to 10 times the wavelength of the signals being processed.

Various features can be included in the open waveguide antenna design that facilitate manufacturing while maintaining the same excellent RF performance. These include "shelling" of the part to reduce material consumption and warpage, recesses and positive features to avoid sticking during metallization by electroplating, or other processes, as well as draft angles and convenient parting line locations to facilitate part removal.

Manufacturing methods for creating the single channel or multiple channel open waveguide antenna structure may be accomplished through a variety of methods, including metal die casting, injection molding of dielectric followed by surface metallization, and extrusion followed by singulating and surface metallization.

The transition from the feed structure to the open waveguide antenna is designed such that losses are minimized. Suitable transition structures for achieving this purpose include ridge waveguide with patch feed, rectangular waveguide with patch feed, open waveguide with patch feed or probe feed, coplanar waveguides and others.

Another embodiment, as shown and described by the various figures and accompanying text, provides a trough waveguide antenna (TWGA) useful, in one example, for automotive radar applications. The TWGA combines the function of a trough waveguide with the function of an electromagnetic (EM) radiator (antenna). Trough waveguides have symmetry between the left and right sides of their dividing septum, and operate primarily as a guided-mode EM transmission element. Comparatively, trough waveguide antennas have asymmetry between the left and right sides of their dividing septum, and necessarily have at least a partial open top, which enables them to operate as both an EM transmission element and as an EM radiating element. As used herein, the phrase "open top" means a top, cover, or ceiling, of the TWGA that is open to, or allows passage of, EM radiation energy. As such, an open top does not preclude the presence of a dielectric cover over the TWGA. A monolithic microwave integrated circuit (MMIC) may be used to bring a signal to an input port of the TWGA.

While reference is made herein to a trough waveguide antenna, it will be appreciated that a more generic term for describing the same is to refer to an open waveguide antenna, where the aforementioned trough waveguide antenna is a specific subset of an open waveguide antenna structure.

As used herein, the term monolithic means a structure integrally formed from a single material composition.

While embodiments illustrated and described herein depict an example TWGA having a particular three-dimensional (3D) geometry, it will be appreciated that this geometry is merely one example of many geometries that may be employed in the design of a TWGA depending on the desired performance characteristics (operating frequency, bandwidth, gain, return loss, radiation pattern, etc.) of the TWGA. It will also be appreciated that the disclosed geometry may be modified without departing from a scope of the invention. As such, the disclosure herein applies to any TWGA design that falls within the ambit of the appended claims, and any 3D geometry that falls within the ambit of the disclosure herein, and is suitable for a purpose disclosed herein, is contemplated and considered to be complementary to the particular embodiments disclosed herein.

Reference is now made to FIGS. 1A-10B, which in general relate to an example open waveguide antenna, and in particular to an example open trough waveguide antenna.

Figure 1A:
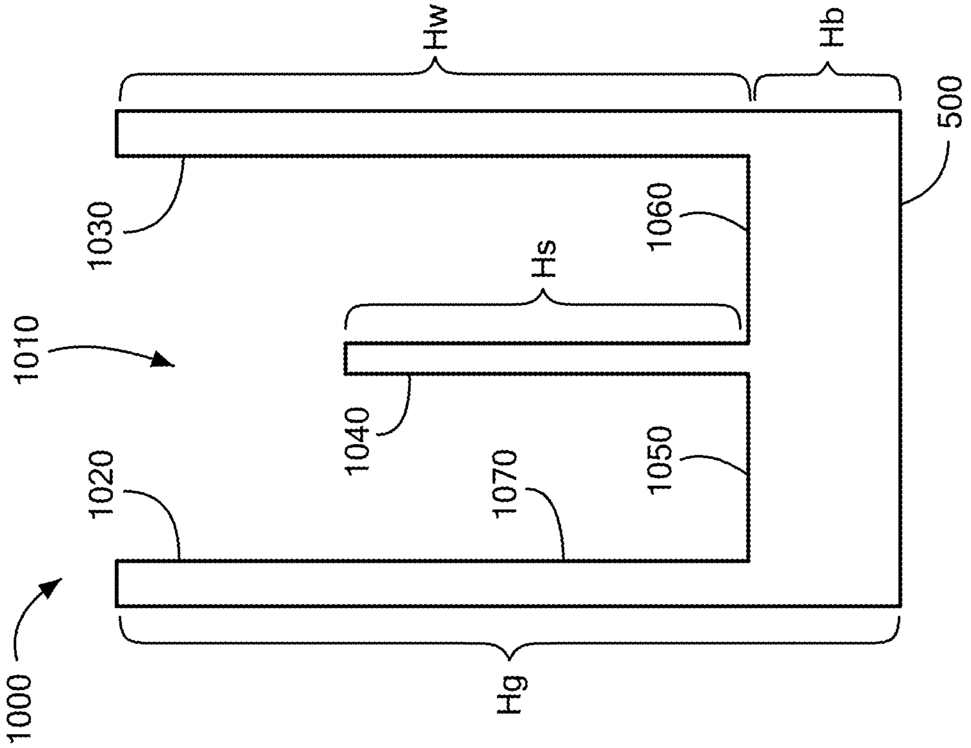
Figure 1C:
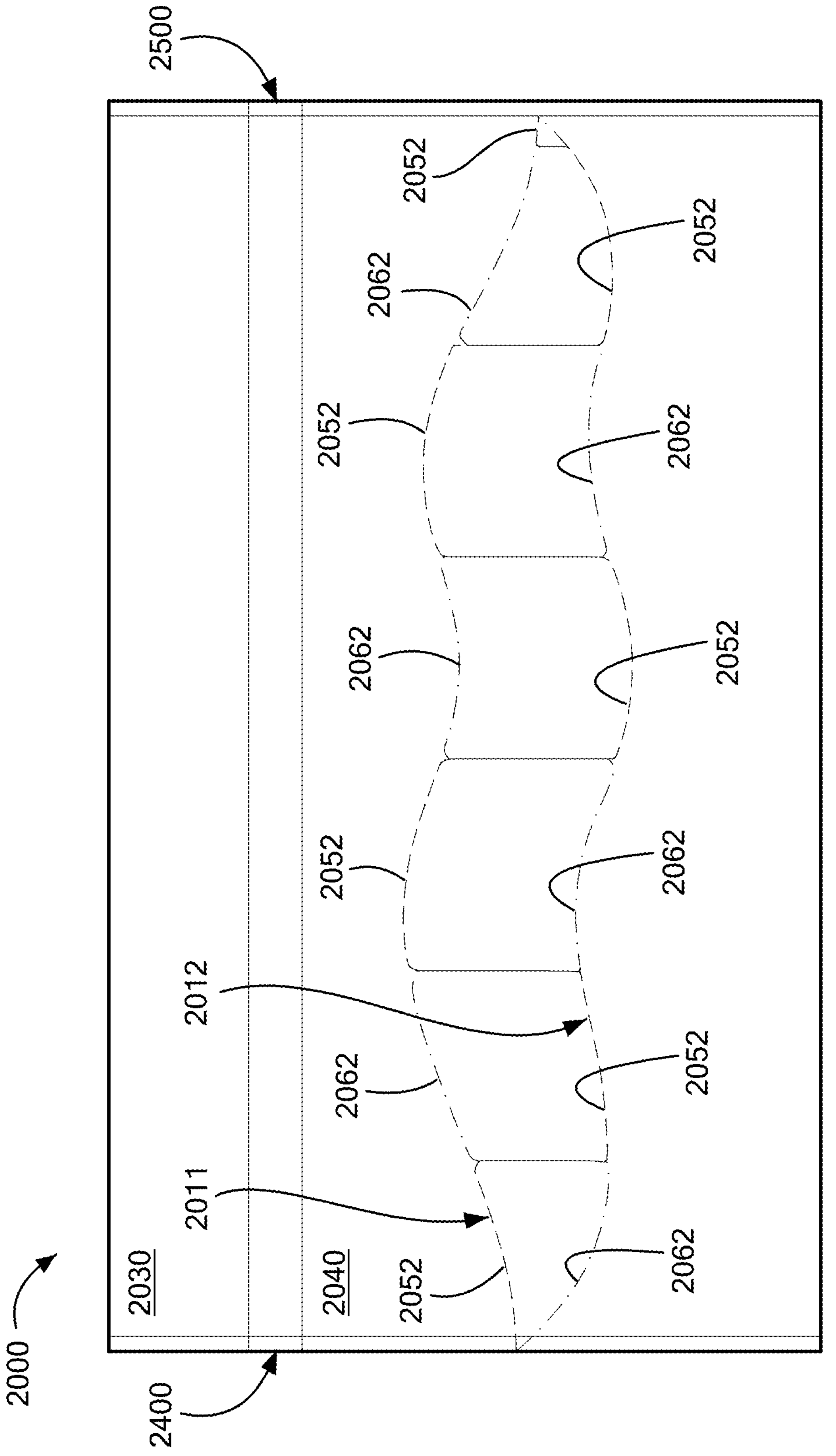

FIGS. 1A, 1B, and 1C, respectively depict; a cross section end view of an example open trough waveguide (TWG) 1000, a cross section end view of an example open trough waveguide antenna (TWGA) 2000, and a transparent cross section side view of the example TWGA 2000 of FIG. 1B. As can be seen the TWGA 2000 has similar structural characteristics as compared to the TWG 1000, but with structural differences directed to the asymmetry of the left and right bases on either side of the septum, and the undulations present in the left and right bases of the TWGA 2000.

In an embodiment, the TWG 1000 (more generally herein referred to as an open waveguide) has: a trough 1010 having first and second opposing sidewalls 1020, 1030, a septum 1040 disposed between the first and second sidewalls 1020, 1030, a first base 1050 disposed between the first sidewall 1020 and the septum 1040, and a second base 1060 disposed between the septum 1040 and the second sidewall 1030; wherein all surfaces 1070 internal to the trough 1010 of at least the first sidewall 1020, the second sidewall 1030, the septum 1040, the first base 1050, and the second base 1060, are electrically conductive. In an embodiment, the septum 1040 extends upward from the first base 1050 and the second base 1060, as observed from the perspective of FIG. 1A. In an embodiment, the TWG 1000 has a monolithic 3D dielectric construct with the aforementioned electrically conductive surfaces 1070 disposed thereon. In an embodiment, all surfaces internal to the trough 1010 of the first base 1050 and the second base 1060 are electrically conductive. In an embodiment, the electrically conductive surfaces 1070 are deposition coated with an electrically conductive material. As used herein, and with respect to at least the electrically conductive surfaces of the TWG 1000 (also herein referred to as an open waveguide section), the phrase "electrically conductive" means electrically conductive at operating frequencies of interest, which may include a surface that is non-electrically conductive in a DC sense, but has enough electrical conductivity in an AC sense at the operating frequencies of interest for a purpose disclosed herein.

In an embodiment, the TWGA 2000 (more generally herein referred to as an open waveguide antenna) has: a trough 2010 having first and second opposing sidewalls 2020, 2030, a septum 2040 disposed between the first and second sidewalls 2020, 2030, a first base 2050 disposed between the first sidewall 2020 and the septum 2040, and a second base 2060 disposed between the septum 2040 and the second sidewall 2030; wherein all surfaces 2070 internal to the trough 2010 of at least the first sidewall 2020, the second sidewall 2030, the septum 2040, the first base 2050, and the second base 2060, are electrically conductive; wherein the first base 2050 has a first sequence of undulations 2052 that are longitudinally disposed along a length of the trough 2010; wherein the first sequence of undulations 2052 alternatively (high-to-low in FIG. 1C) and sequentially (left-to-right in FIG. 1C) to follow a first curved path 2011 then a second curved path 2012 that alternates high-to-low (left-to-right in FIG. 1C), the second curved path 2012 being asymmetric to the first curved path 2011; wherein the second base 2060 has a second sequence of undulations 2062 that are longitudinally disposed along the length of the trough 2010; wherein the second sequence of undulations 2062 alternatively and sequentially follow the second curved path 2012 then the first curved path 2011 that alternates low-to-high (left-to-right in FIG. 1C); and, wherein the first curved path 2011 and the second curved path 2012 alternate from one side of the septum 2040 to the other side of the septum 2040 along the length of the trough 2010 (best seen with reference to FIG. 2), but in the transparent side view of FIG. 1C appear as continuous splines from left-to-right. In an embodiment, the first sequence of undulations 2052 and the second sequence of undulations 2062 are asymmetric about the septum 2040.

In an embodiment, the septum 2040 extends upward from the first base 2050 and the second base 2060, as observed from the perspective of FIGS. 1B-1C. In an embodiment, the TWGA 2000 has a monolithic 3D dielectric construct with the aforementioned electrically conductive surfaces formed or disposed thereon. In an embodiment, the electrically conductive surfaces 2070 are deposition coated with an electrically conductive material.

In an embodiment, at least a portion of the first sequence of undulations 2052 includes a dielectric material and/or at least a portion of the second sequence of undulations 2062 includes a dielectric material. By strategically placing dielectric material as part of the undulations 2052, 2062, controlled radiation from the leaky TWGA 2000 is further achievable.

As depicted in FIG. 1A, the TWG 1000 has an overall waveguide height Hg relative to an outside base surface 500, a base height Hb relative to the outside base surface 500, a sidewall height Hw relative to Hb, and a septum height Hs relative to the first or second base 1050, 1060. In an embodiment, Hg is equal to the sum of Hb and Hw. In an embodiment, Hs is less than Hw.

Figure 2:
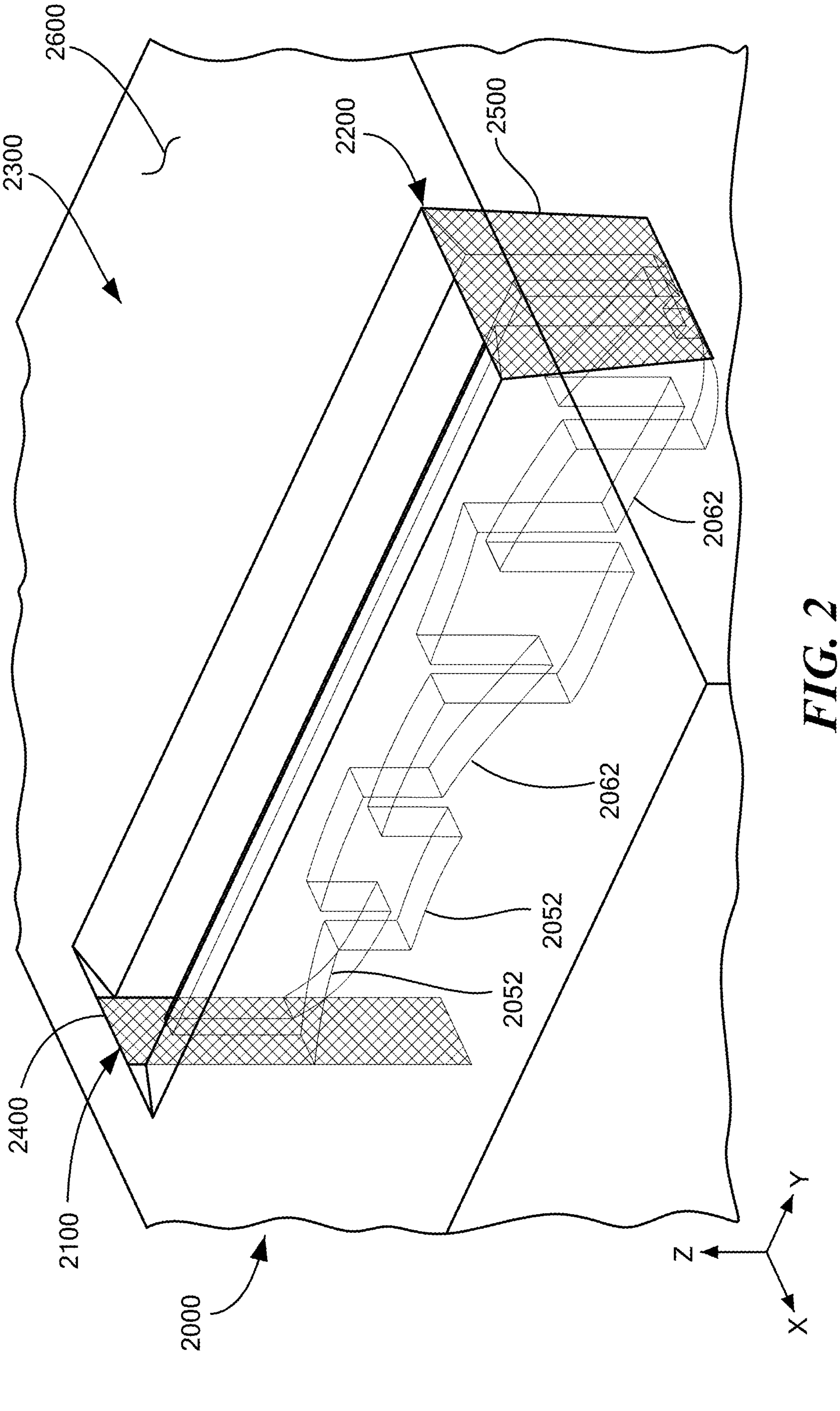
FIG. 2 depicts a rotated isometric transparent view of the example trough waveguide antenna of FIGS. 1B and 1C, in accordance with an embodiment.

FIG. 2 depicts a rotated isometric transparent view of the example TWGA 2000 of FIGS. 1B and 1C. In an embodiment, the TWGA 2000 is fed by a trough waveguide mode via a signal port 2400 on one end 2100 (a first end) of the TWGA 2000. The opposing second end 2200 (a second end) of the TWGA 2000 has an electrically conductive short circuit 2500 that is electrically connected with an electrically conductive surface 2600 disposed at an upper end 2300 of the TWGA 2000. In FIG. 2, visible ones of the first and second sequences of undulations 2052, 2062 are depicted for comparison with the same in FIG. 1C.

From the foregoing discussion and description of FIGS. 1B-1C and 2, it will be appreciated that embodiments disclosed herein include the following, which may or may not be variations on the construct of the TWGA 2000 depicted in FIGS. 1B-1C and 2. In an embodiment, exposed surfaces of the first sidewall 2020, the second sidewall 2030, and the septum 2040, are not parallel to each other along the length of the trough 2010, which when combined with an appropriate draft angle provides for manufacturing of the TWGA 2000 via a molding technique. In an embodiment, the septum 2040 has a height that is less than a height of either the first sidewall 2020 or the second sidewall 2030, as depicted in at least FIGS. 1B and 1C. In an embodiment, the septum 2040 is centrally disposed between the first sidewall 2020 and the second sidewall 2030, however, it will be appreciated from other embodiments disclosed herein that variations on this construct are possible. In an embodiment, the first sequence of undulations 2052 alternate in elevation between the first curved path 2011 and the second curved path 2012, from left-to-right as observed in FIG. 1C, along the length of the trough 2010, and the second sequence of undulations 2062 alternate in elevation between the second curved path 2012 and the first curved path 2011, from left-to-right as observed in FIG. 1C, along the length of the trough 2010. In an embodiment, and as observed in the side view of FIG. 1C, the first curved path 2011 of the trough 2010 is a first waveform (also herein referred to by reference numeral 2011) with alternating peaks and valleys, the first waveform 2011 being a composite of a first smooth waveform multiplied by a first square wave. Similarly, the second curved path 2012 of the trough 2010 is a second waveform (also herein referred to by reference numeral 2012) with alternating peaks and valleys, the second waveform 2012 being a composite of a second smooth waveform multiplied by a second square wave. In an embodiment, the second smooth waveform and the first smooth waveform have different elevations in both peaks and valleys at all points between and inboard of the first and second ends 2100, 2200 of the trough 2010.

Figure 3:
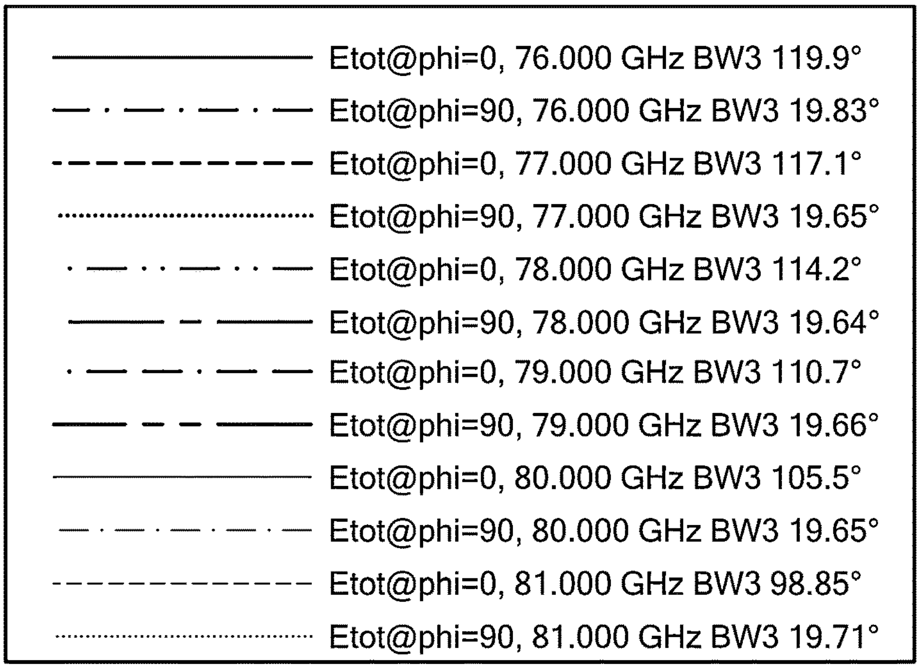
FIG. 3 depicts analytically modelled performance characteristics of the example trough waveguide antenna of FIG. 2, in accordance with an embodiment.
Figure 3:
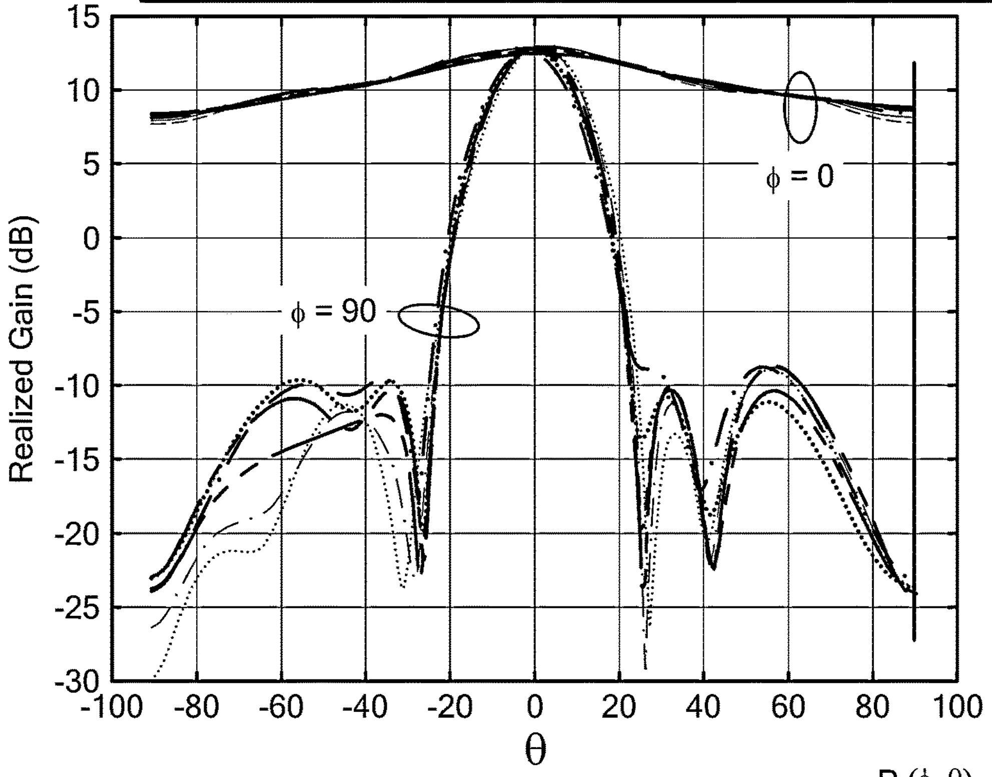
Figure 3:
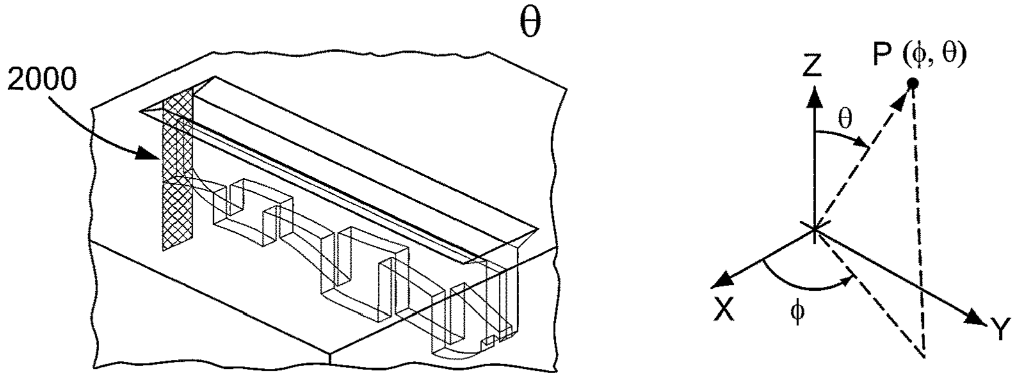

FIG. 3 depicts analytically modelled performance characteristics of the example TWGA 2000 of FIGS. 1B, 1C, and 2. The analytical data depicted was taken at a point P, sufficiently far away from the TWGA 2000 to be considered to be in the far field. As depicted, an embodiment of the TWGA 2000 is configured to perform with a boresight (θ=0) realized gain of about 12 dBi, and with particular sidelobe gain peaks and radiation patterns in the azimuth (ϕ=0) and elevation (ϕ=90) planes (compare to FIG. 6).

Figure 4A:
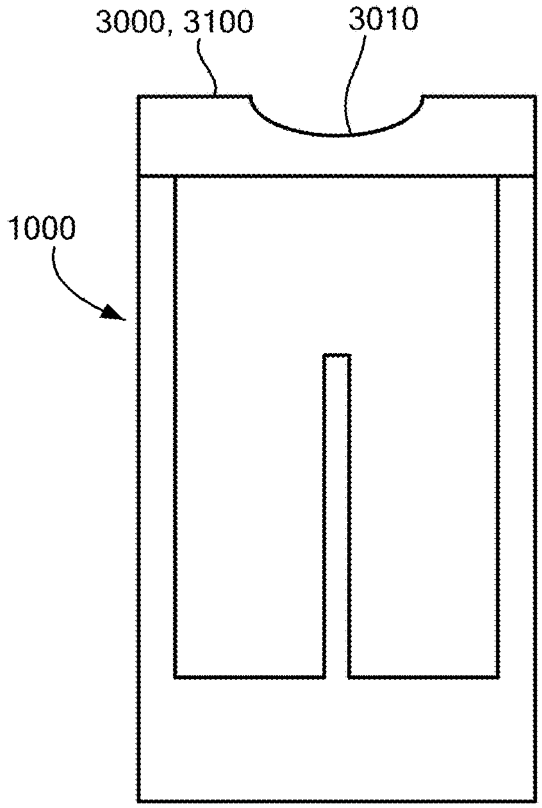
FIGS. 4A, 4B, and 4C, depict views similar to those of FIGS. 1A, 1B, and 1C, respectively, but with a dielectric cover on top of the example trough waveguide and the example trough waveguide antenna, in accordance with an embodiment.
Figure 4B:
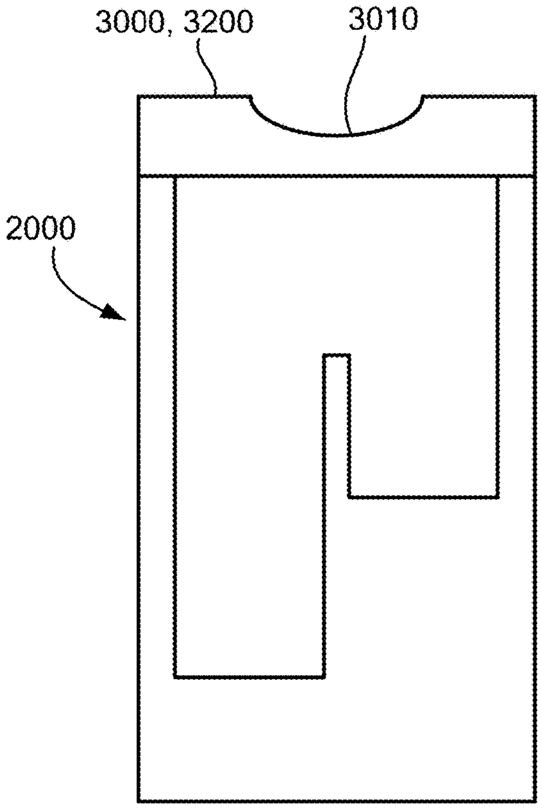
Figure 4C:
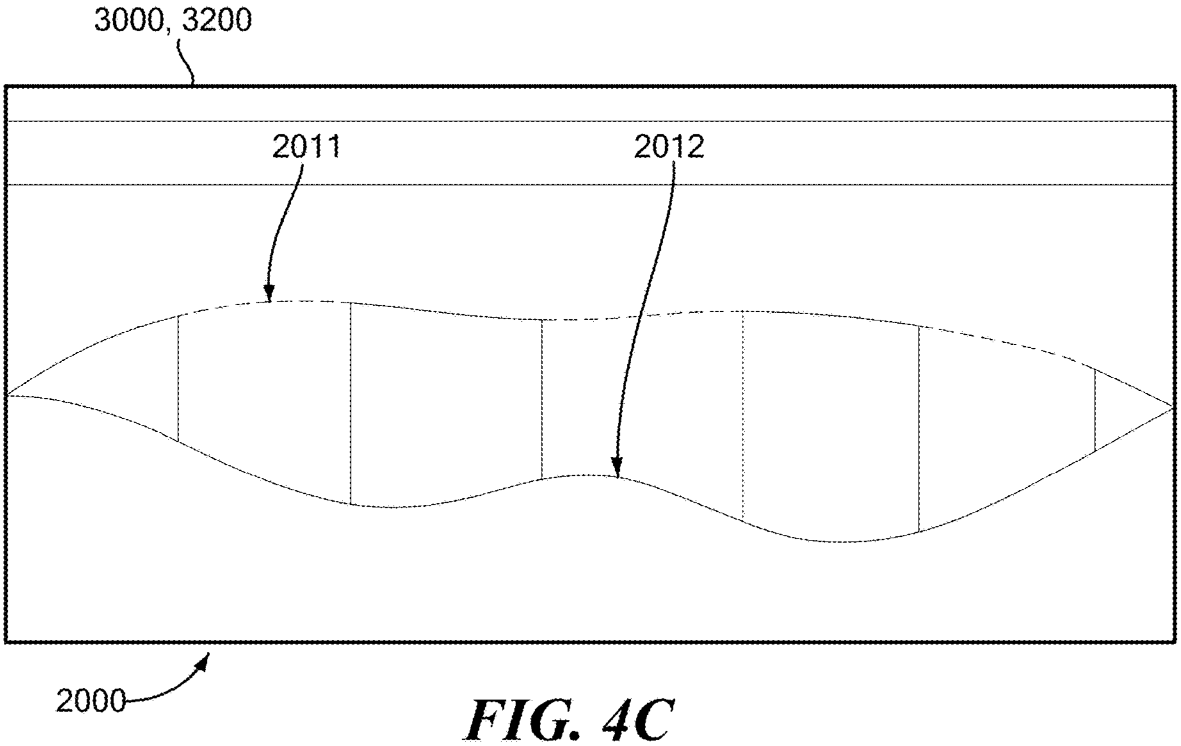
Figure 5:
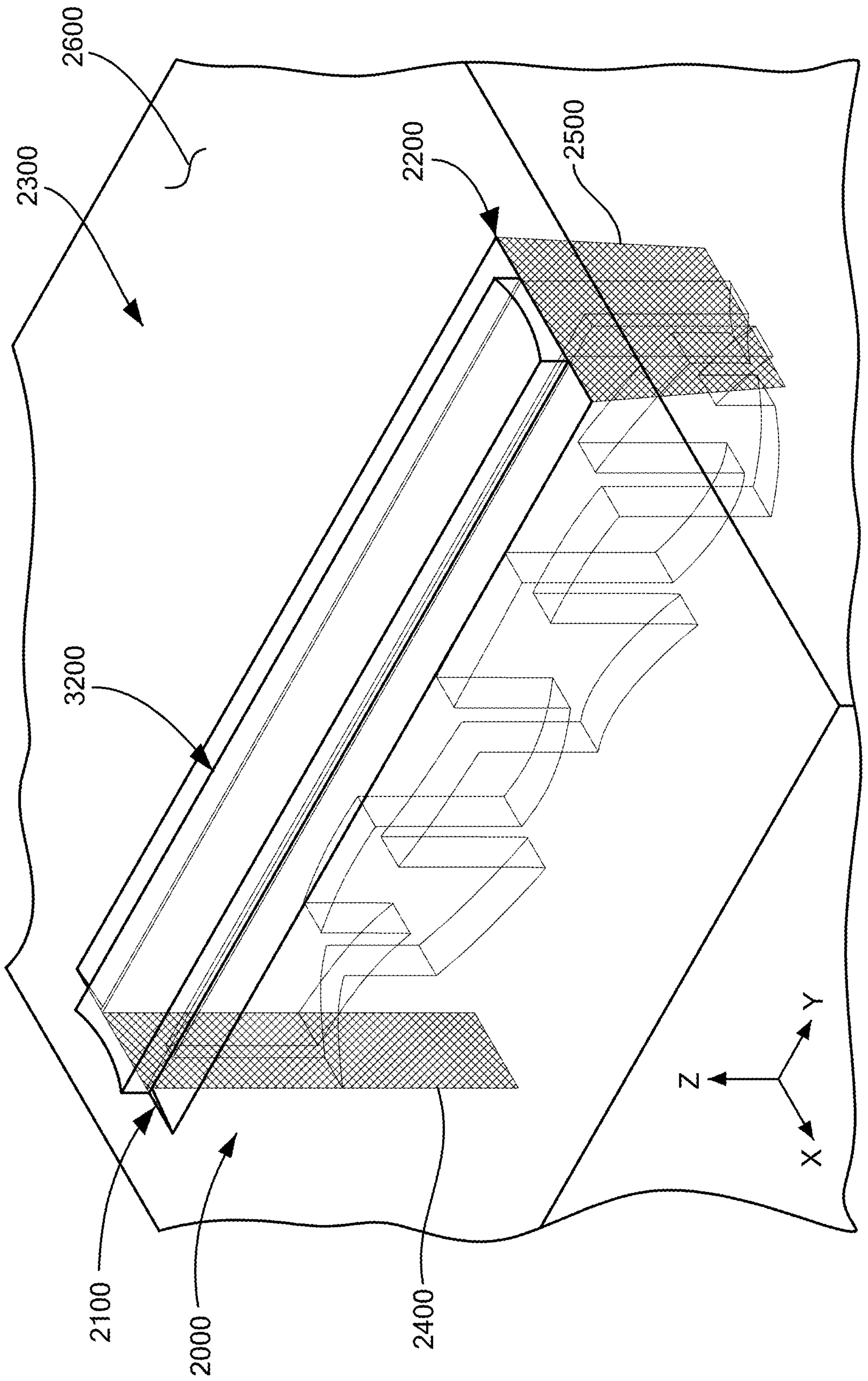
FIG. 5 depicts a rotated isometric transparent view of the example trough waveguide antenna of FIGS. 4B and 4C, in accordance with an embodiment.
Figure 6:
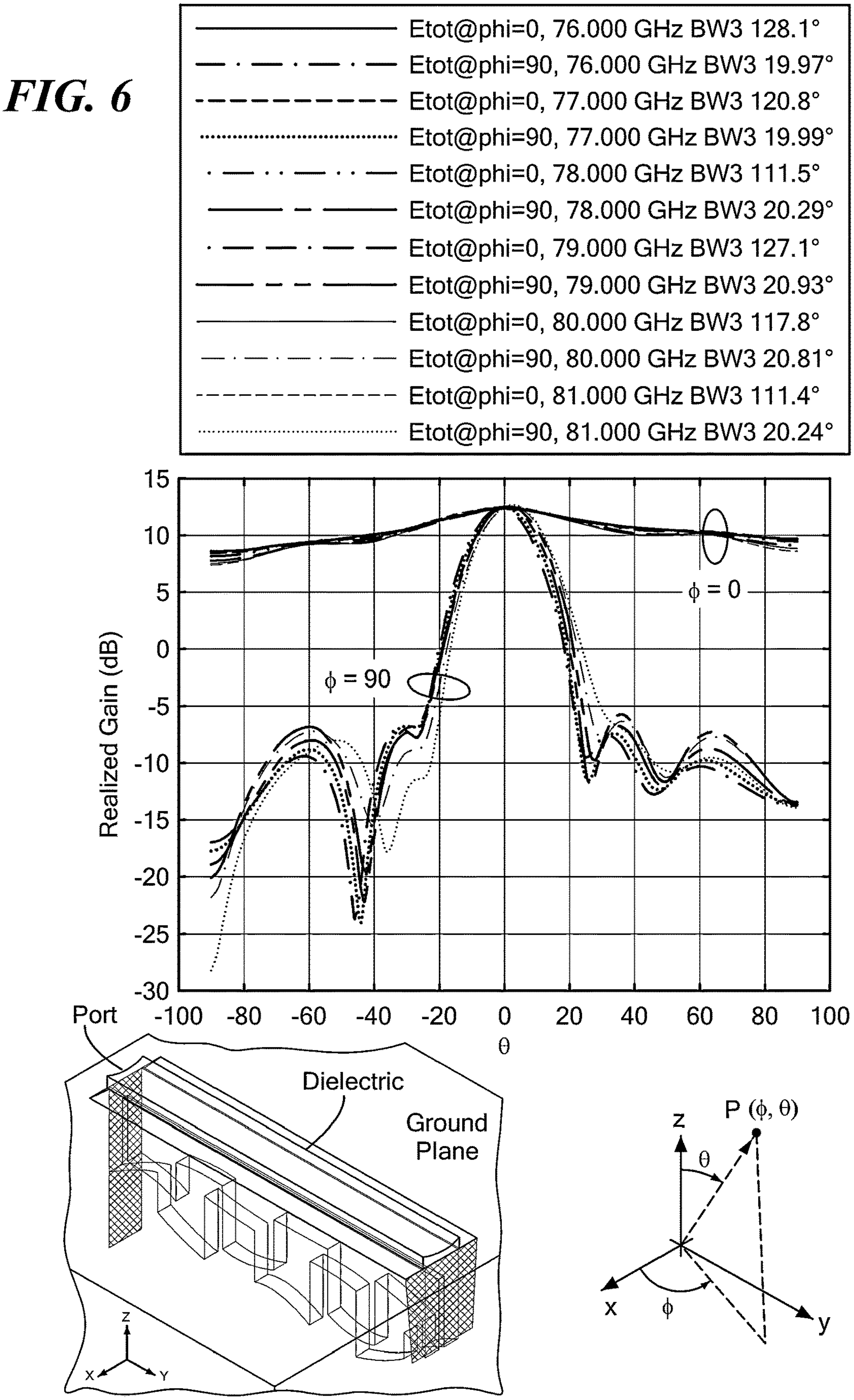
FIG. 6 depicts analytically modelled performance characteristics of the example trough waveguide antenna of FIG. 5, in accordance with an embodiment.

Reference is now made to FIGS. 4A, 4B, 4C, 5, and 6, where FIGS. 4A, 4B, and 4C, depict views similar to those of FIGS. 1A, 1B, and 1C, respectively, but with a dielectric, Dk, cover 3000 (also herein referred to as a lens or a lid) on top of the example TWG 1000 and the example TWGA 2000, FIG. 5 depicts a rotated isometric transparent view of the TWGA 2000 of FIG. 4C, similar to that of FIG. 2 but with the cover 3000, and FIG. 6 depicts analytically modelled performance characteristics of the example trough waveguide antenna 2000 with the cover 3000 as depicted in FIG. 5, similar to that of FIG. 3. When discussed generally, the Dk cover is herein referred to by reference numeral 3000, when discussed in relation to the TWG 1000, the Dk cover is herein referred to by reference numeral 3100, and when discussed in relation to the TWGA 2000, the Dk cover is herein referred to by reference numeral 3200. As depicted, the dielectric cover 3200 is disposed at and extends over the top of the trough 2010 of the TWGA 2000 with a width We that is equal or greater than the upper open-end width Wt of the trough 2010. The thickness, width, and overall shape of the dielectric cover 3100 over the TWGA 2000 serves to control the azimuth and elevation EM radiation pattern and shape emanating from the TWGA 2000. As an example, the cover 3100 and/or 3200 may include surface disruptions 3010, such as the indentation depicted in FIGS. 4A and 4B, or projections (not shown), for control of the aforementioned azimuth EM radiation pattern and shape. The dielectric cover 3200 also offers additional degrees of freedom in the design of such antennas that compliments the overall performance of the antenna. It is contemplated that such performance enhancements are manifested in improved return loss, improved sidelobe levels, and/or any other antenna output characteristic that would be so influenced. In an embodiment, the dielectric cover 3000 has a dielectric constant greater than 1 and equal to or less than 13.

FIG. 5 depicts a rotated isometric transparent view of the example TWGA 2000 of FIGS. 4B and 4C. Similar to the embodiment of FIG. 2, the TWGA 2000 of FIG. 5 is fed by a trough waveguide mode via a signal port 2400 on one end 2100 of the TWGA 2000. The opposing end 2200 of the TWGA 2000 has an electrically conductive short circuit 2500 that is electrically connected with an electrically conductive surface 2600 disposed at an upper end 2300 of the TWGA 2000.

FIG. 6 depicts analytically modelled performance characteristics of the example TWGA 2000 with the cover 3200 of FIG. 5. The measurements shown were taken at point P, sufficiently far away from the TWGA 2000 and cover 3200 to be considered to be in the far field. As depicted, an embodiment of the TWGA 2000 with cover 3200 is configured to perform with a boresight (θ=0) realized gain of about 12 dBi, and with particular sidelobe gain peaks and radiation patterns in the azimuth (ϕ=0) and elevation (ϕ=90) planes (compare to FIG. 3). As can be seen by comparing the sidelobe gain peaks and radiation patterns of FIGS. 3 and 6, it can be seen that the presence of the Dk cover 3200 has an impact on the shape and distribution of the EM radiation in the sidelobes more than it does with impacting the boresight gain. It can also be observed that Dk cover 3200 increases the azimuthal radiation gain (ϕ=0) over a larger angular spread.

Figure 7B:
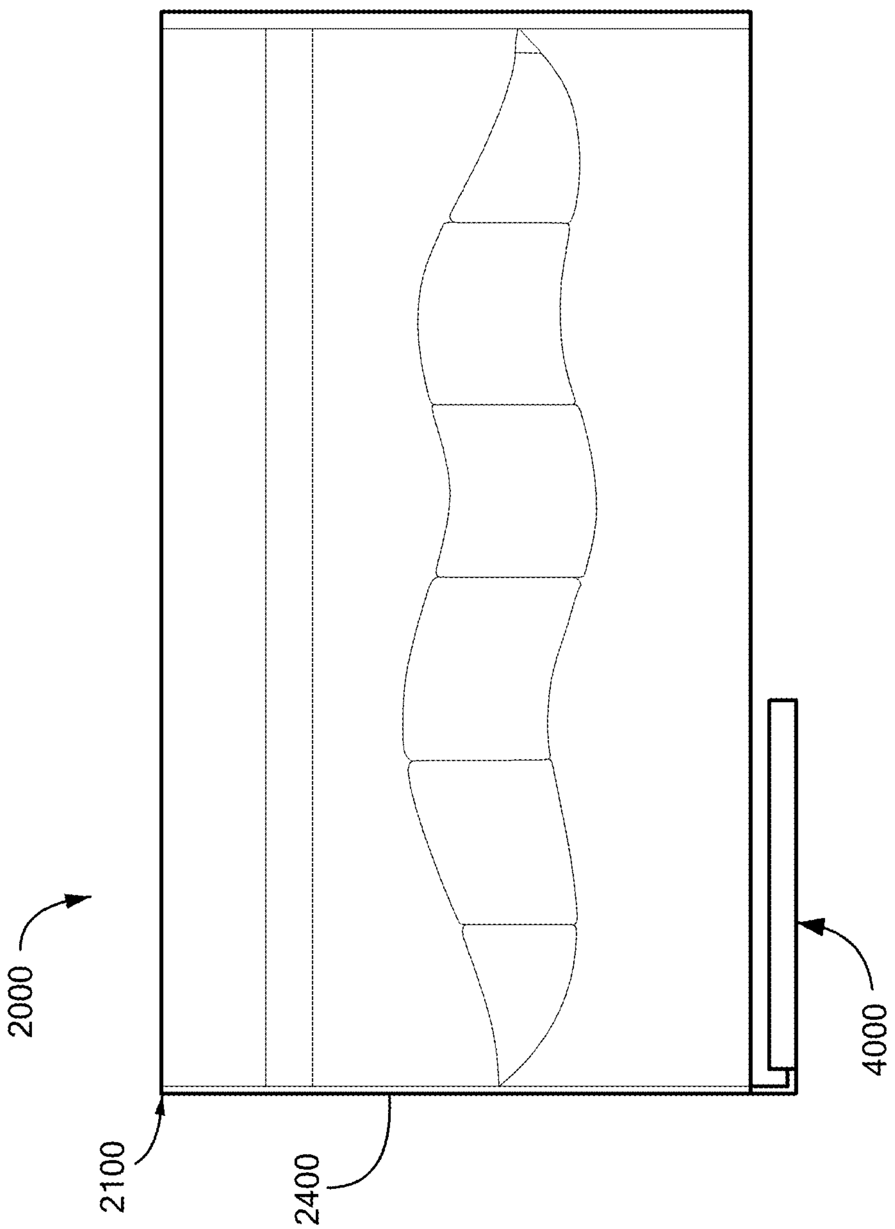
FIGS. 7A and 7B respectively depict the cross section end view and the cross section side view of the example trough waveguide antenna of FIGS. 1B and 1C with a signal feed, in accordance with an embodiment.
Figure 7A:
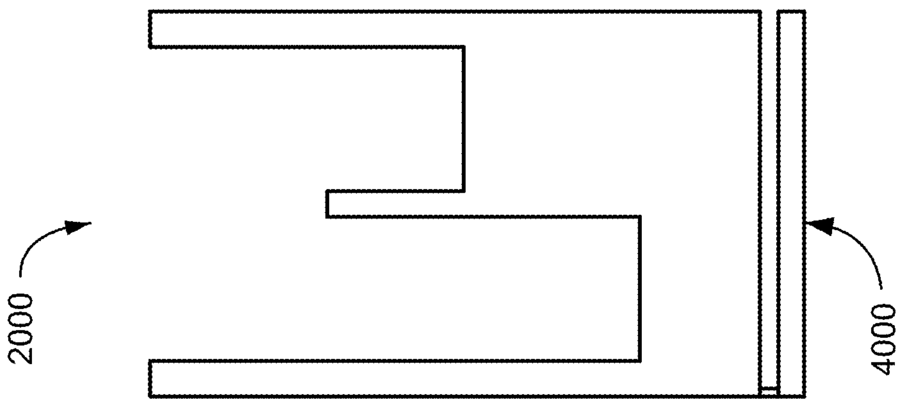

FIGS. 7A and 7B respectively depict the cross section end view and the cross section side view of the example TWGA 2000 of FIGS. 1B and 1C with a signal feed 4000 disposed in signal communication with the signal port 2400 at the first end 2100 of the TWGA 2000.

Figure 8C:
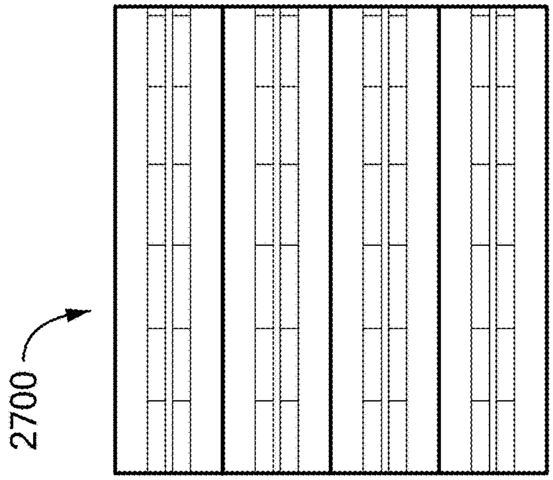
FIGS. 8A, 8B, and 8C, respectively depict a top down plan view, a repeated top down plan view, and a final top down plan view, of a single and a plurality of the example trough waveguide antenna of either FIG. 2 or FIG. 5, in accordance with an embodiment.
Figure 8B:
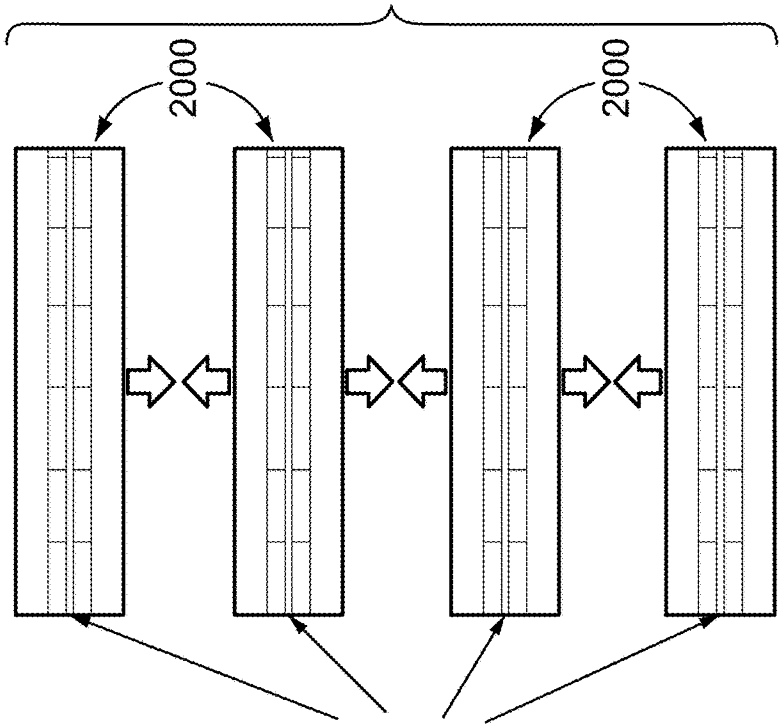
Figure 8A:
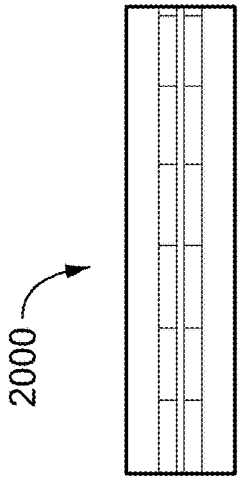

FIGS. 8A, 8B, and 8C, respectively depict a top down plan view, a repeated top down plan view, and a final top down plan view, of a single and a plurality of the example TWGA 2000 of either FIG. 2 or FIG. 5, where the assembled plurality of TWGAs 2000 (FIG. 8C) form a multi-channel TWGA 2700.

Figure 9:
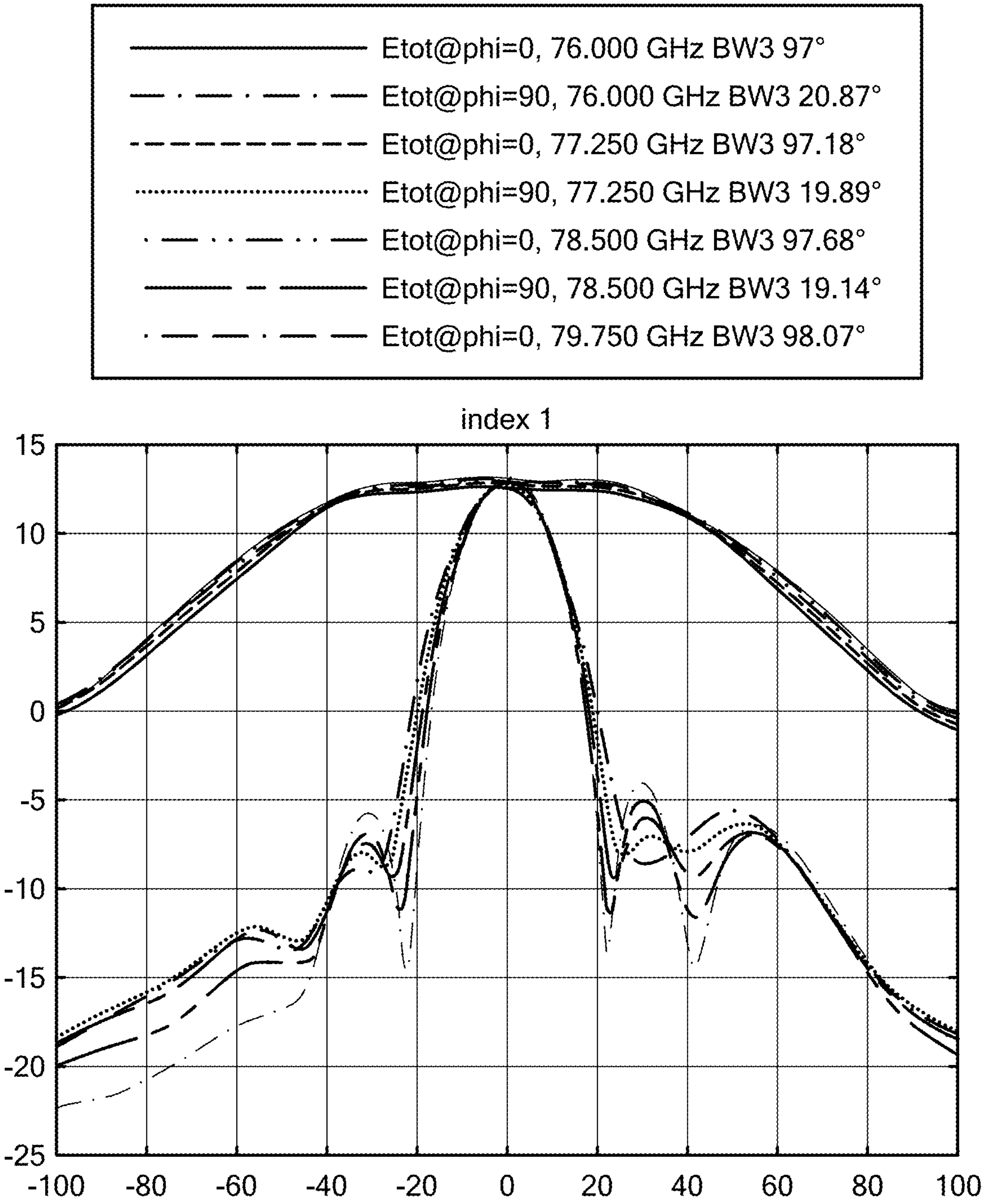
FIG. 9 depicts analytically modelled performance characteristics of the embodiment of FIG. 8C, in accordance with an embodiment.

FIG. 9 depicts analytically modelled performance characteristics of the embodiment of FIG. 8C, which is a single one of a multi-channel TWGA 2700. As can be seen by comparing the analytical plots of FIG. 9 with those of FIG. 3, the multi-channel TWGA 2700 produces a similar gain profile as seen at phi=90, and a flatter gain profile as seen at phi=0. It is the combination of TWGA profile and dielectric cover that allows this multi-channel antenna pattern to have a variety of shapes.

Figure 10A:
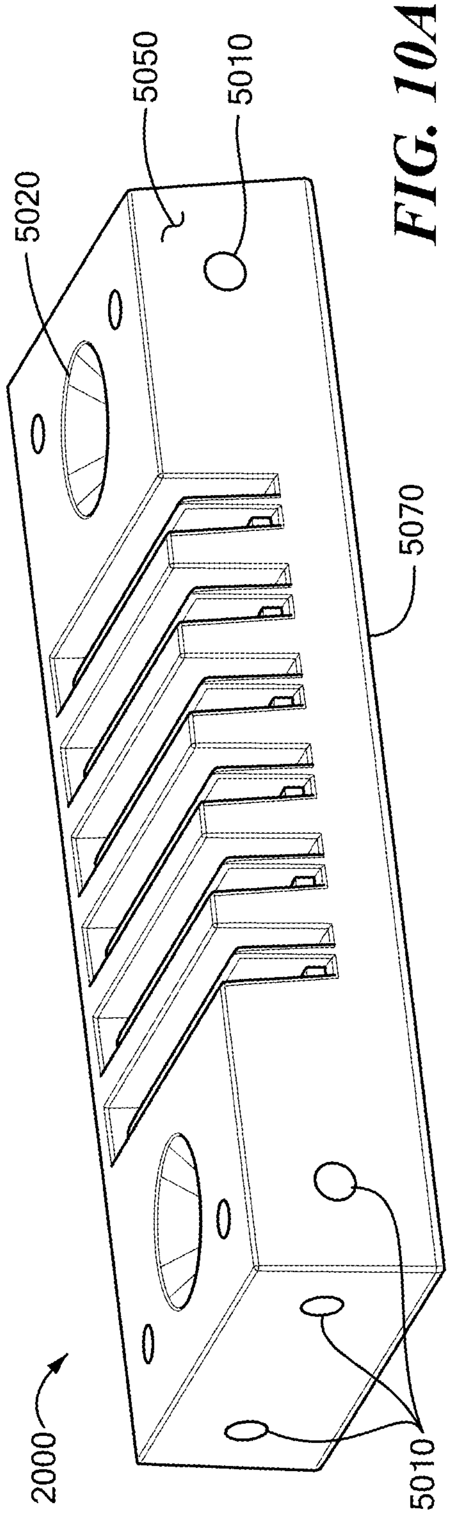
FIG. 10A depicts a rotated isometric top down view.
Figure 10B:
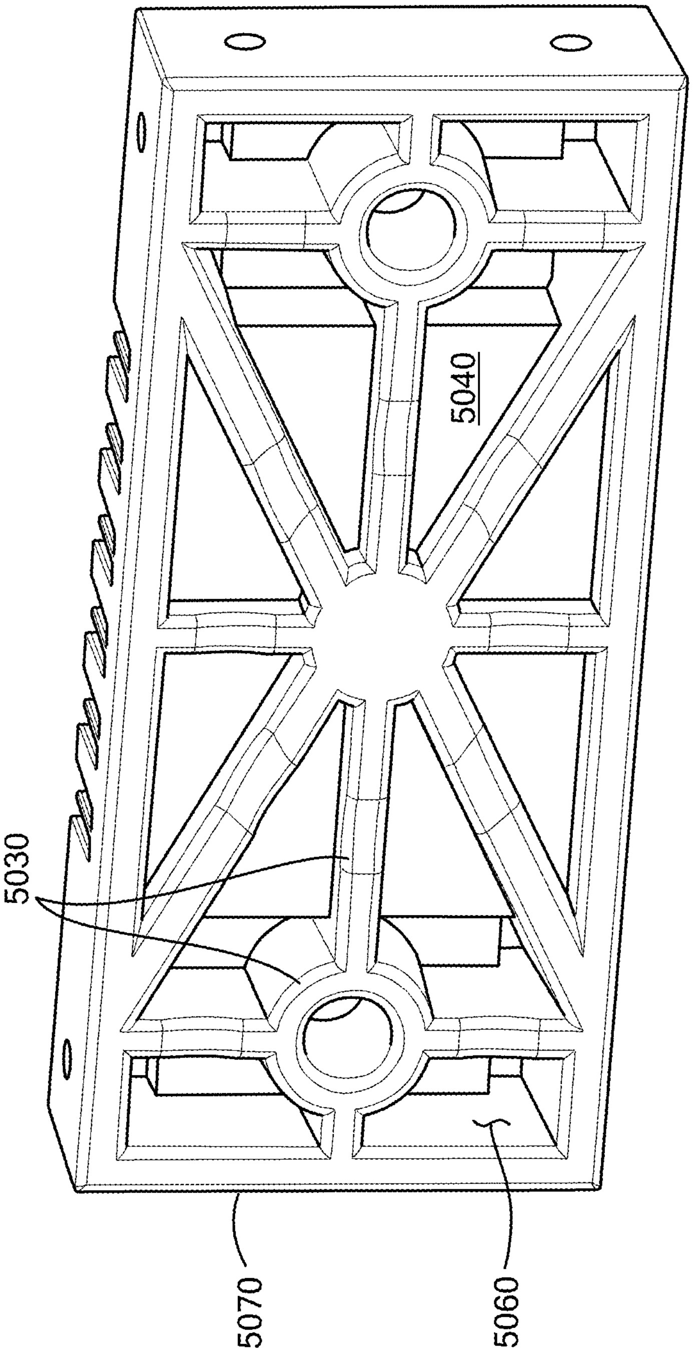
FIG. 10B depicts a rotated isometric bottom up view, of a trough waveguide antenna with features that aid in its manufacturability, in accordance with an embodiment.

FIG. 10A depicts a rotated isometric top down view, and FIG. 10B depicts a rotated isometric bottom up view, of an example TWGA 2000 with features 5000 that aid in its manufacturability without substantially compromising electromagnetic performance. For example, the manufacturability features 5000 may include one or more of the following: (i) positive protruding fabrication features 5010 that do not allow flat surfaces or surface features to stick during a barrel electroplating process (i.e., the positive features break up a continuous flat plane); (ii) screw locations 5020 incorporated with or without recessed pockets (as shown) for receiving a flat-head type screw or like fastener; (iii) ribbing features 5030 to reduce material consumption and warpage; (iv) recess features 5040 to reduce sticking tendency during electroplating; (v) molding draft angle feature 5050 equal to or greater than 2-degrees provided on the top side/surfaces of the monolithic 3D dielectric construct of the TWGA 2000; (vi) molding draft angle feature 5060 of equal to or greater than 4-degrees provided on the bottom side/surfaces of the monolithic 3D dielectric construct of the TWGA 2000; and, (vii) molding parting line feature 5070 placed proximate the bottom face of the monolithic 3D dielectric construct of the TWGA 2000. While specific draft angles, such as 2-degrees and 4-degrees for example, are presented herein above, it will be appreciated that these are merely example draft angles that may be suitable for a particular purpose and surface, are not intended to be limiting in any way to an invention disclosed herein, and may include any draft angle suitable for a manufacturing process that may include single axis molding.

Reference is now made to FIGS. 11-23B, which in general relate to an example TWGA system having at least one TWGA 2000.

Figure 11:
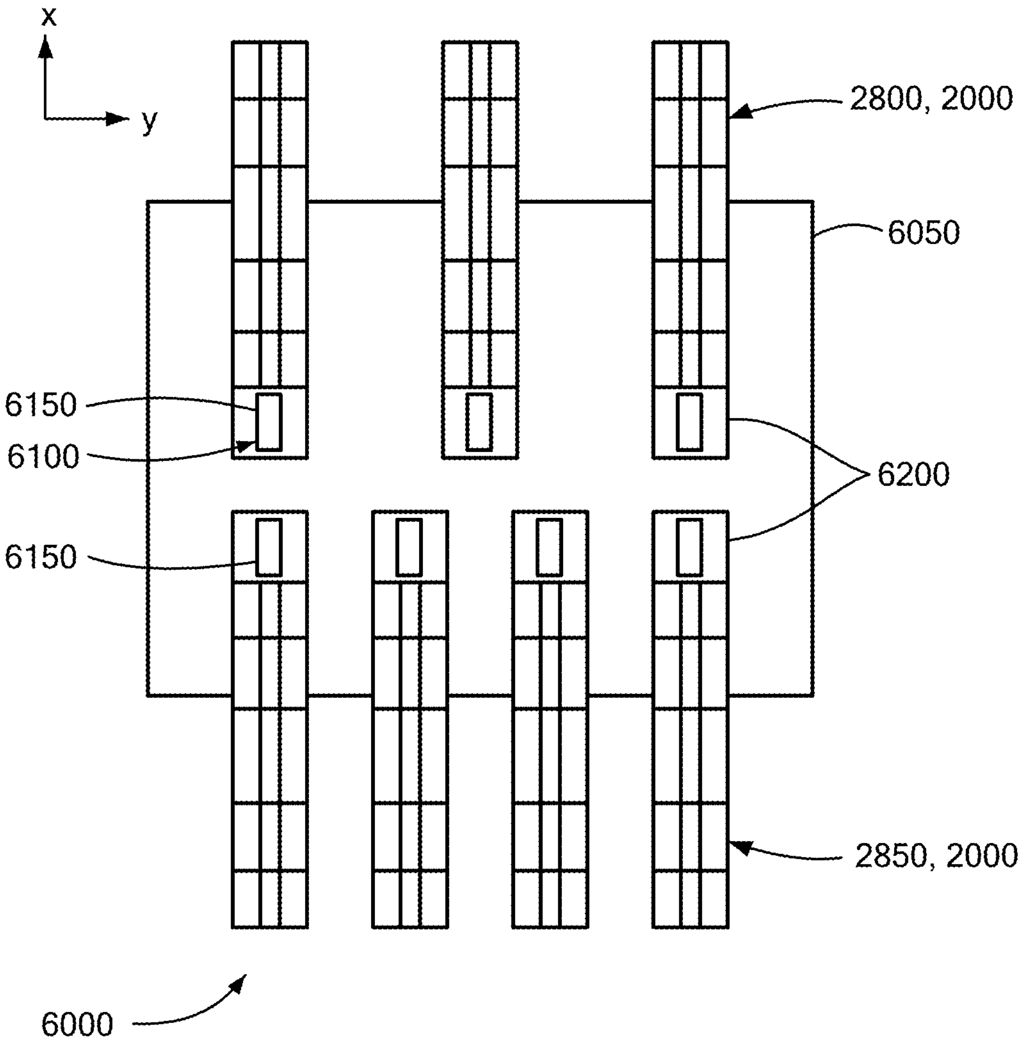
FIG. 11 depicts a conceptual top down plan view, x-y plane, of an antenna-on-package feed with transitions, and having transmit and receive trough waveguide antennas, in accordance with an embodiment.

FIG. 11 depicts a conceptual top down plan view, x-y plane, of a TWGA system 6000 having antenna-on-package (AoP) feeds 6100 on an underlying package 6050, electromagnetically connected waveguide transitions (alternatively herein referred to as transition regions) 6200, and transmit and receive antennas 2800, 2850, respectively, each in the form of a TWGA 2000, electromagnetically connected with the waveguide transitions 6200. In an embodiment, the AoP feeds 6100 include patch antennas 6150 disposed on the underlying package 6050. In an embodiment, the AoP feeds 6100 and/or the patch antennas 6150 have the form of a planar signal feed structure.

Figure 12:
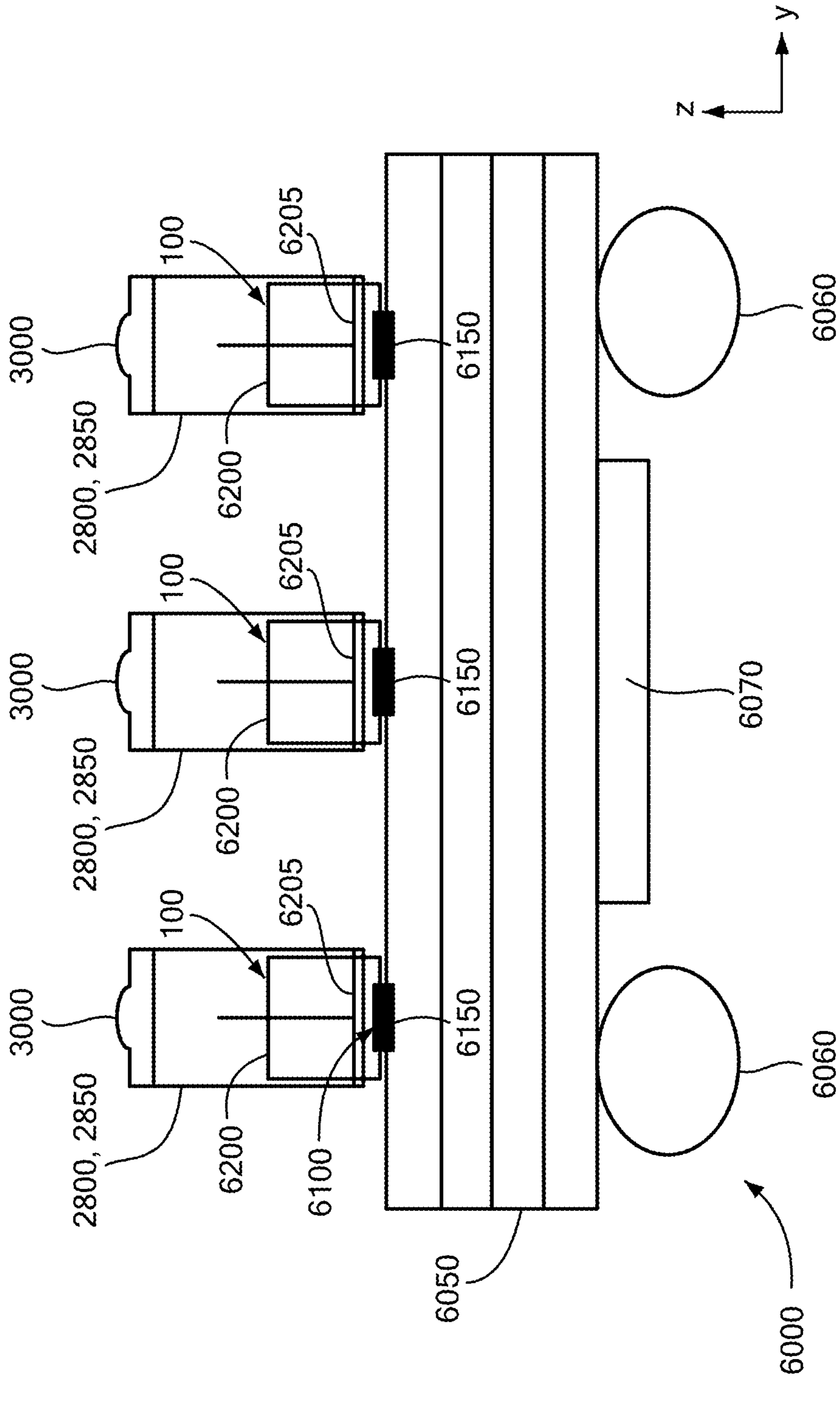
FIG. 12 depicts a conceptual end view, y-z plane, of the antenna-on-package feed of FIG. 11, in accordance with an embodiment.

FIG. 12 depicts a conceptual end view, y-z plane, of the TWGA system 6000 of FIG. 11 having the AoP feeds 6100 on the underlying package 6050, the waveguide transitions (transition regions) 6200, and the transmit and receive antennas 2800, 2850. Here, Dk covers 3000 over the TWGAs 2800, 2950 are also depicted. Also depicted are solder ball connections 6060 for electrically connecting the TWGA system 6000 to an underlying PCB (printed circuit board) (not shown), and an integrated RFIC (radio frequency integrated circuit) chip 6070. As depicted, a waveguide signal feed interface 6205 is disposed between the AoP feeds 6100 and the waveguide transition regions 6200 to form part of an electromagnetic, EM, transition portion 100. In an embodiment, each EM transition portion 100 is configured to couple EM energy from the signal feed interface 6205 to a guided waveguide mode of EM energy to an open waveguide section 1000 via the transition region 6200, in accordance with embodiments of structure disclosed herein below. In an embodiment, the waveguide signal feed interface 6205 comprises a waveguide input port of the waveguide transition 6200. The AoP feeds 6100, or any signal feed disclosed herein, in combination with the waveguide signal feed interface 6205, or any signal feed interface disclosed herein, may be viewed as a region of an EM signal launch into the EM transition portion 100.

Figure 13:
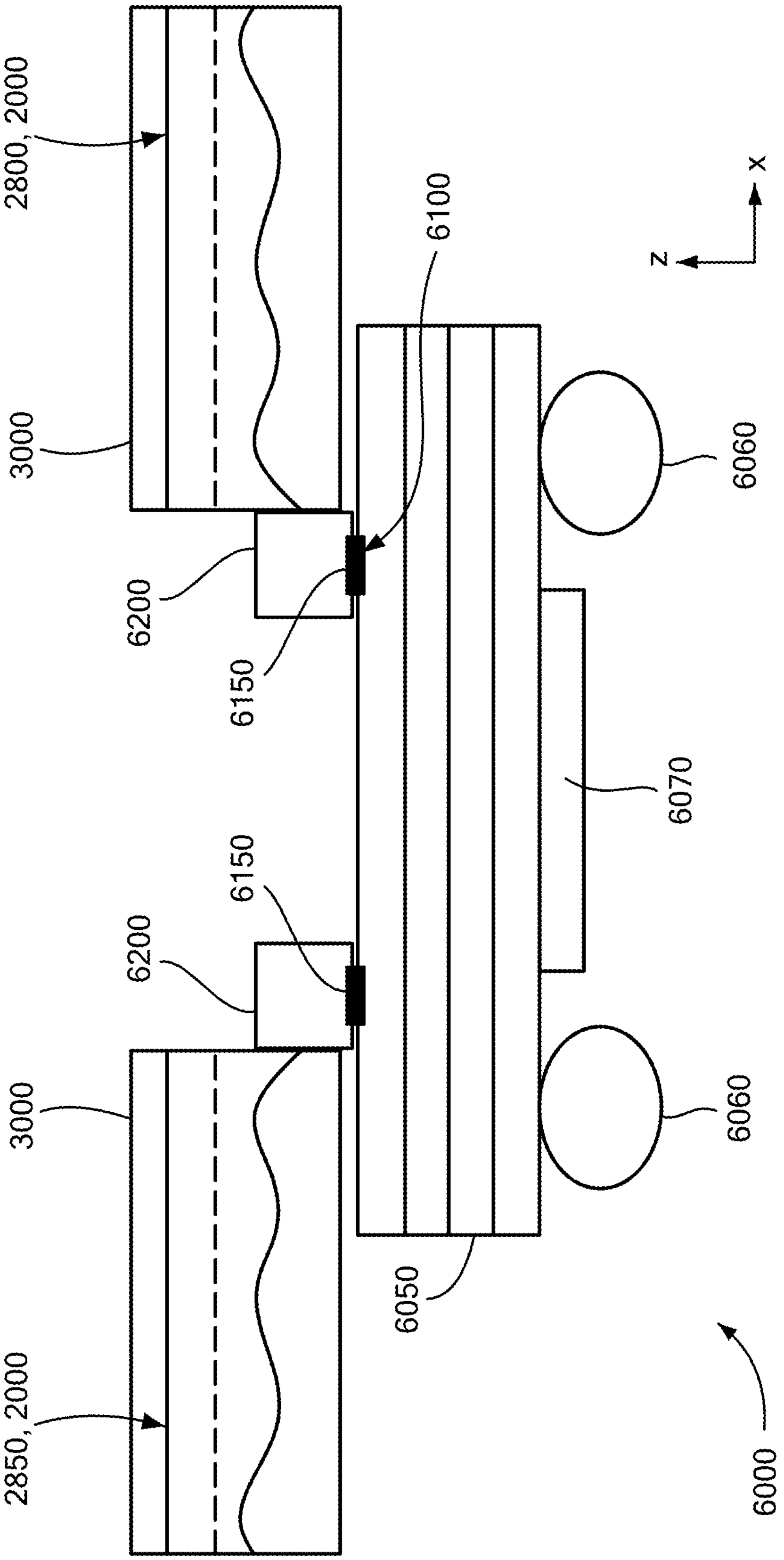
FIG. 13 depicts a conceptual side view, x-z plane, of the antenna-on-package feed of FIG. 11, in accordance with an embodiment.

FIG. 13 depicts a conceptual side view, x-z plane, of the TWGA system 6000 of FIG. 11 having the AoP feeds 6100, in a left-hand and right-hand configurations, on the underlying package 6050, the waveguide transitions 6200, the transmit and receive antennas 2800, 2850, and the Dk covers 3000 over the TWGAs 2800, 2850.

Figure 14A:
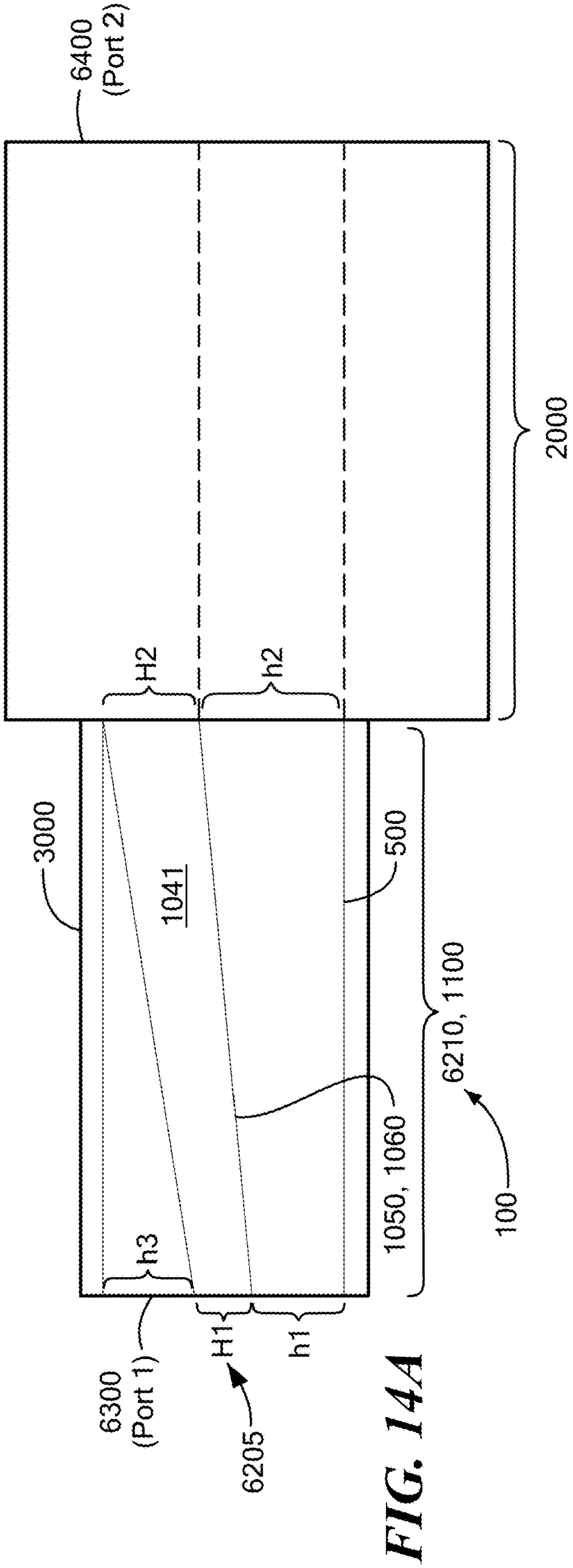
FIG. 14A depicts a transparent side view of an example first transition in the form of a ridge waveguide that transitions to a trough waveguide antenna.
Figure 14B:
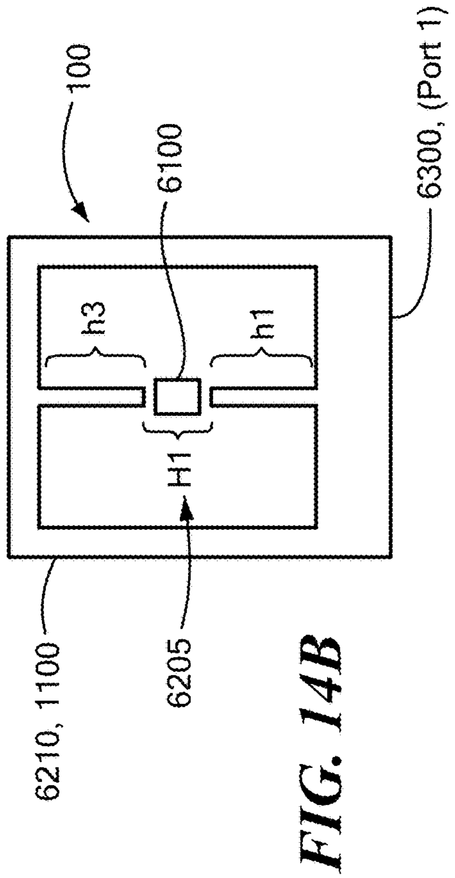
FIG. 14B depicts an end view of the first transition of FIG. 14A.
Figure 14C:
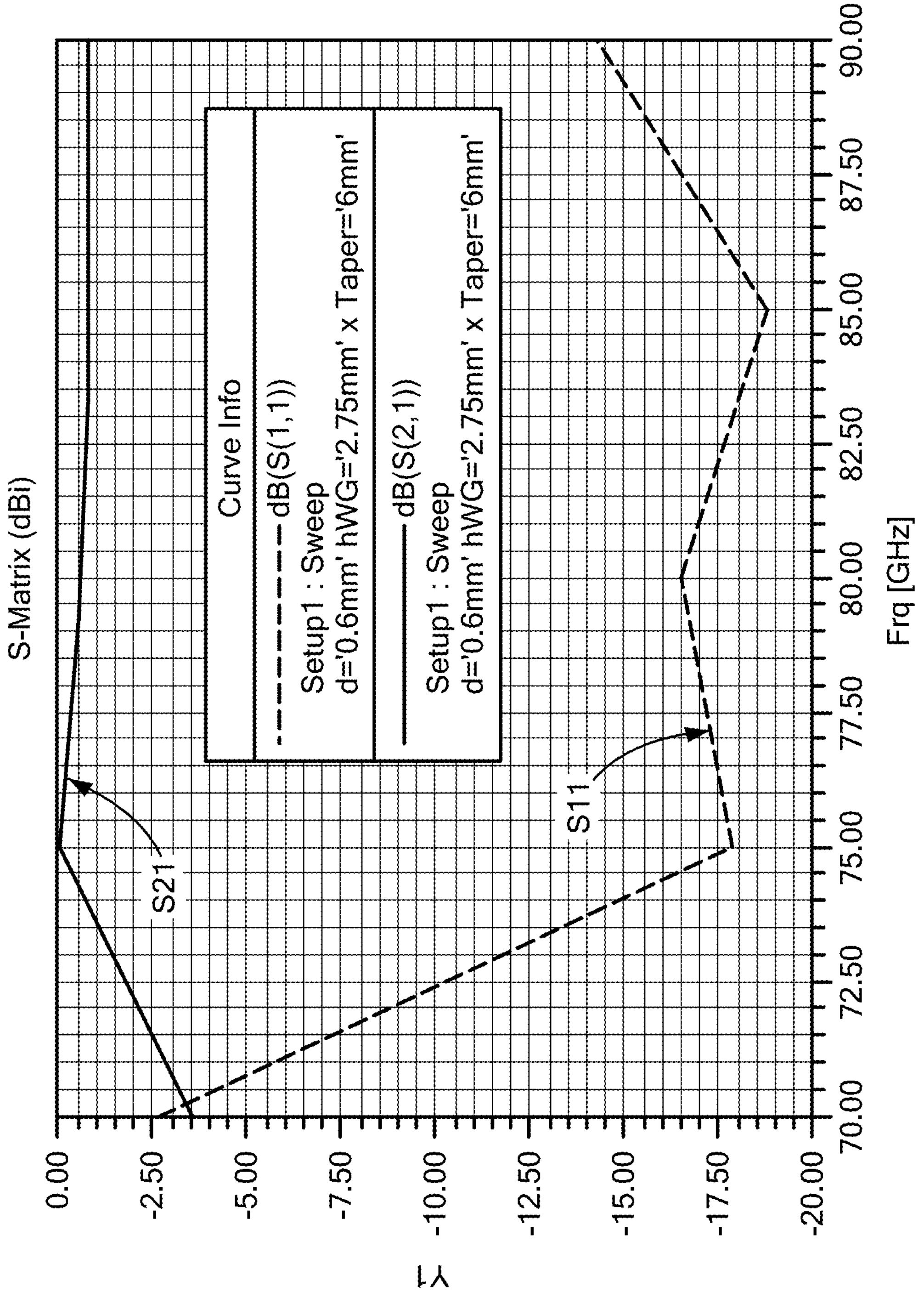
FIG. 14C depicts EM performance characteristics of the embodiment of FIG. 14A, in accordance with an embodiment.

FIG. 14A depicts a transparent side view of an example first transition region 6210 (generically referred to by reference numeral 6200) in the form of a ridge waveguide 1100 that transitions (left-to-right) to the TWGA 2000; FIG. 14B depicts an end view of the first transition of FIG. 14A; and, FIG. 14C depicts EM performance characteristics of the embodiment of FIG. 14A. Here, the AoP feed 6100 is centered between the lower ridge (see h1) and the upper ridge (see h3), and the first transition 6210 is similar to the TWG 1000 described herein above, but having a septum 1041, similar to the aforementioned septum 1040, where the septum 1041 is sloped upwards from a Port-1 6300 (analytical port employed for analytical modeling) on the left side of the first transition 6210, to the TWGA 2000 on the right side of the first transition 6210, with an overall height that varies from h1 to h2 relative to base 500, where h2 is greater than h1 in this example. In an embodiment, H1 is also grater than H2. As depicted, the height of the septum 1041 increases from the Port-1 6300 to the TWGA 2000, where h2+H2 is greater than h1+H1. As depicted, and similar to FIG. 12, a signal feed interface 6205 is disposed between the AoP feed 6100 and the first transition region 6210 to form part of an EM transition portion 100, which also includes the ridge waveguide 1100. As depicted, a Port-2 6400 (analytical port employed for analytical modeling) is depicted on the right side of TWGA 2000. Port-1 6300 and Port-2 6400 are used herein for analytical purposes to analyze the S-matrix network parameters S11 and S21 as depicted in the S-Matrix Plot (dB) in FIG. 14, which indicates low EM reflection from the input port 6300, S11, and high EM transmission between the input port 6300 and the output port 6400, S21, both of which are desirable performance characteristics of an embodiment disclosed herein. As depicted, favorable return loss, S1, and EM transmission, S21, is observed at frequencies at or above 75 GHz.

Further regarding FIG. 14A, the functional dependence of the septum height (i.e. (h1,H1)) pair to (h2,H2) pair can be linear or quadratic depending on the relative values of the (h1, H1) and (h2,H2) pairs.

Figure 15A:
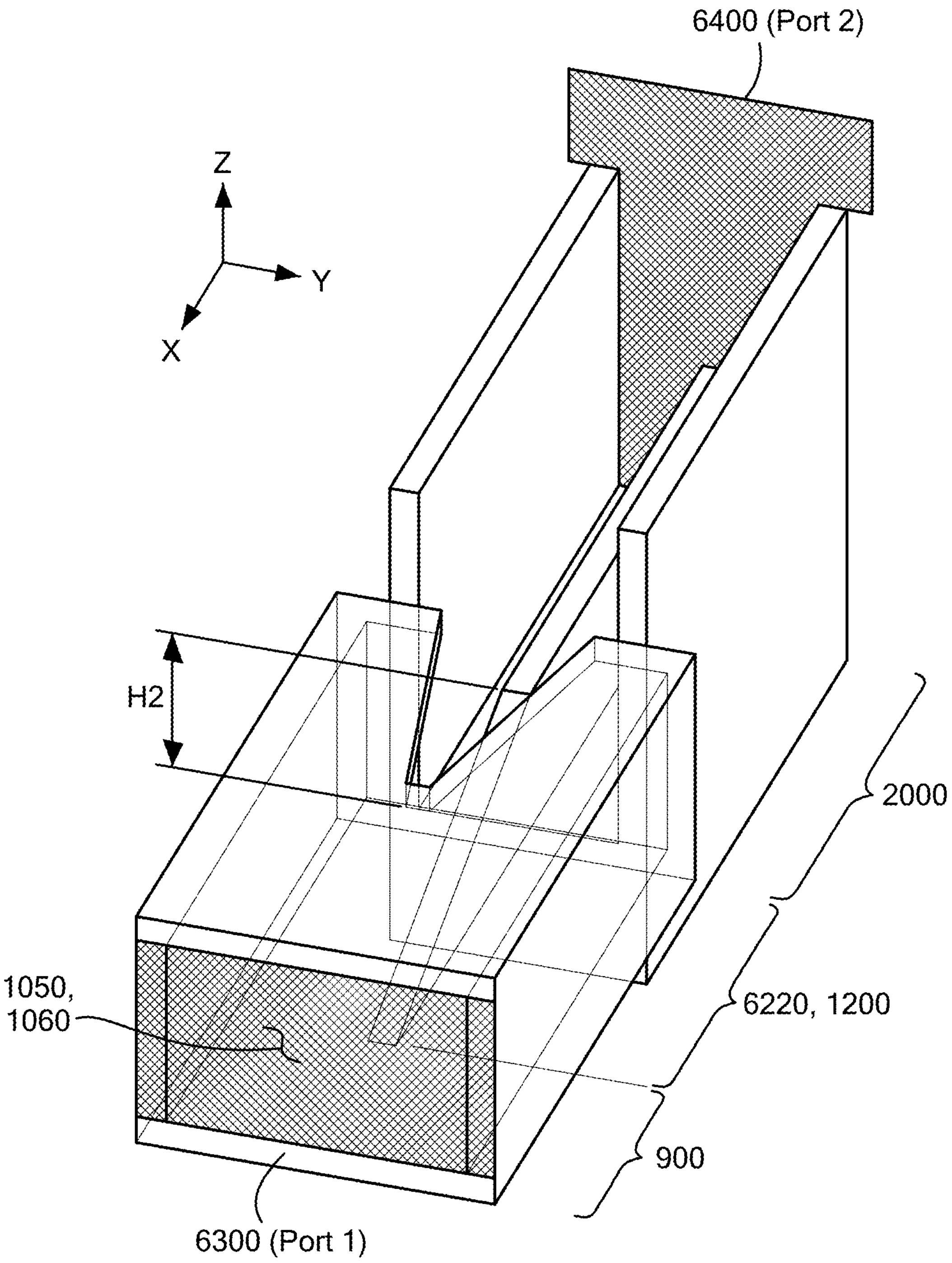
FIG. 15A depicts a transparent rotated isometric view of an example second transition disposed between a rectangular waveguide and a trough waveguide antenna.
Figure 15B:
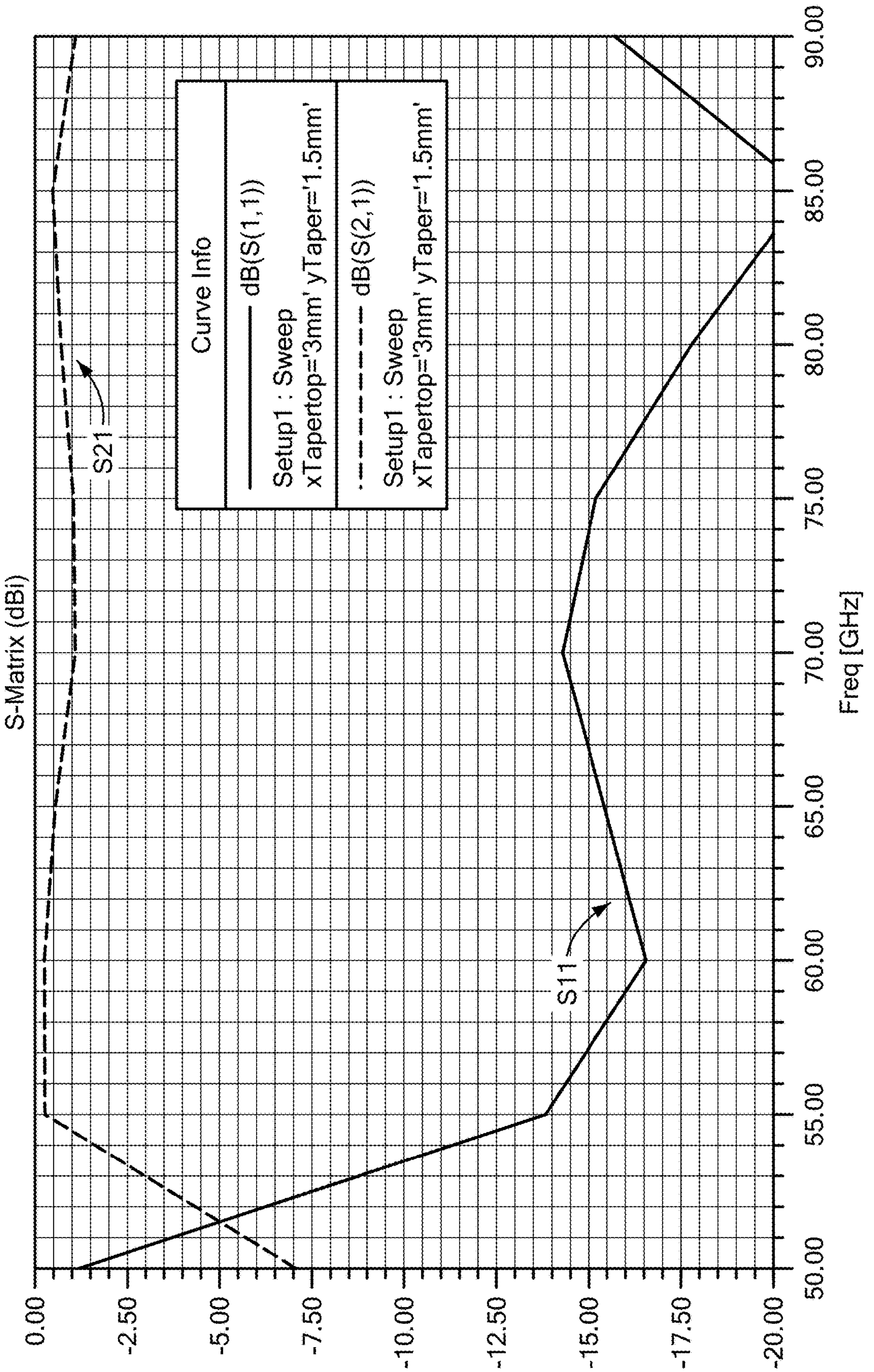
FIG. 15B depicts EM performance characteristics of the embodiment of FIG. 15A, in accordance with an embodiment.

FIG. 15A depicts a transparent rotated isometric view of an example second transition 6220 disposed between a rectangular waveguide 900 and a TWGA 2000; and, FIG. 15B depicts EM performance characteristics of the embodiment of FIG. 15A. As depicted, the second transition 6220 of FIG. 15 is similar in structure as the aforementioned first transition 6210 of FIG. 14, and is also in the form of a ridge waveguide 1200, but with the following differences. Here, the second transition 6220 has a septum 1042 similar to the aforementioned septum 1041, but where the septum 1042 is sloped upwards from a height H1 (see FIG. 14 for example) equal to zero at the rectangular waveguide 900 (as depicted in FIG. 15) to a height H2 at the TWGA 2000 (as depicted in FIG. 15). Another difference between the second transition 6220 and the first transition 6210 is that the first and second base 105, 1060 is not sloped. Similar to the embodiment of FIG. 14, FIG. 15 depicts Port-1 6300 and Port-2 6400 that are used herein for analytical purposes to analyze the return losses S11 and S21 as depicted in the S-Matrix Plot (dB) in FIG. 15, which indicates low EM reflection from the input port 6300, S11, and high EM transmission between the input port 6300 and the output port 6400, S21, both of which are desirable performance characteristics of an embodiment disclosed herein. As depicted, favorable return loss, S1, and EM transmission, S21, is observed at frequencies at or above 60 GHz.

Reference is now made to FIGS. 16A-23B, which illustrate various embodiments of transitions consistent with an embodiment disclosed herein.

Figure 16A:
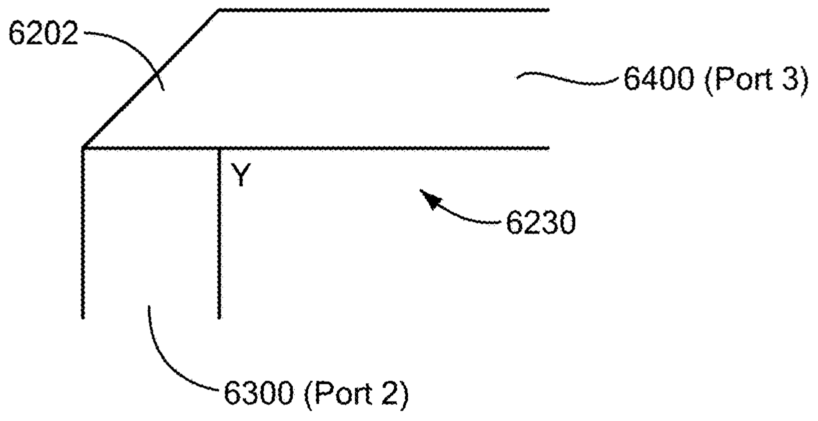
FIG. 16A depicts a top down block diagram view of an example third transition in the form of a waveguide bend.
Figure 16B:
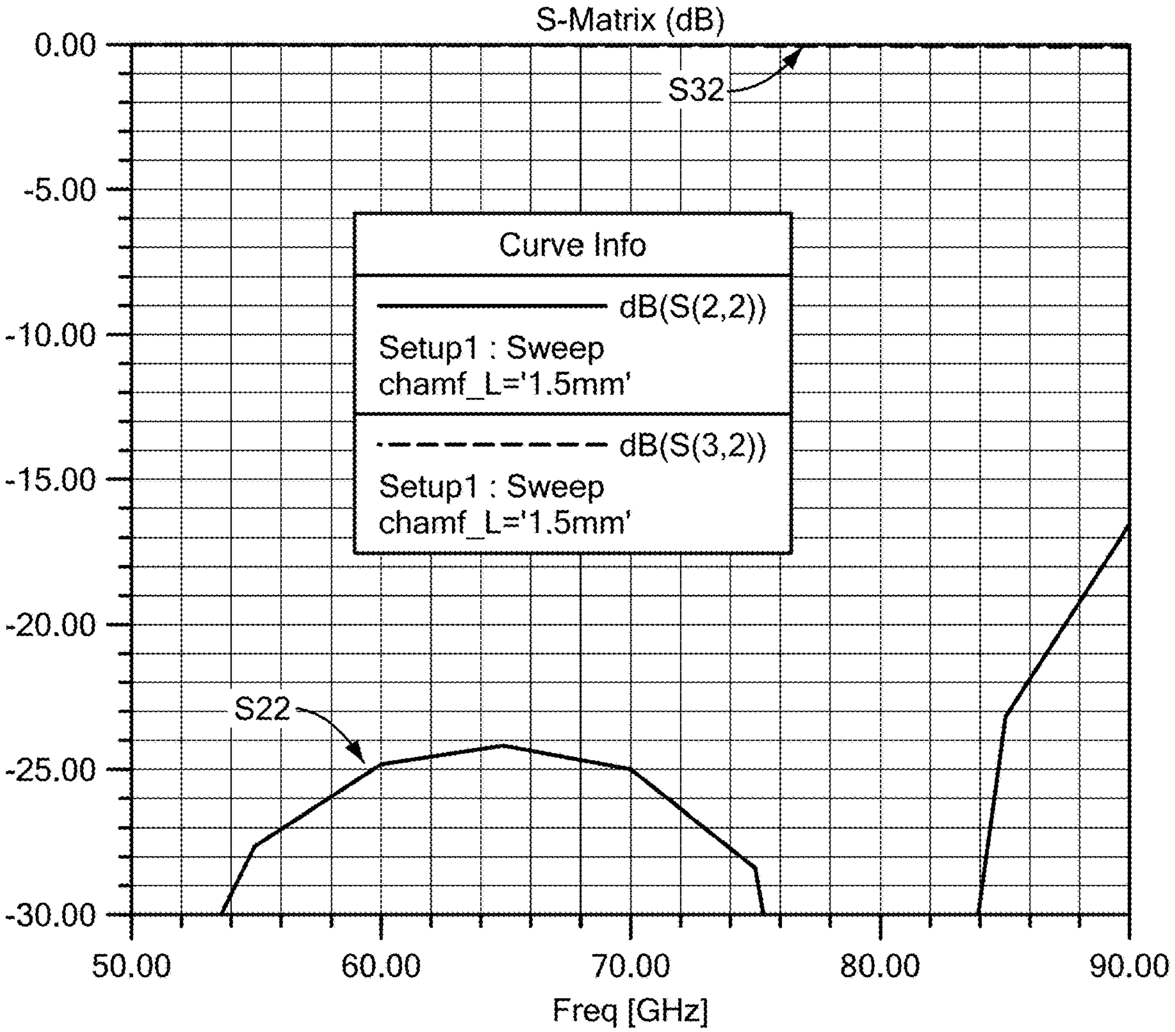
FIG. 16B depicts EM performance characteristics of the embodiment of FIG. 16A, in accordance with an embodiment.

FIG. 16A depicts a top down block diagram view of an example third transition 6230 in the form of a waveguide having a 90-degree bend 6202 between an input Port-1 6300 and an output Port-2 6400; and, FIG. 16B depicts EM performance characteristics of the embodiment of FIG. 16A. As depicted, favorable return loss, S11, and EM transmission, S21, is observed at about 80 GHz.

Figure 17A:
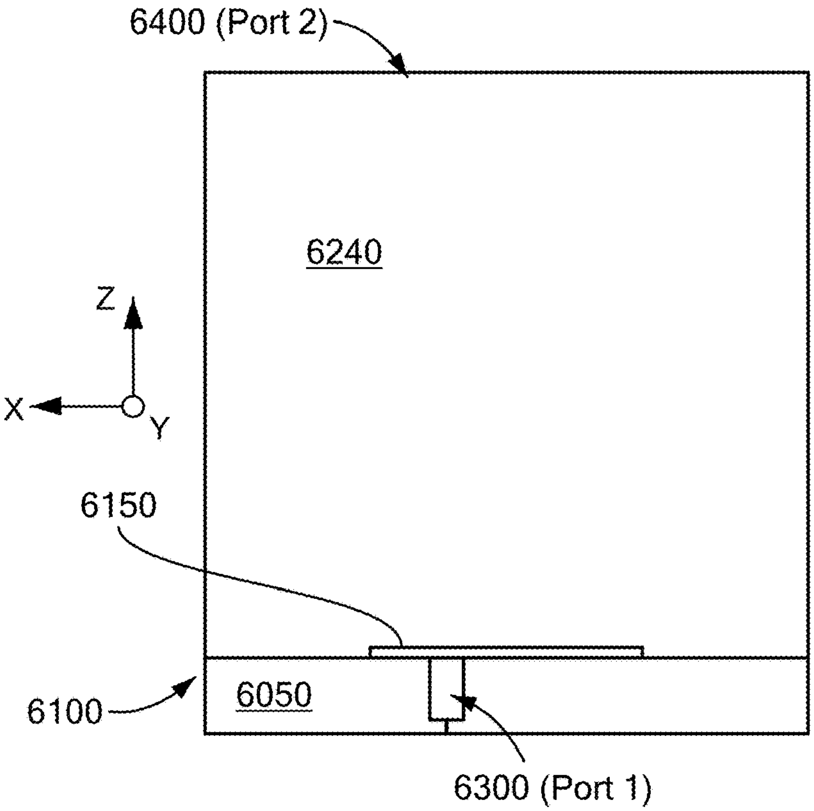
FIG. 17A depicts a transparent side view of an example fourth transition in the form of a rectangular waveguide.
Figure 17B:
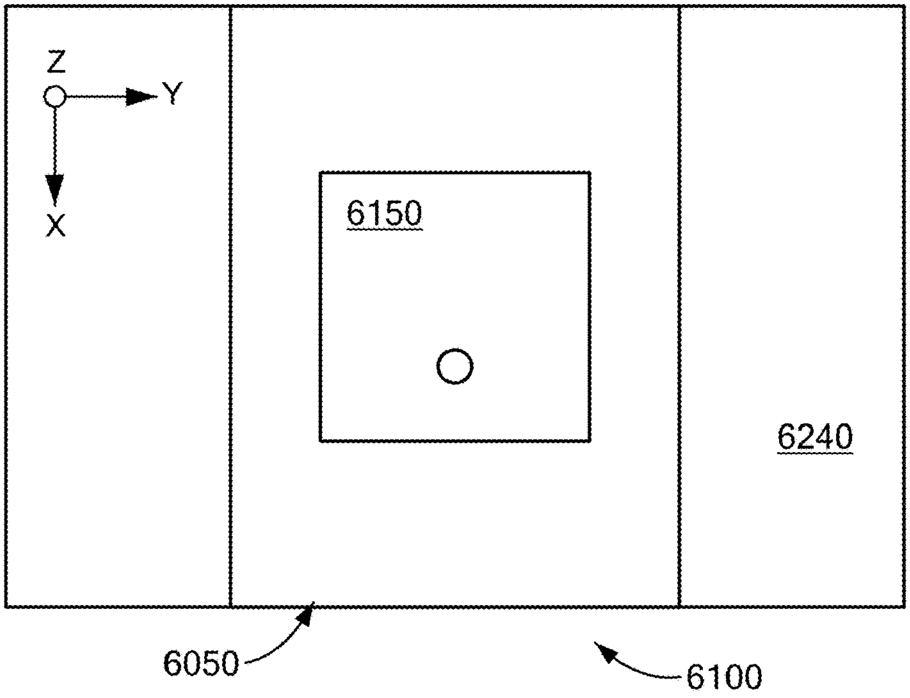
FIG. 17B depicts a top down plan view of the embodiment of FIG. 17A; and, FIG. 17C depicts EM performance characteristics of the embodiments of FIGS. 17A and 17B, in accordance with an embodiment.
Figure 17C:
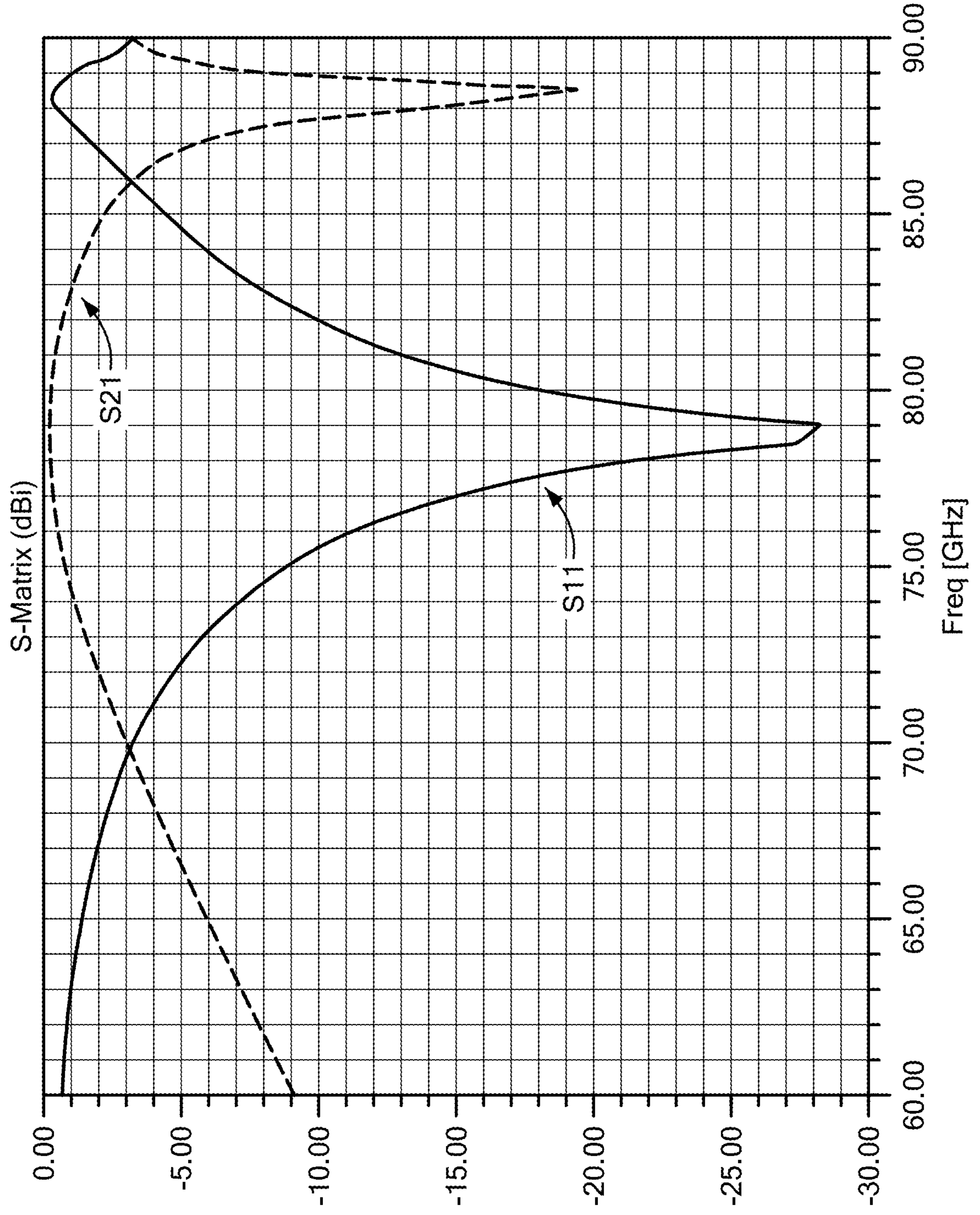

FIG. 17A depicts a transparent side view of an example fourth transition 6240 in the form of a rectangular waveguide, which is disposed between a patch 6150 and a TWGA 2000 (not shown), where in an embodiment the patch 6150 is disposed on a package 6050 to provide AoP feeds 6100; FIG. 17B depicts a top down plan view of the embodiment of FIG. 17A; and, FIG. 17C depicts EM performance characteristics of the embodiments of FIGS. 17A and 17B. As depicted, favorable return loss, S11, and EM transmission, S21, is observed at about 79 GHz.

Figure 18:
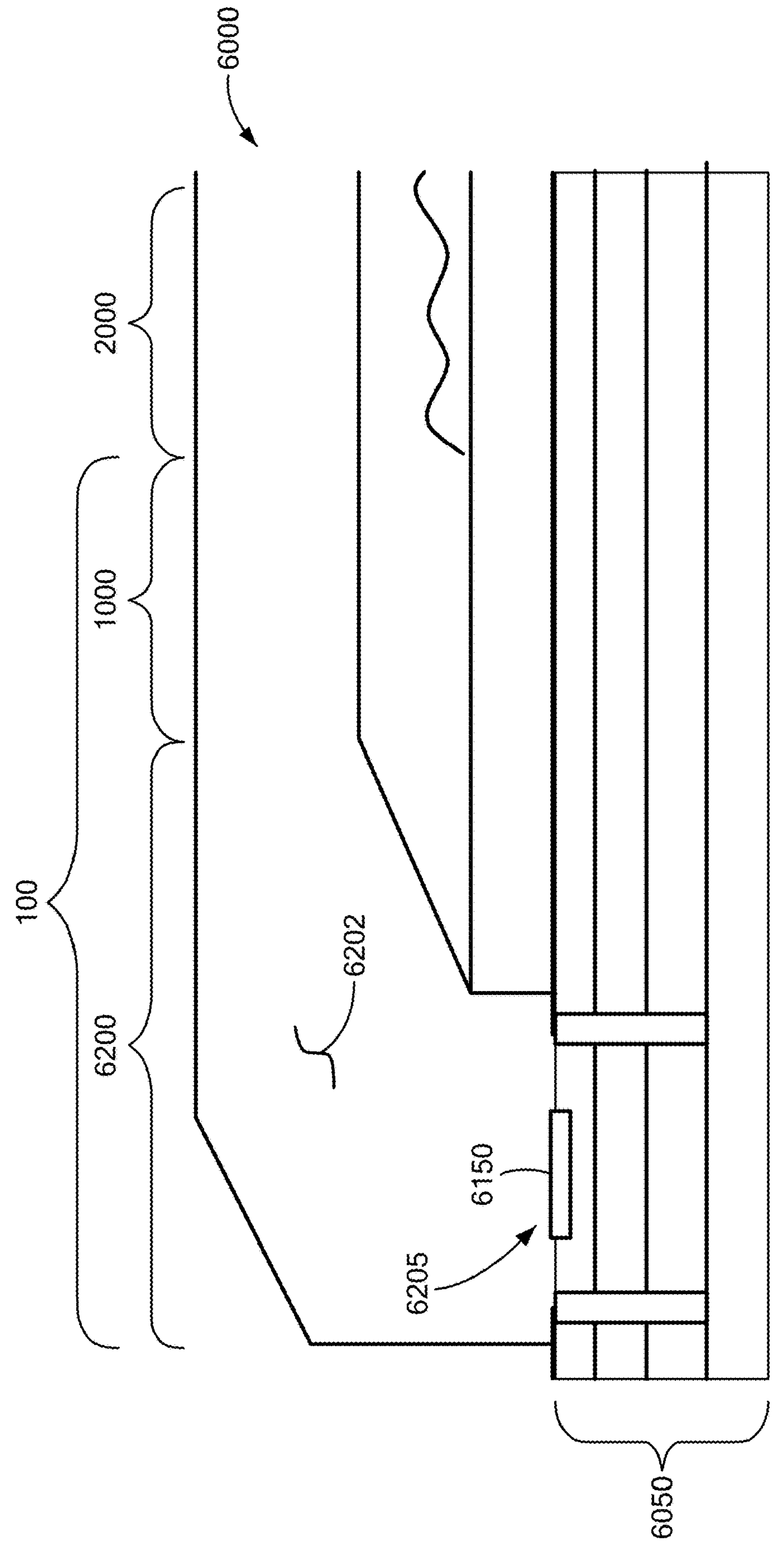
FIG. 18 depicts a block diagram side view of an example conceptual illustration of a patch, a transition waveguide with bend and transition losses, a trough waveguide with losses, and a trough waveguide antenna, in accordance with an embodiment.

FIG. 18 depicts a block diagram side view of an example conceptual system 6000 having a patch 6150 disposed on an underlying package 6050, a waveguide transition region 6200 with a bend 6202 and transition losses, which are analytically estimated at 0.7 dB, a TWG 1000 with losses, which are analytically estimated at 0.1 dB/inch, and a radiating element in the form of a TWGA 2000, all being electromagnetically coupled to each other. As depicted, and similar to other embodiments disclosed herein, a signal feed interface 6205 is disposed between the patch 6150 and the waveguide transition region 6200 to form part of an electromagnetic, EM, transition portion 100. In an embodiment, each EM transition portion 100 is configured to couple EM energy from the signal feed interface 6205 to a guided waveguide mode of EM energy to the TWG 1000 via the transition region 6200, and then to guide the electromagnetic energy to the TWGA 2000.

Figure 19:
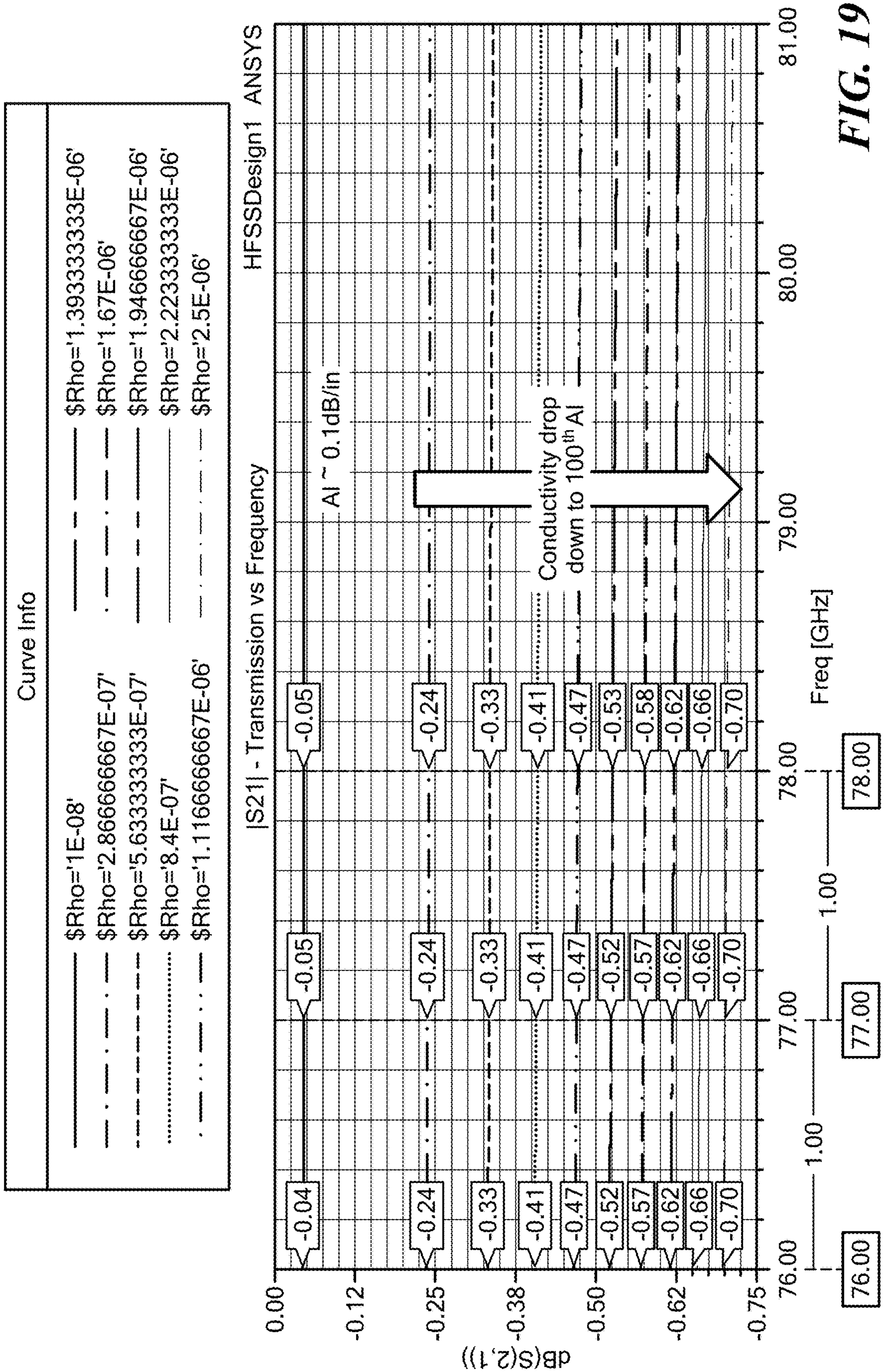
FIG. 19 depicts analytical modeling results of trough waveguide losses, in accordance with an embodiment.

FIG. 19 depicts example analytical modeling results of (S21) transmission losses versus frequency of an example ½-inch long TWG 1000. FIG. 19 illustrates the dependence of (S21) transmission losses versus metal conductivity. Al is Aluminum and the different curves represent the drop of (S21) transmission loss for different metals (i.e., conductivity with respect to Aluminum).

Figure 20A:
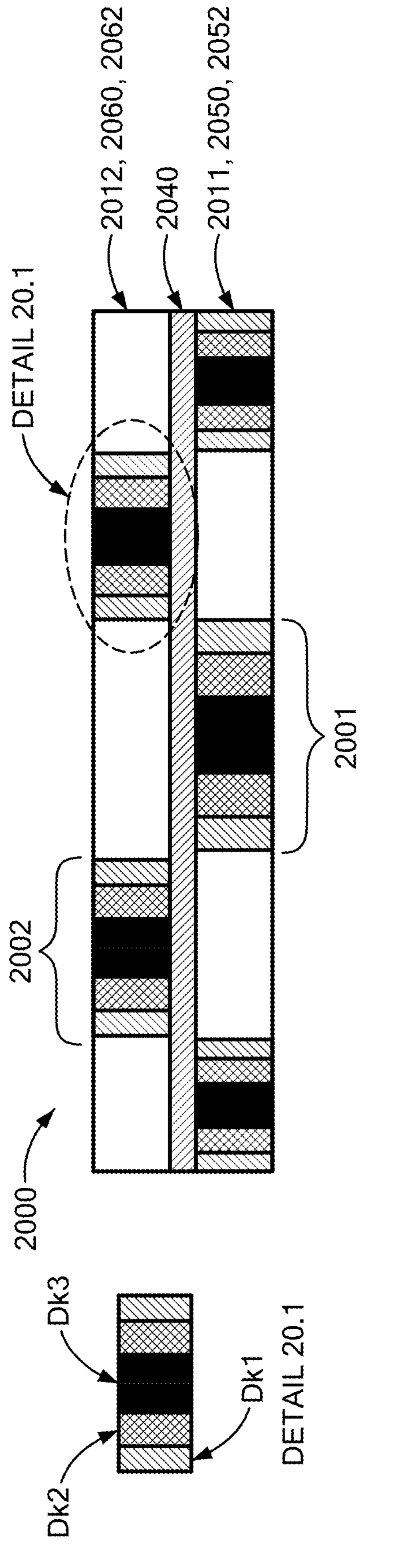
FIGS. 20A and 20B depict example top down block diagram plan views of conceptual models for controlling radiation off of dielectric discontinuities of a trough waveguide antenna, in accordance with an embodiment.
Figure 20B:
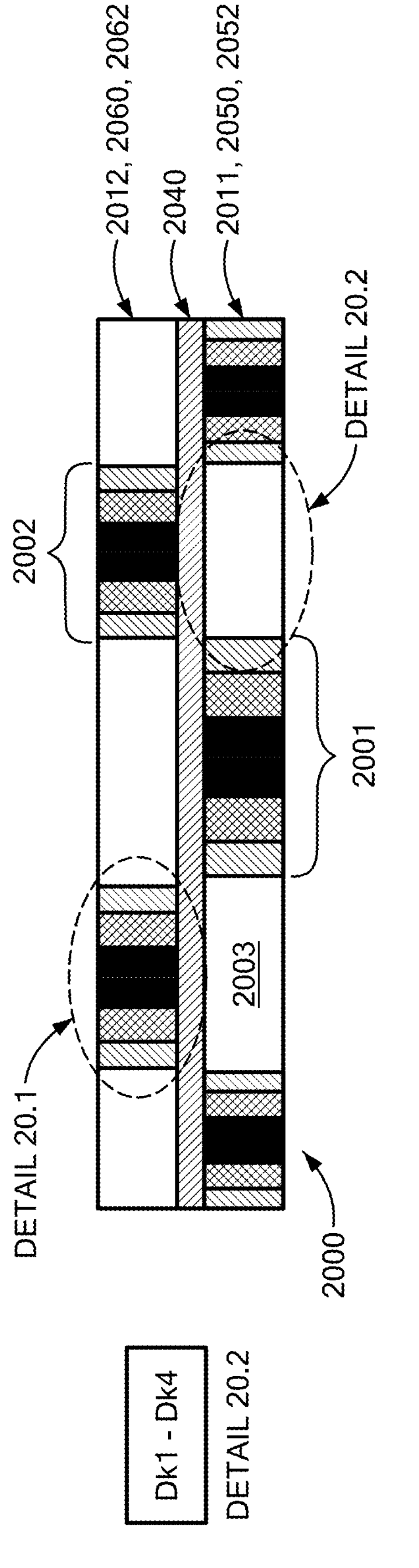

FIGS. 20A and 20B depict example top down block diagram plan views of conceptual models for controlling radiation off of dielectric discontinuities of a TWGA 2000 having bases 2050, 2060 separated by a septum 2040, where the bases 2050, 2060 may or may not have curved paths 2011, 2012 with undulations 2052, 2062, but which do include discrete dielectric radiating elements 2001, 2002 that have varying dielectric constants along the direction of propagation of an EM wave. Comparing the embodiments of FIGS. 20A and 20B, each radiating element 2001, 2002, may be separated by air to provide individual radiating elements (FIG. 20A), or may be conjoined via an intervening dielectric medium 2003 (see DETAIL-20.1) to provide a single unitary construct (FIG. 20B), As depicted in Detail-20.1, the individual radiating elements 2001, 2002 may be composed of different dielectric constants that vary in Dk value in the direction of propagation of an EM wave, and in an embodiment may vary according to the following pattern of dielectric constants values; Dk1–Dk2–Dk3–Dk2–Dk1. In an embodiment, Dk1<Dk2<Dk3, however, it is not necessary for the Dk values to follow an ascending or descending order, just that there is a contrast between adjacent ones of the discrete Dk values. As depicted in Detail-20.2, the intervening dielectric medium 2003 has a dielectric constant value Dk4 that is contrastingly different from Dk1–Dk3. In an embodiment, Dk4 is substantially less than any one of Dk1, Dk2, and Dk3, with a dielectric constant differential between Dk4 and any one of Dk1, Dk2, or Dk3, of at least 3.

Figure 21A:
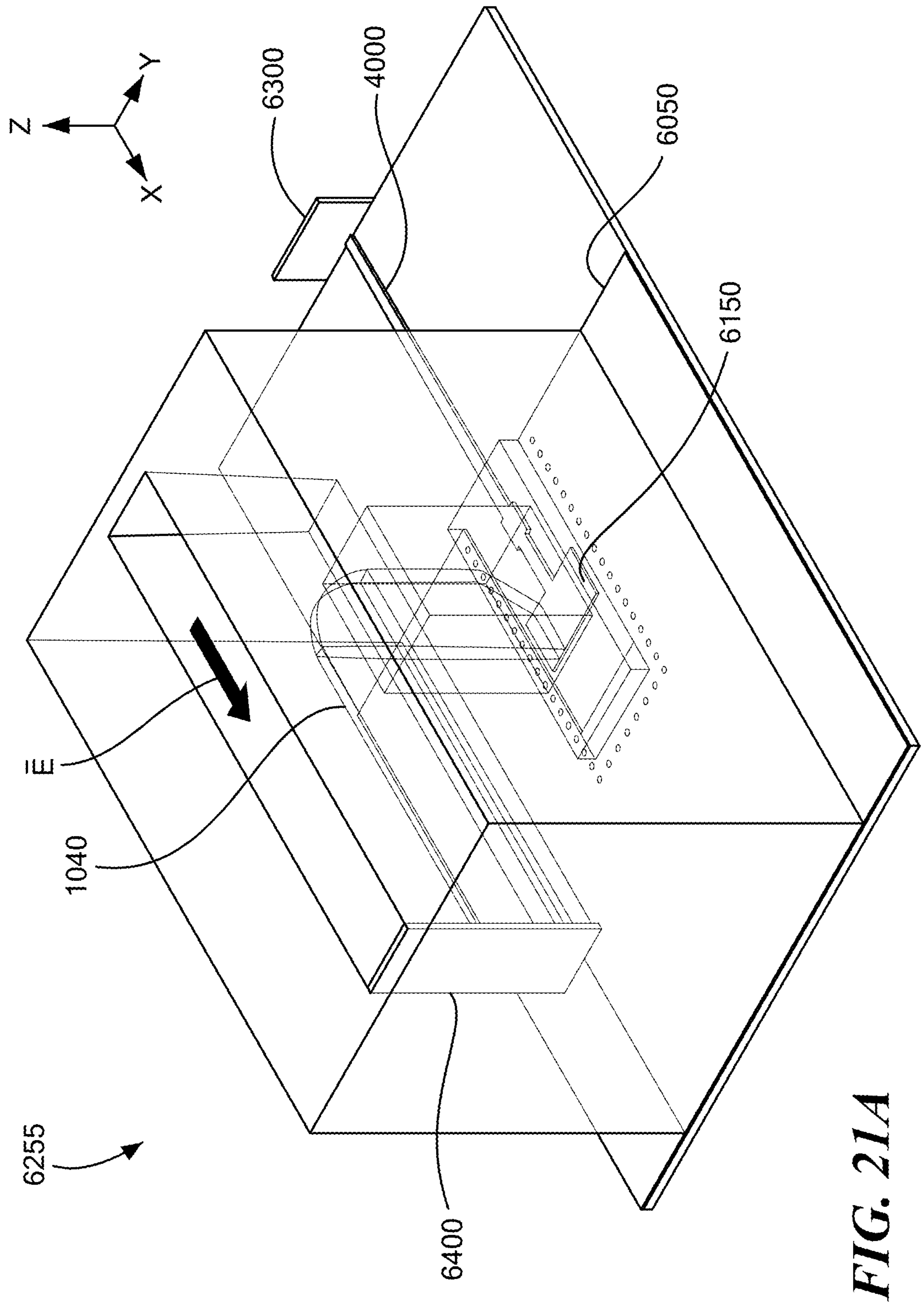
FIGS. 21A, 21B, and 21C, respectively depict a rotated isometric transparent view, a top down transparent plan view, and a transparent side view, of a first patch-to-trough waveguide transition where the patch E-polarization is parallel with the septum, in accordance with an embodiment.
Figure 21C:
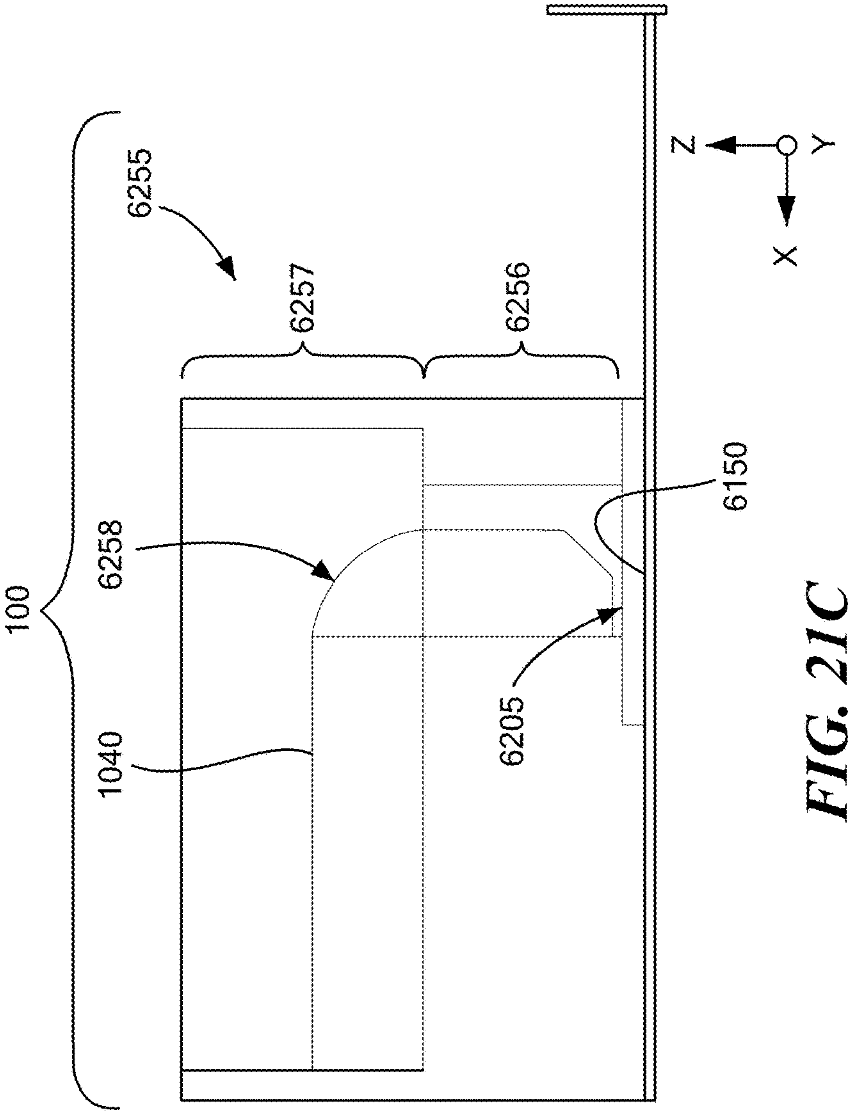
Figure 21B:
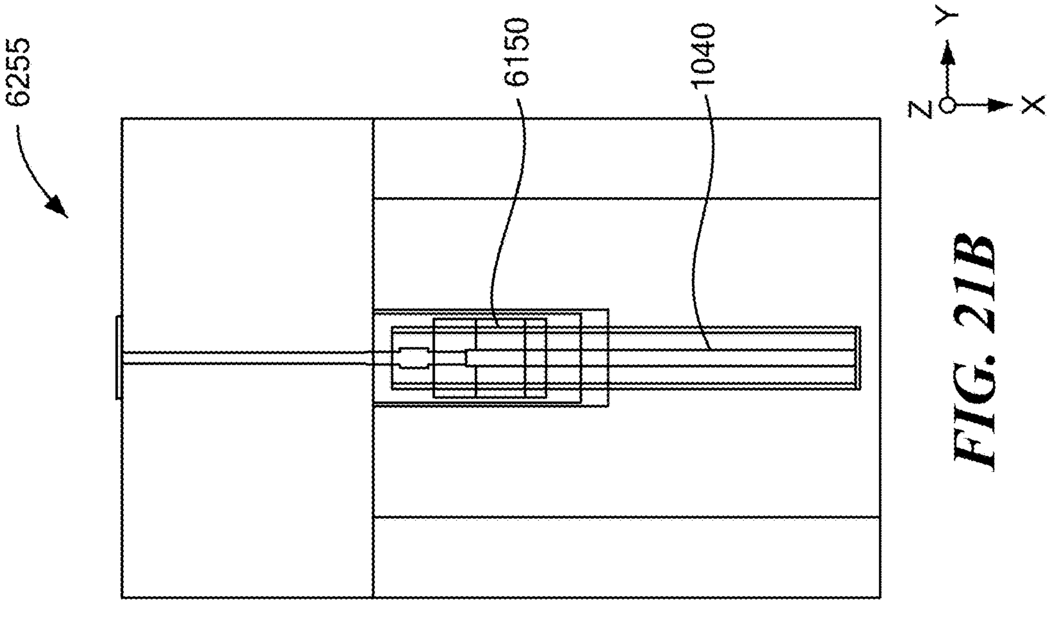

FIGS. 21A, 21B, and 21C, respectively depict; a rotated isometric transparent view, a transparent top-down view, and a transparent side view, of a first patch-to-trough waveguide transition 6255 where the E-polarization (E) of the patch 6150 is parallel with the septum 1040, and where a ridge waveguide 6256 is disposed between the patch 6150 and a trough-waveguide 6257 which in combination form the first patch-to-trough waveguide transition 6255. Here, the trough-waveguide 6257 includes a bend 6258, which will not radiate EM energy as long as symmetry is retained along the trough-waveguide cross-section, and the profile of the septum 1040 across the bend maintains a constant wave impedance along the bend, which can be accomplished in accordance with an embodiment of structure disclosed herein. FIG. 21A also depicts an input port 6300 and an output port 6400, which were used for analytical modeling purposes to establish the performance characteristics depicted in FIG. 23 discussed below. In the embodiment of FIG. 21A, the patch 6150 is fed by a microstrip line (generally referred to by reference numeral 4000) from the side of the waveguide, edgewise with respect to the patch 6150, and in line with the septum 1040, which produces the desire E-polarization parallel with the septum 1040. Appropriate electrical clearance is provided to allow the microstrip to connect with the patch 6150 without being shorted, and where the impedance of the stripline is the same as and matched to the feed line. Alternatively, the patch 6150 of FIG. 21A can also be fed by a coax port from underneath without material changes to the design. As depicted in FIG. 21C, and similar to other embodiments disclosed herein, a signal feed interface 6205 is disposed between the patch 6150 and the ridge waveguide 6256 to form part of an electromagnetic, EM, transition portion 100, which also includes the trough-waveguide 6257. In an embodiment, each EM transition portion 100 is configured to couple EM energy from the signal feed interface 6205 to a guided waveguide mode of EM energy to the trough-waveguide 6257 via the ridge waveguide 6257, and then to guide the electromagnetic energy to a TWGA 2000 (not specifically shown in FIG. 21C).

Figure 22A:
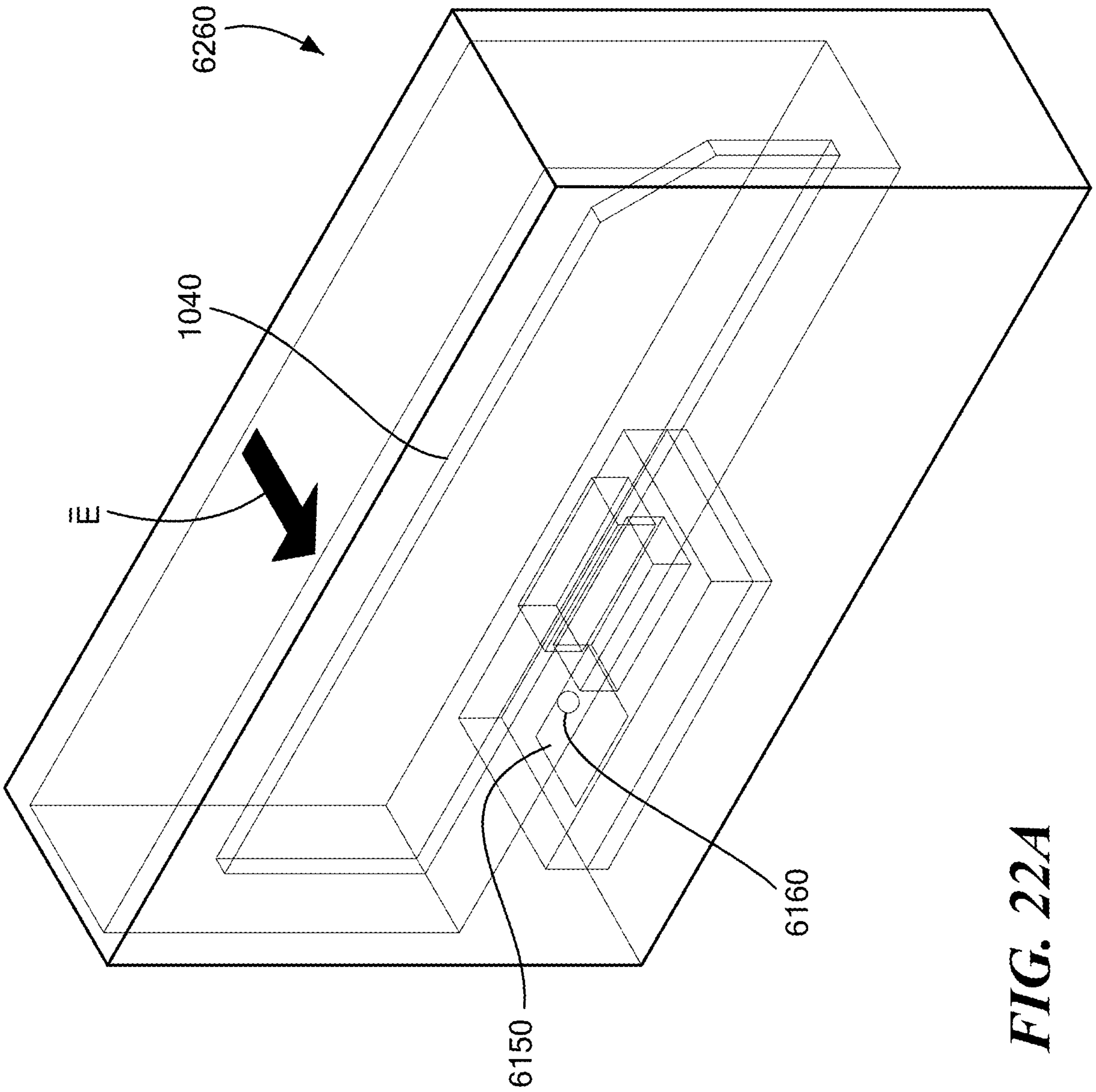
FIGS. 22A, 22B, and 22C, depict rotated isometric transparent views, in various levels of detail, of a second patch-to-trough waveguide transition where the patch E-polarization is perpendicular with the septum, in accordance with an embodiment.
Figure 22C:
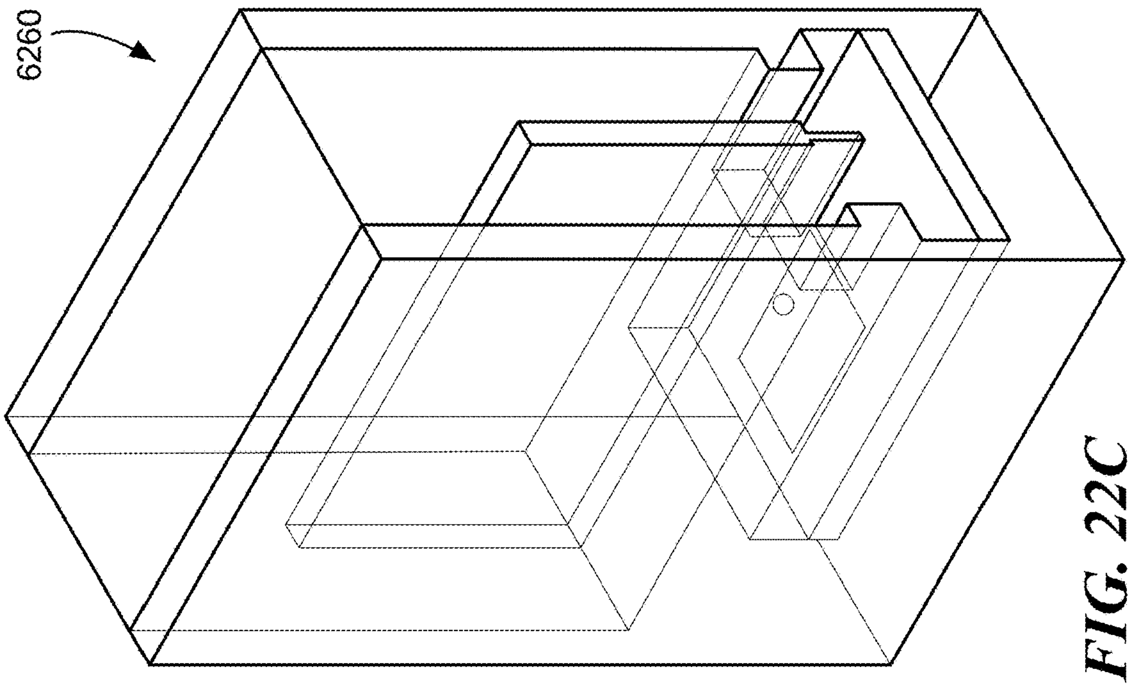
Figure 22B:
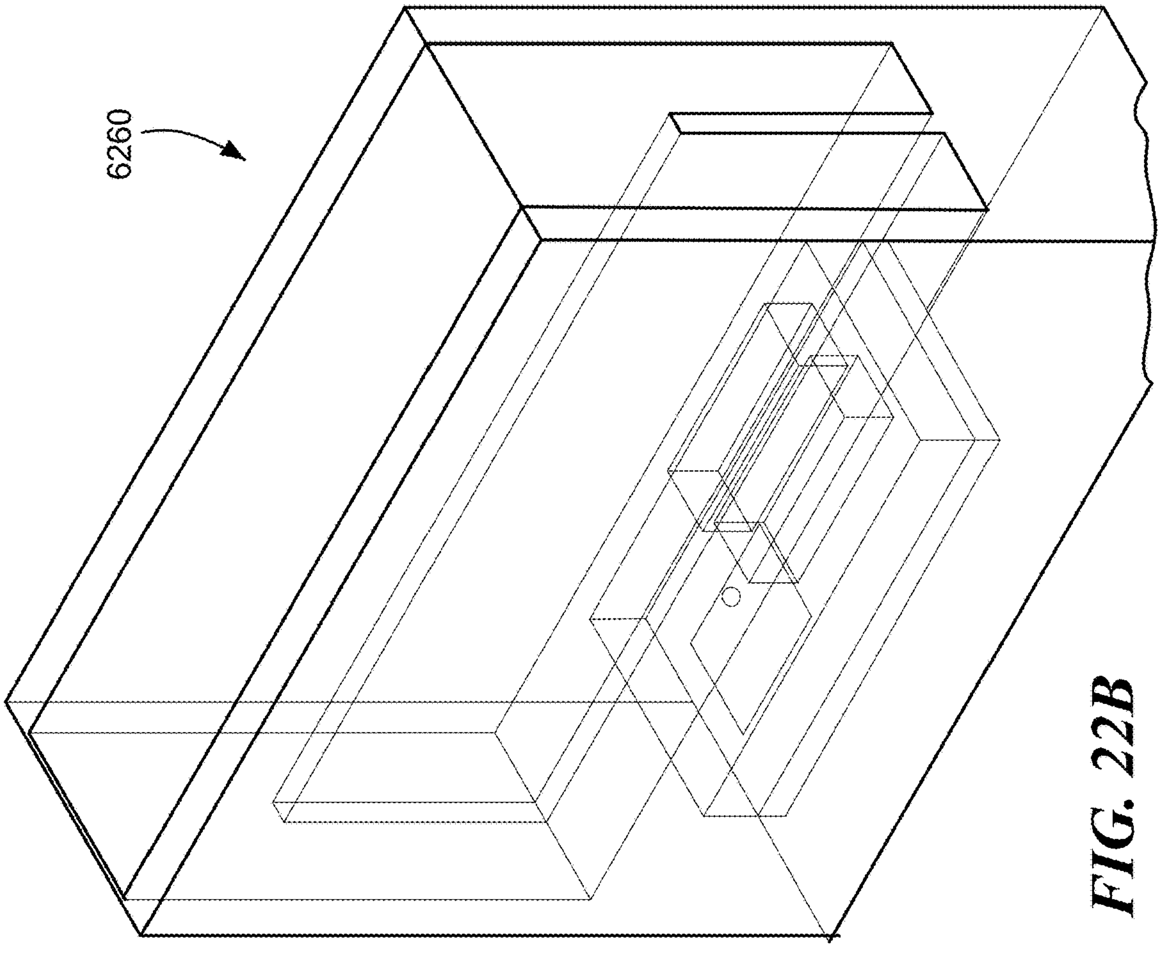

FIGS. 22A, 22B, and 22C, depict rotated isometric transparent views, in various levels of detail, of a second patch-to-trough waveguide transition 6260 where the E-polarization of the patch 6150 is perpendicular with the septum 1040. As can be seen in FIGS. 22A-22C, a signal probe 6160 is edgewise located with respect to the patch 6150 (i.e., the signal probe 6160 is disposed proximate an edge of the patch

6150), and sideways offset from the septum 1040 (i.e., the signal probe 6160 is not in-line with the septum 1040 like it is in FIGS. 21A-21C), to produce the desired E-polarization perpendicular with the septum 1040.

It is contemplated that the geometries of FIGS. 21A-21C and 22A-22C are castable or moldable, with appropriate draft angles included that would typically be included by one skilled in the art of casting or molding techniques suitable for a purpose disclosed herein.

Figure 23:
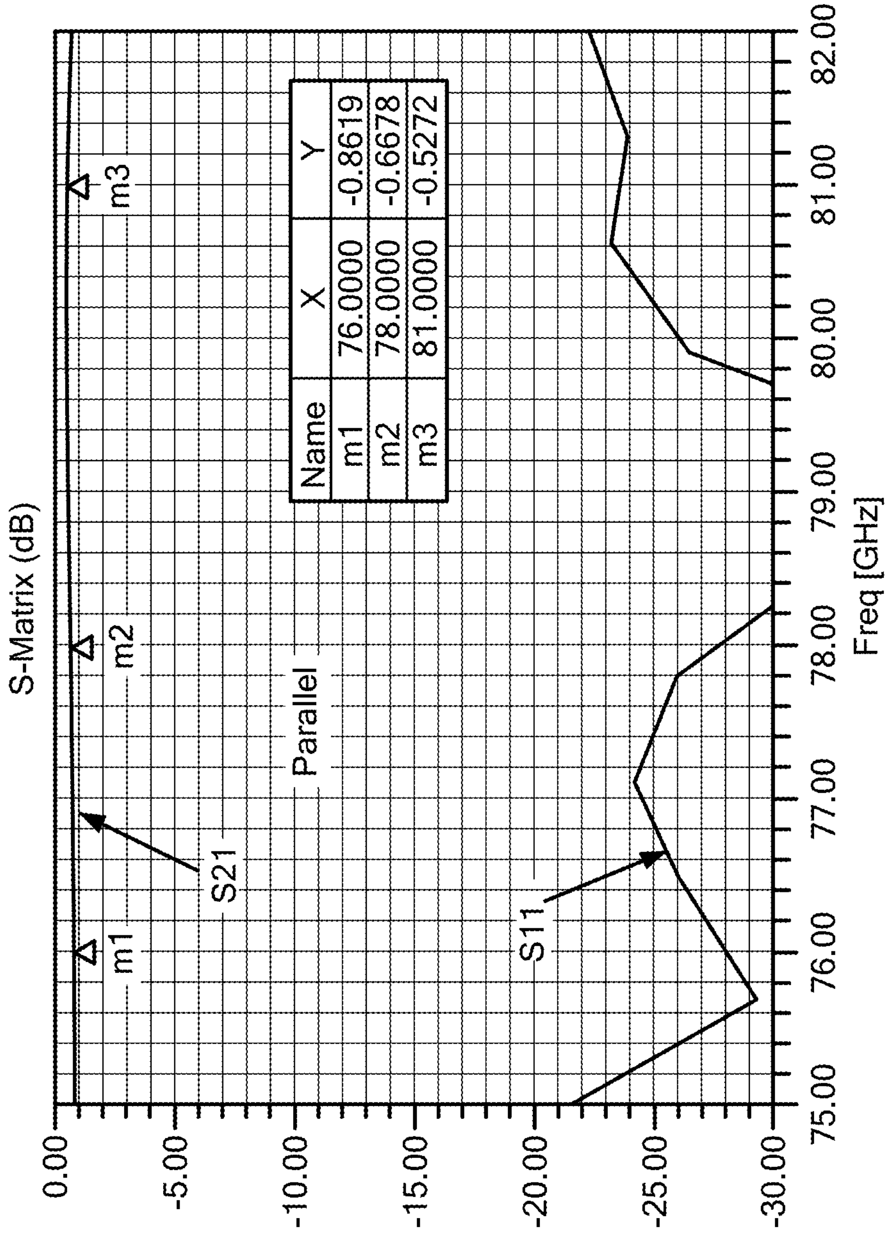
FIG. 23 depicts the performance characteristics of the patch-to-trough waveguide transition depicted in FIGS. 21A-21C, in accordance with an embodiment.

FIG. 23 depicts the S(1, 1) and S(1, 2) analytical performance characteristics of the patch-to-trough waveguide transition 6255 depicted in FIG. 21A.

Reference is now made to FIGS. 24-29, which in general relate to an example feed arrangement for an example waveguide antenna system.

Figure 24:
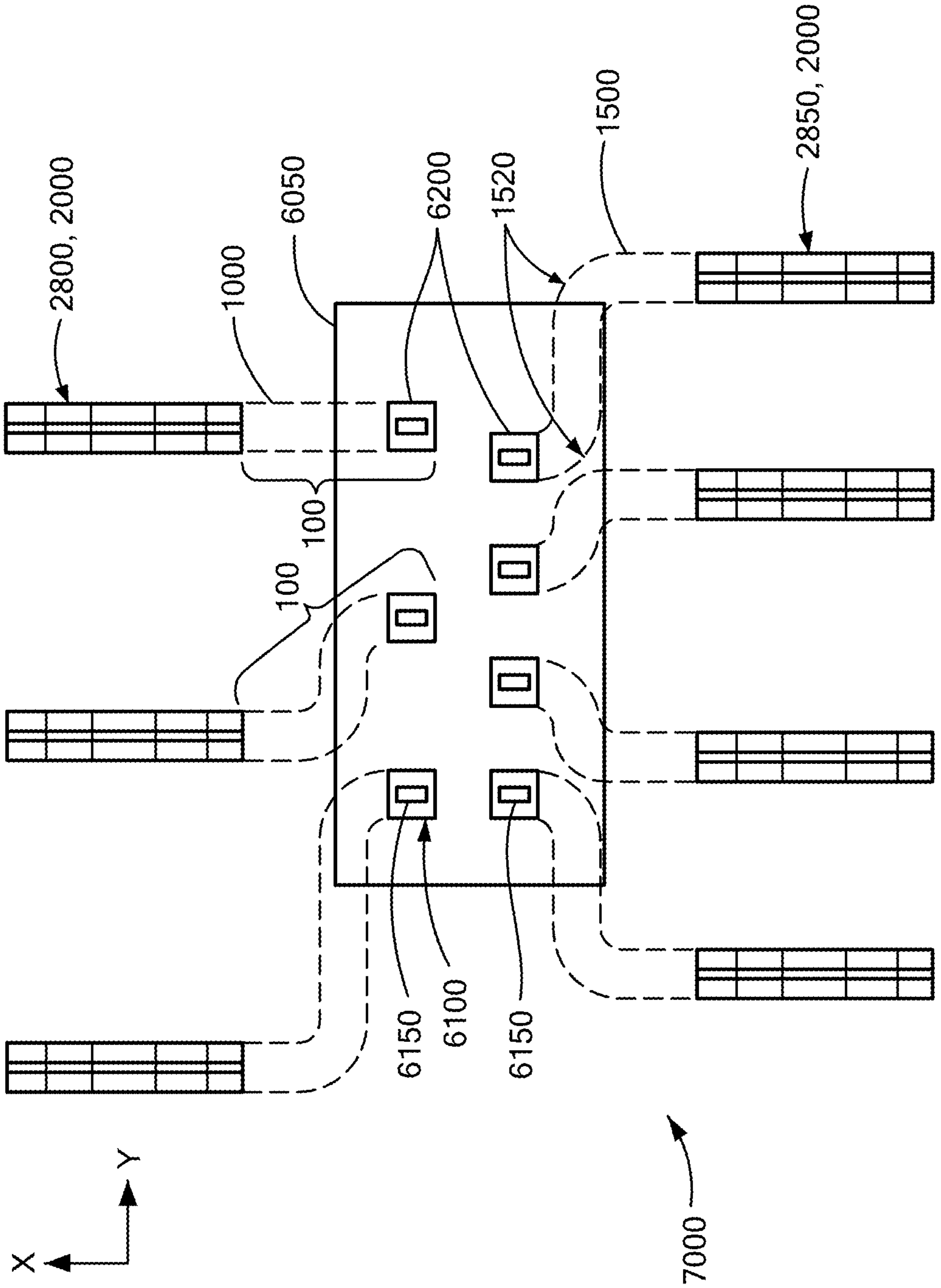
FIG. 24 depicts an example waveguide antenna system having an open waveguide and a leaky waveguide antenna and configured for antenna-on-package applications, in accordance with an embodiment.
Figure 25B:
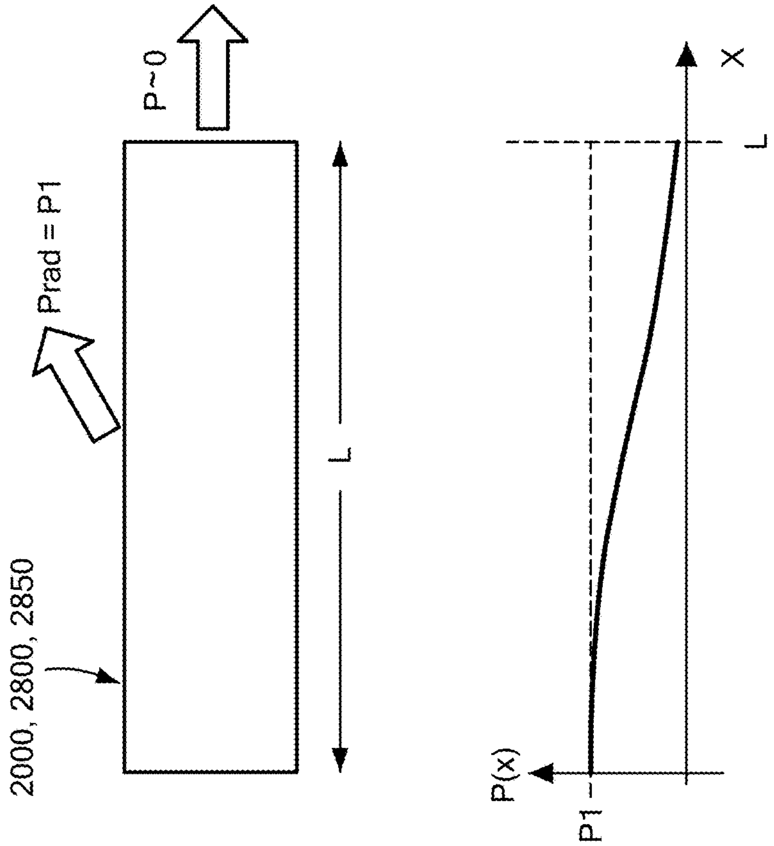
FIGS. 25A and 25B depict block diagram representations of a fundamental difference between the open waveguide (FIG. 25A) and the leaky waveguide antenna (FIG. 25B) of the system of FIG. 24, in accordance with an embodiment.
Figure 25A:
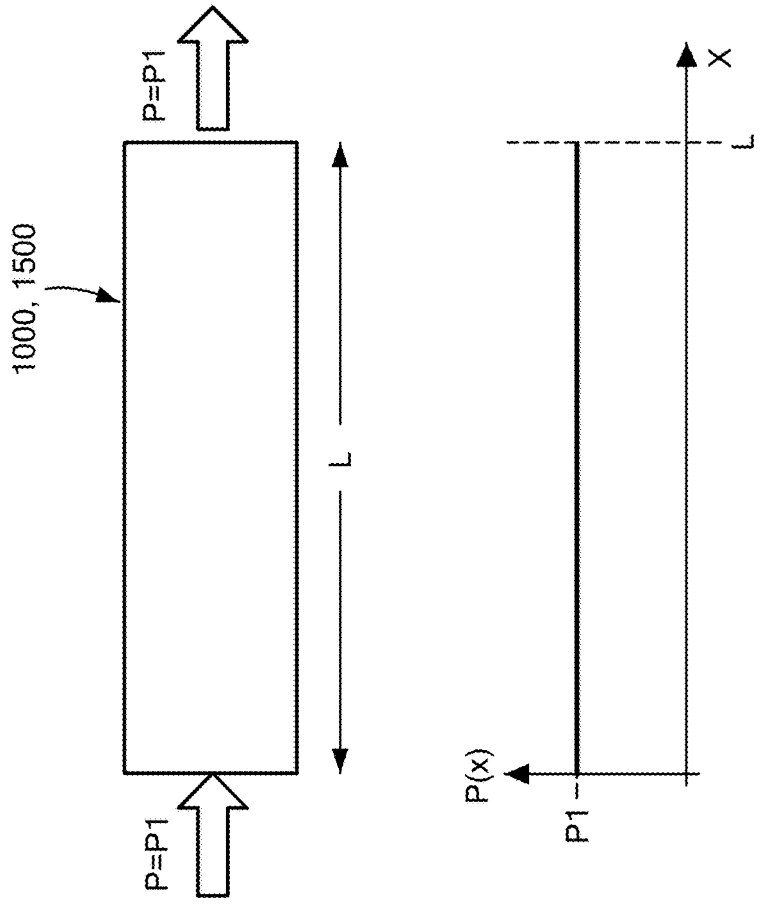

FIG. 24 depicts an example waveguide antenna system 7000, similar to the TWGA system 6000 of FIG. 11 for example where like elements are numbered alike, having an open waveguide 1000, 1500 and a leaky waveguide antenna 2800, 2850, and configured for antenna-on-package 6100 applications, where a desired electromagnetic structure for such a system 7000 is one that can be fed by a low loss waveguide or transmission line, and implemented in an in-series fashion. As depicted, the open waveguide may be an open TWG 1000 absent any bends, or an open TWG 1500 with one or more bends 1520. Such a construct may be advantageous for use in automotive radar antennas, which are desirably arranged relatively far away from the radar MMICs, where cost and complexity of fabrication and implementation are of consideration. A generic form of such a desired electromagnetic structure is an open waveguide 1000, 1500 (generally referred to by reference numeral 1000) feeding a leaky waveguide antenna 2000, 2800, 2850 (generally referred to by reference numeral 2000). These two elements are drastically different from each other because the former aims at keeping all electromagnetic energy confined within its neighborhood, while the latter aims at swiftly converting the electromagnetic energy at its feed point into radiation, which is depicted in FIGS. 25A and 25B, where FIGS. 25A and 25B depict block diagram representations of a fundamental difference between the open waveguide 1000 (reference to FIG. 25A), and the leaky waveguide antenna 2000 (reference to FIG. of 25B), which may be implemented in the system 7000 of FIG. 24. A basic difference between these two elements (i.e., open waveguide, and leaky waveguide antenna) is the type of electromagnetic waves that each structure can support, that is, guided waves for a waveguide 1000 (Power-In equals P1, and Power-Out equals (substantially equals) P1), and leaky waves for the antenna 2000 (Power-In equals P1, Power-Radiated equals (substantially equals) P1, and Power-Out equals (substantially equals) zero). As depicted in FIG. 24, and similar to other embodiments disclosed herein, an EM transition portion 100 includes the waveguide transition region 6200 and the TWG 1000, and is configured to couple EM energy from the signal feed interface 6205 to a guided waveguide mode of EM energy to the TWG 1000 via the path 6150, and then to guide the electromagnetic energy to a TWGA 2000.

Figure 26:
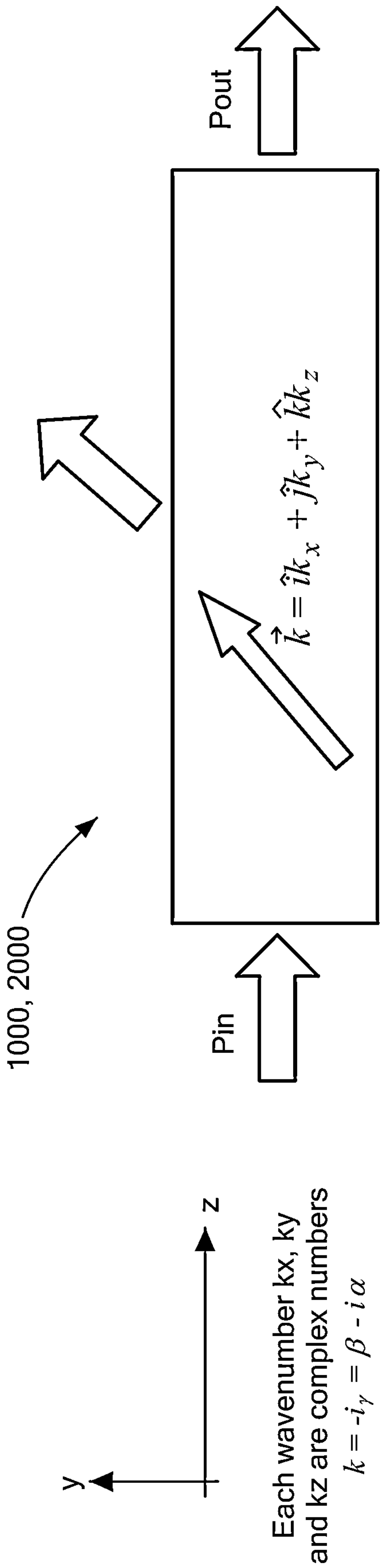
FIG. 26 depicts an example guided wave with a given propagation constant $\vec{k}=\hat{i}k_x+\hat{j}k_y+\hat{k}k_z$, in accordance with an embodiment.

Reference is now made to FIG. 26, which depicts an example guided wave. Guided waves are waves with a given propagation constant $\vec{k}=\hat{i}k_x+\hat{j}k_y+\hat{k}k_z$, where $\hat{i}$, $\hat{j}$ and $\hat{k}$ are the conventional cartesian coordinate unit vectors, and where each wavenumber kx, ky, and kz, are complex numbers according to the following equation: $k=-i\gamma=\beta-i\alpha$, where $\beta$ represents the phase response of the waveguide/antenna, $\alpha$ represents the amount of leakage across the waveguide/antenna, and $\gamma$ is referred to as propagation constant. In the direction of propagation along the z-axis, kz is purely imaginary (aside from material losses), and a propagation constant in the transverse direction (ky) along the interphase of the waveguide is purely real (evanescent). Leaky waveguide antennas, on the other hand, have a propagation constant kz that is complex, where the real part accounts for the loss to radiation. The propagation in the transverse direction is also complex which indicates that these waves radiate.

Figure 27:
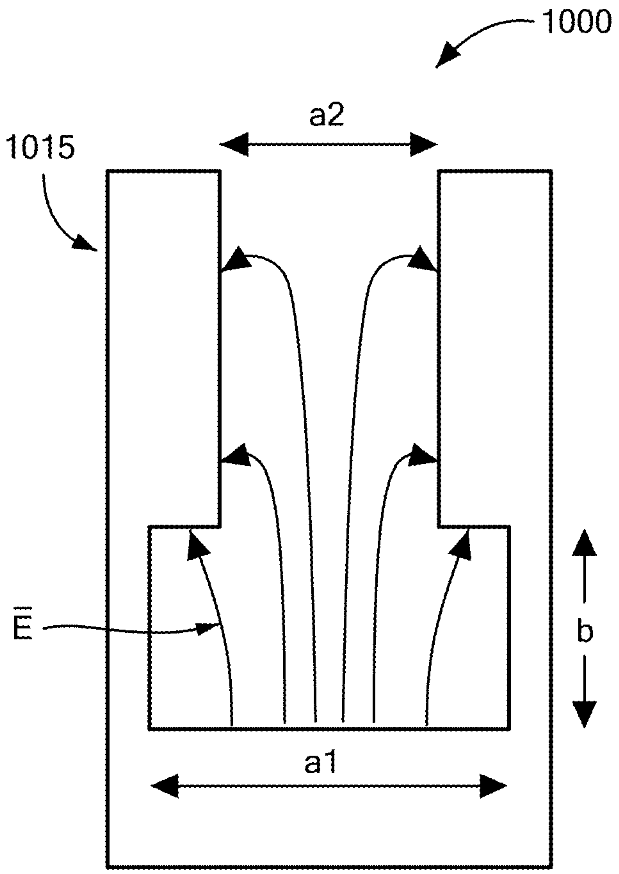
FIG. 27 depicts a groove waveguide as an example of an open type of waveguide, in accordance with an embodiment.

A guided wave, by definition, does not radiate and can be obtained in a myriad of ways. For example, a rectangular dielectric waveguide that confines the energy within its dielectric, or a rectangular metallic waveguide that confines the energy within its metallic walls. An open waveguide is simply a metallic structure that guides waves and is open at one or more of its ends or sides. The only requirement for an open type of waveguide 1000 is for it to support a guided waveguide mode. A groove waveguide 1015 having dimensions a1, a2, and b is an example of an open type of waveguide, as depicted in FIG. 27. The main advantage of this type of waveguide is its low loss nature and potential cost-effective way of fabrication. An E-field guided mode of the groove waveguide 1015 is represented in FIG. 27 by arrowheads E.

Figure 28B:
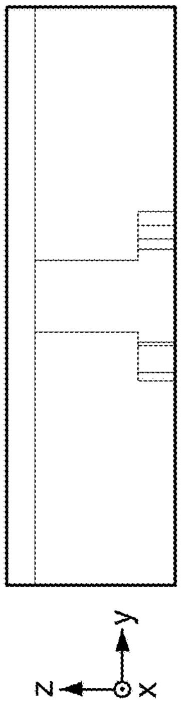
FIGS. 28A, 28B, and 28C, respectively depict a top down view, a front transparent view, and a side transparent view, of an open groove waveguide and leaky waveguide antenna, in accordance with an embodiment.
Figure 28C:
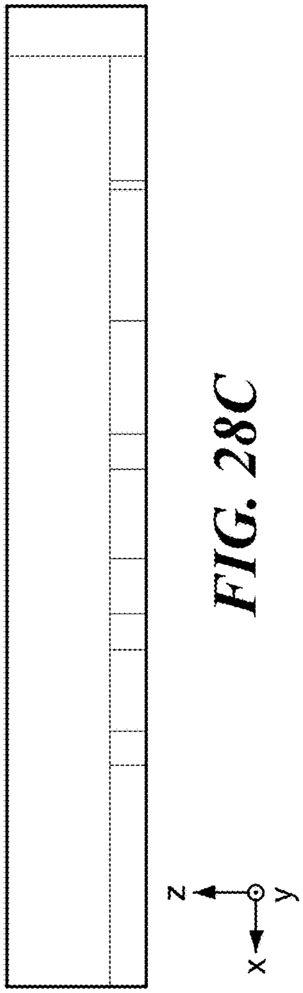
Figure 28A:
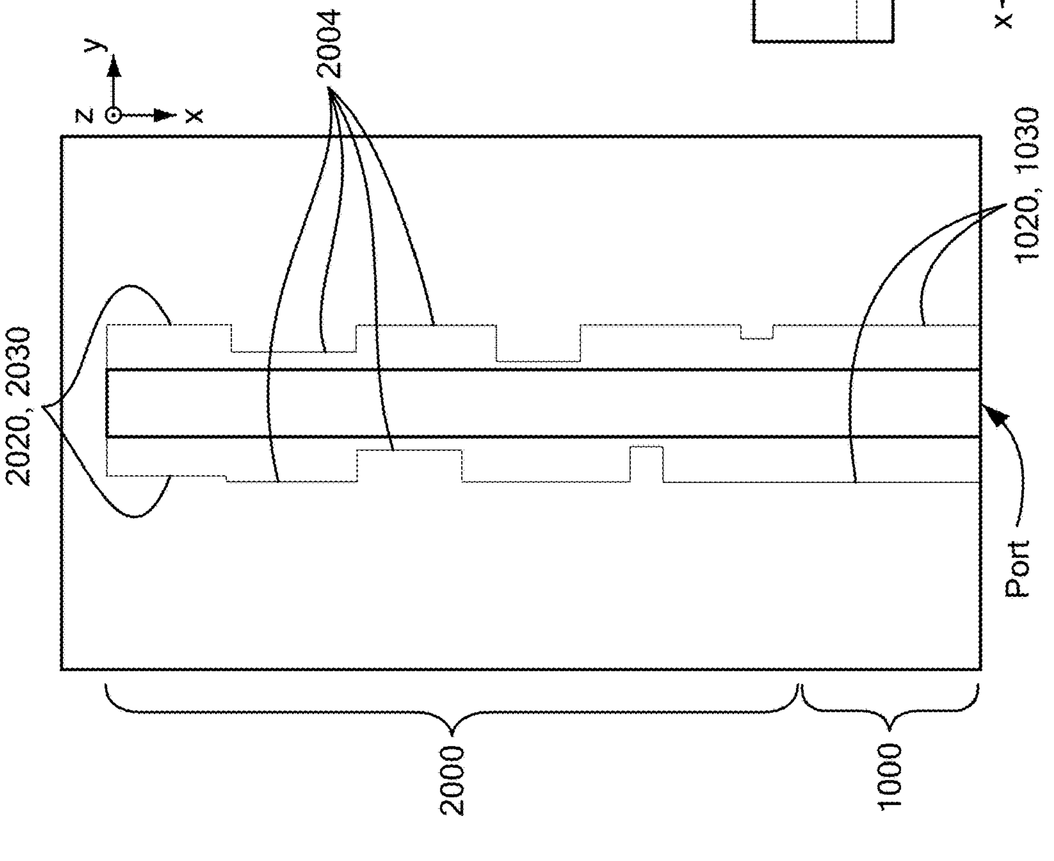
Figure 29:
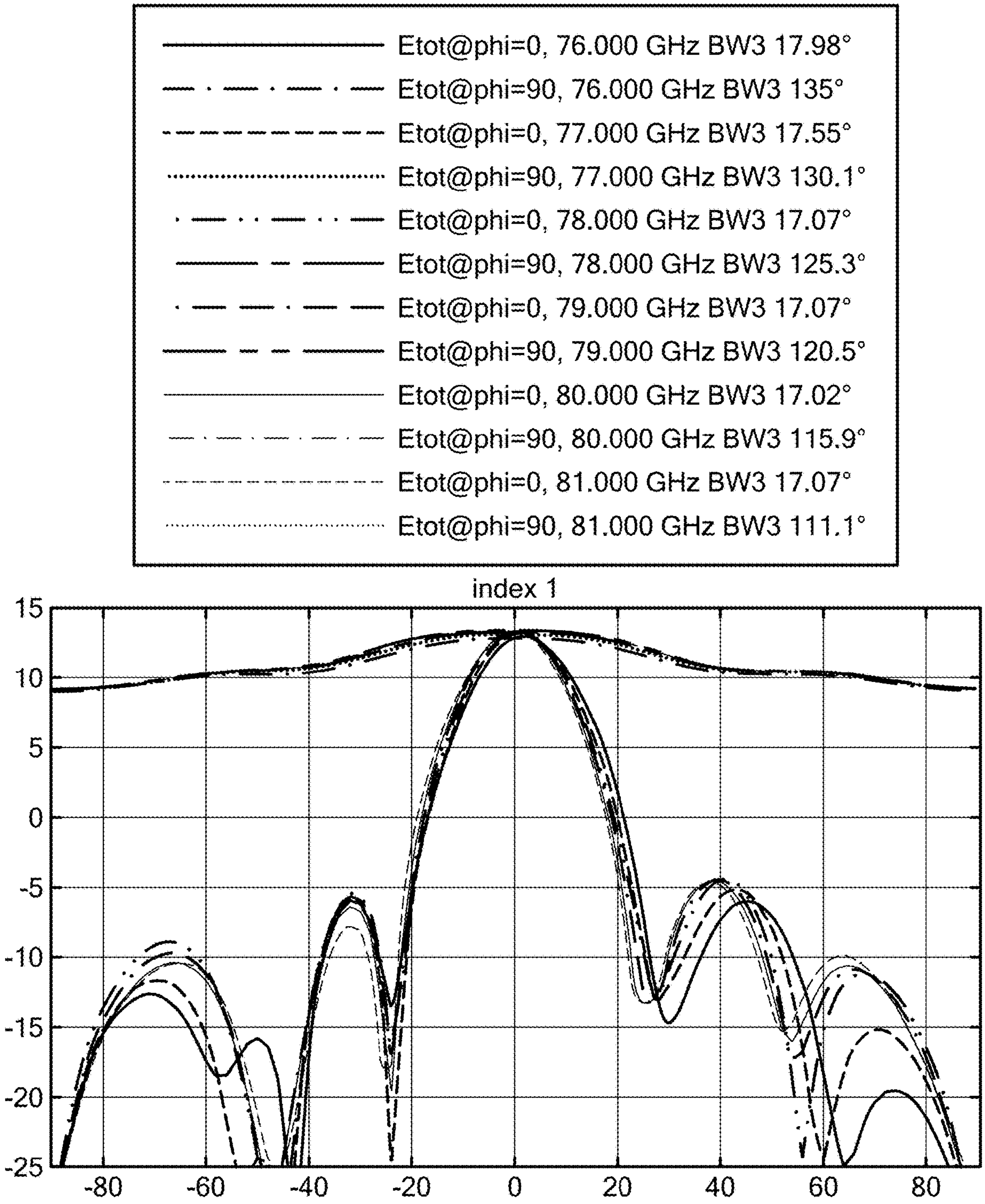
FIG. 29 depicts radiation performance characteristics of the open groove waveguide leaky antenna of FIG. 28A, in accordance with an embodiment.

An open waveguide 1000 is a natural guiding structure to electromagnetically couple with and feed a leaky waveguide antenna 2000. A leaky waveguide antenna works by properly designing the amount of leakage (alpha) across the antenna along with the phase response (beta) (see alpha, a, and beta, p, in FIG. 26 for example). Both can be designed so that the radiated beam is of certain characteristics, i.e. direction, beamwidth, sidelobe levels, and pattern shape. An example of this type of antenna structure having an open waveguide 1000 electromagnetically coupled to and feeding a leaky waveguide antenna 2000 is depicted in FIGS. 28A, 28B, and 28C, which respectively depict a top down view, a front transparent view, and a side transparent view, of an open groove waveguide 1000 electromagnetically coupled to and feeding a leaky waveguide antenna 2000, with its radiation performance characteristics being depicted in FIG. 29. As can be seen in at least FIG. 28A, sidewalls 1020, 1030 of the waveguide 1000 are absent electromagnetic interference features, while sidewalls 2020, 2030 of the leaky waveguide antenna 2000 include electromagnetic radiation enhancing features 2004 (comparable to undulations 2052, 2062 for example) configured to provide a desired radiation loss via the leaky waveguide antenna 2000.

Reference is now made to FIGS. 30-31 and 33-50, which in general relate to example waveguide launch structures and associated transition regions, and example waveguide radiation correction features, for an example waveguide antenna system as disclosed herein.

Figure 30:
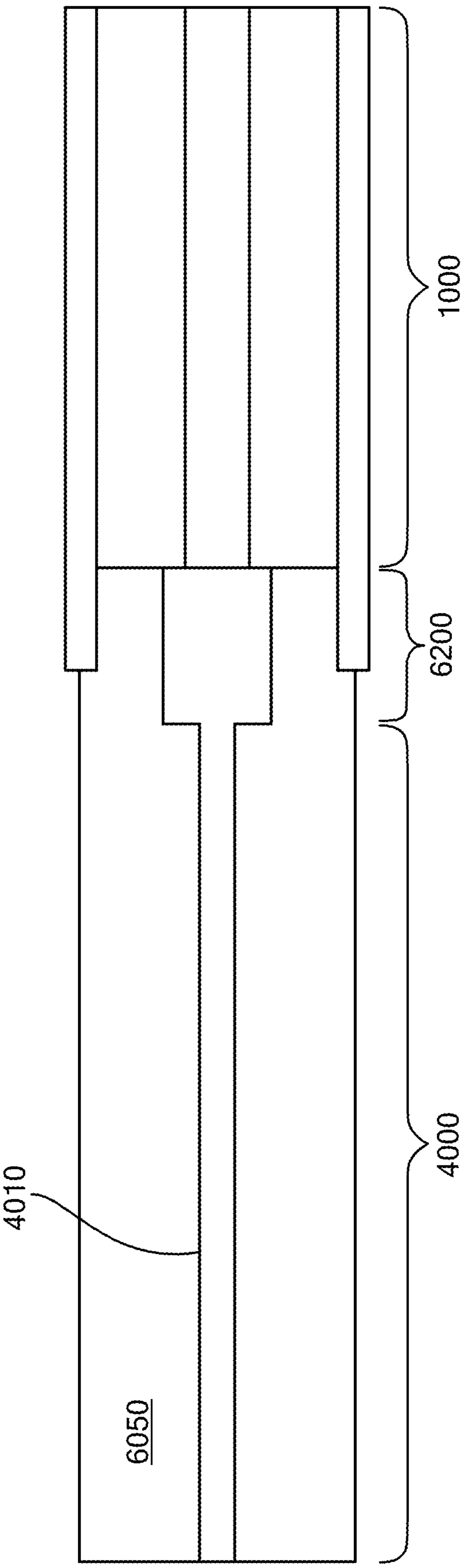
FIG. 30 depicts a block diagram top down plan view of an example transition region between an electromagnetic transmission line and an open waveguide, in accordance with an embodiment.

FIG. 30 depicts a block diagram top down plan view of an example transition region 6200 between a signal feed 4000 in the form of an electromagnetic transmission line 4010 on an underlying package 6050 such as printed circuit board (PCB), and an open waveguide 1000. In an embodiment, the PCB transmission line may be a coplanar waveguide (CPW), a microstrip, or a stripline. Here, the transition region 6200 is in the form of an edge feed to the open waveguide 1000.

Figure 31:
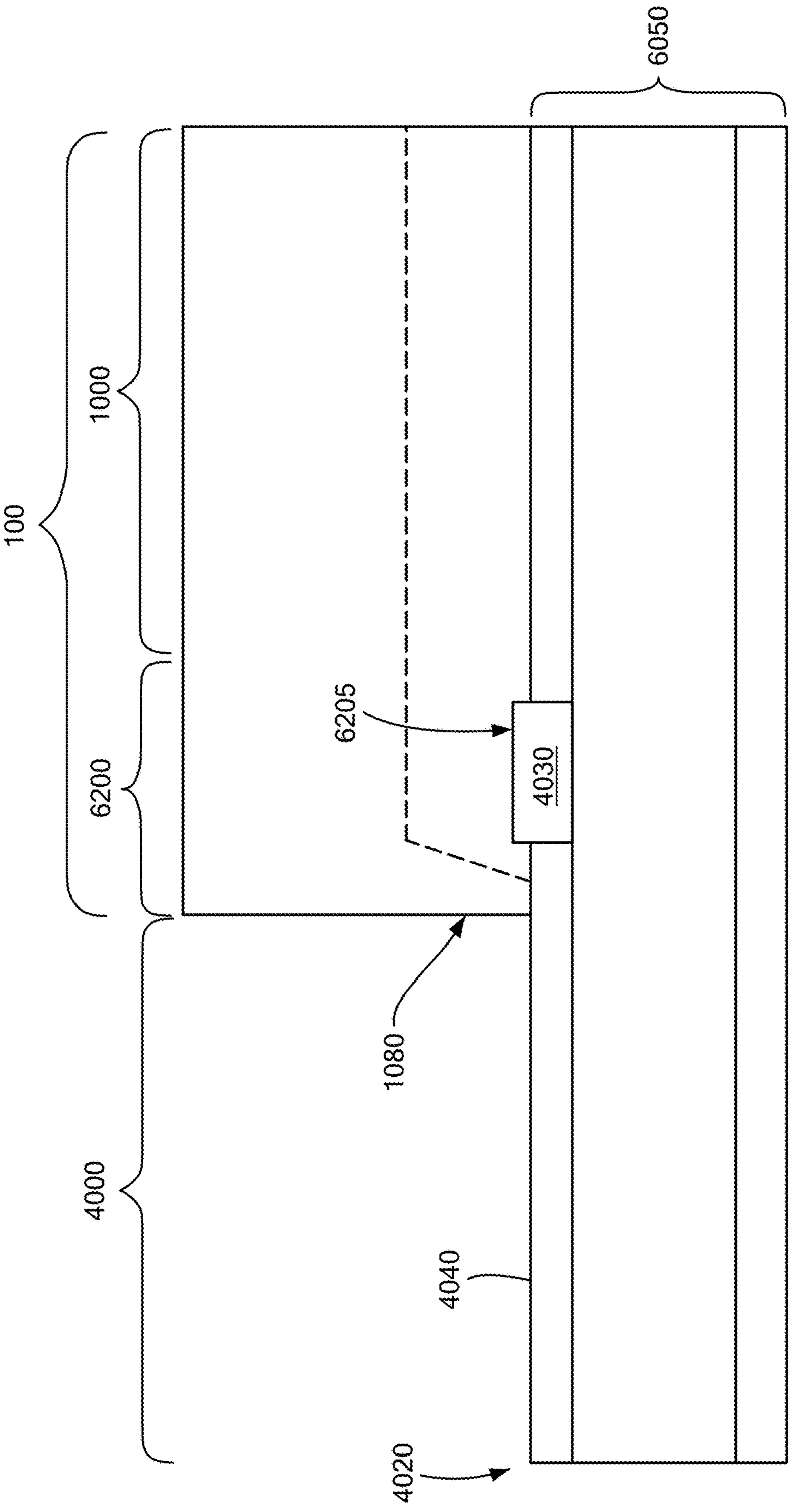
FIG. 31 depicts a block diagram side view of another example transition region between an electromagnetic transmission line and an open waveguide, in accordance with an embodiment.

FIG. 31 depicts a block diagram side view of another example transition region 6200 between a signal feed 4000 in the form of an electromagnetic transmission line 4020 on an underlying package 6050 such as a PCB, and an open waveguide 1000. In an embodiment, the PCB transmission line may be a substrate integrated waveguide (SIW), a stripline, or a CPW. Here, the transition region 6200 is in the form of capacitive or inductive coupling through a slot/aperture 4030 on the electrically conductive surface 4040 of the PCB transmission line 4020 proximate a signal input end 1080 of the open waveguide 1000. As depicted in FIG. 31, and similar to other embodiments disclosed herein, a signal feed interface 6205 is disposed between the signal feed 4000 and the transition region 6200 to form part of an electromagnetic, EM, transition portion 100, which also includes the open waveguide 1000. In an embodiment, each the EM transition portion 100 is configured to couple EM energy from the signal feed interface 6205 to a guided waveguide mode of EM energy to the open waveguide section 1000 via the transition region 6200, and then to guide the electromagnetic energy to a TWGA 2000 (not specifically shown in FIG. 31).

Figure 32A:
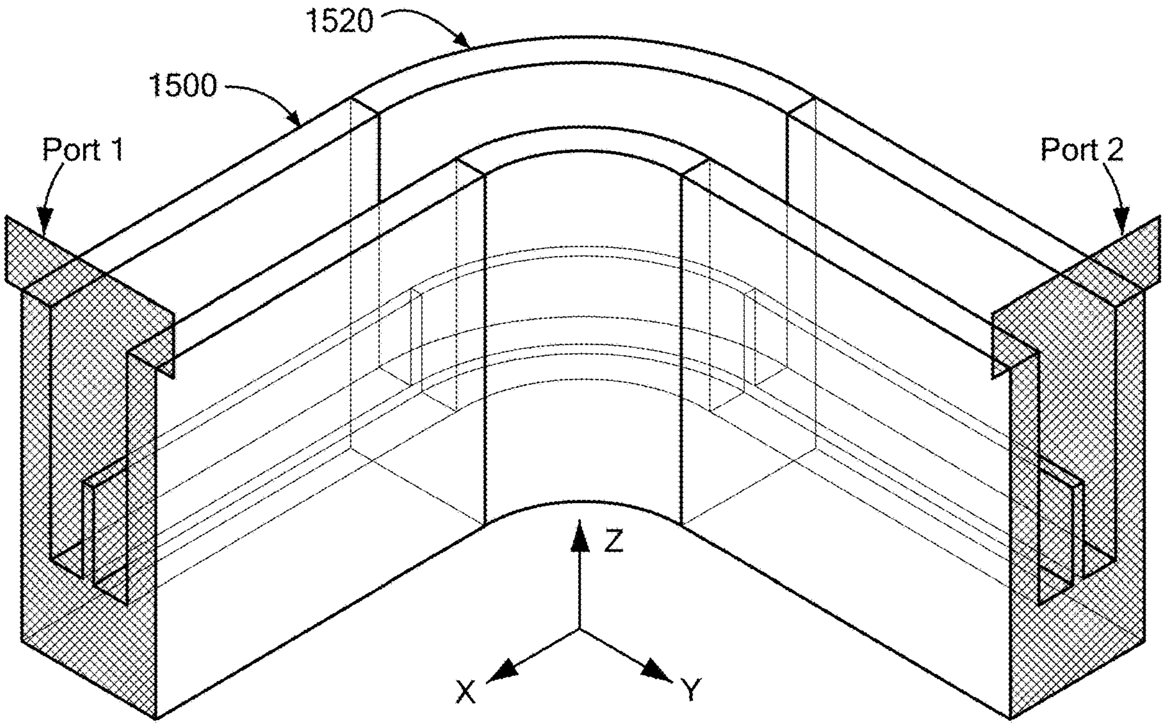
FIG. 32A depicts a rotated isometric transparent view.
Figure 32B:
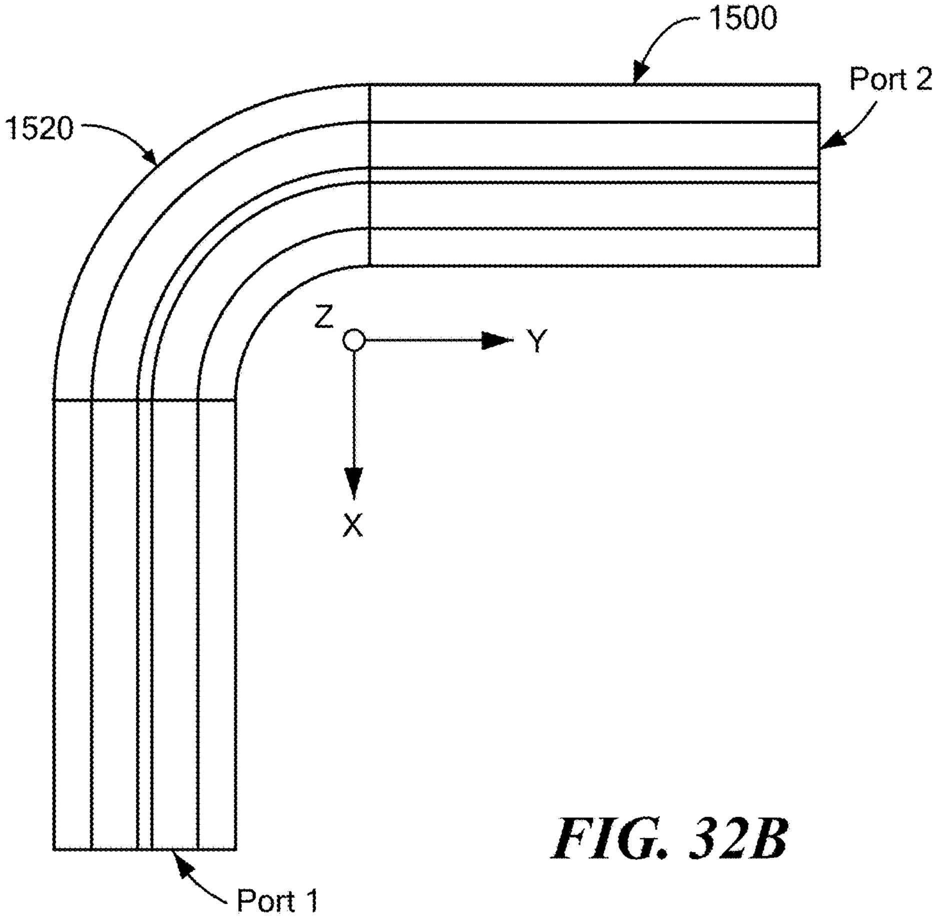
FIG. 32B depicts a top down plan view, of an open waveguide bend.
Figure 32C:
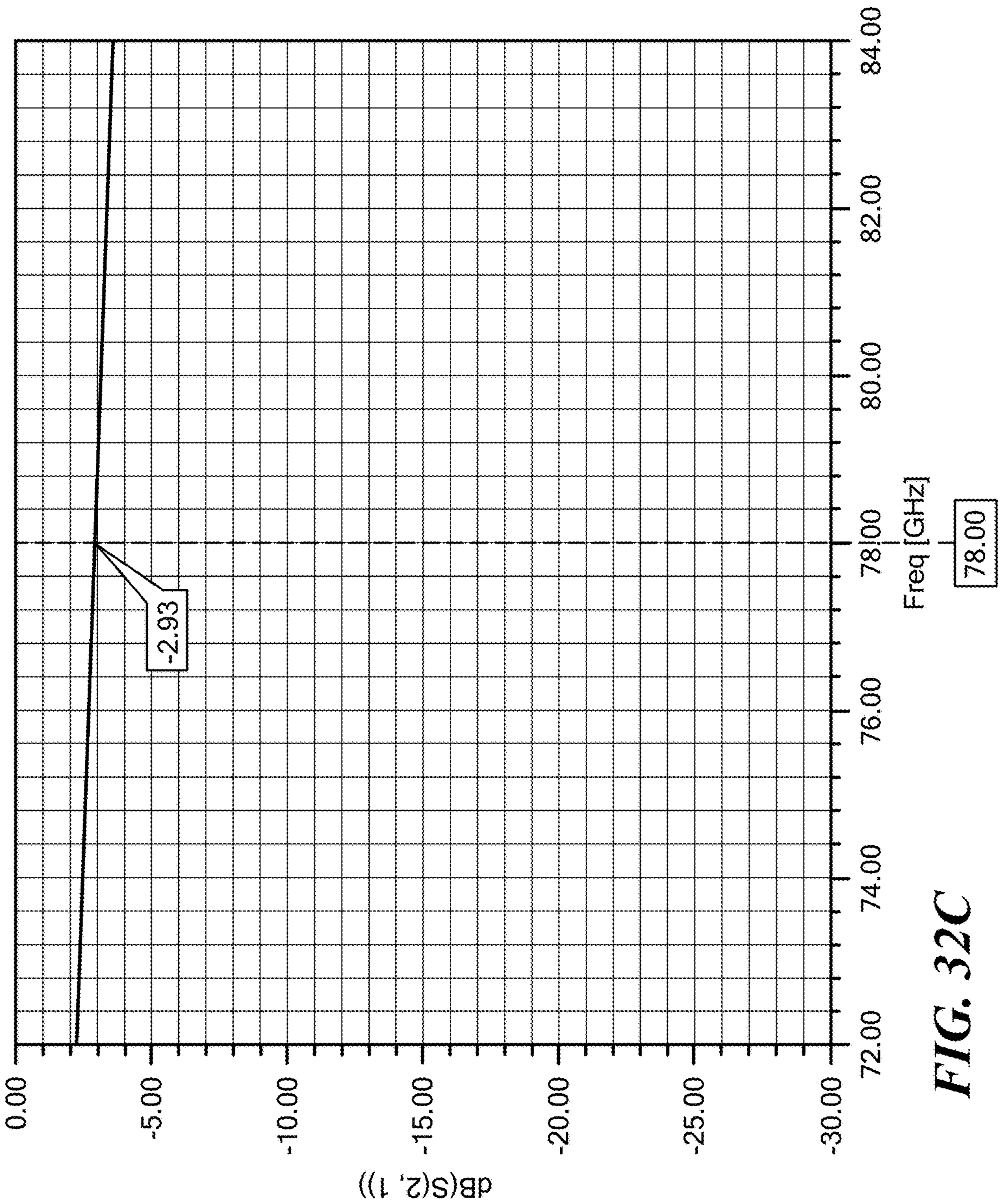
FIGS. 32C and 32D depict related electromagnetic performance characteristics of FIGS. 32A and 33B, in accordance with an embodiment.
Figure 32D:
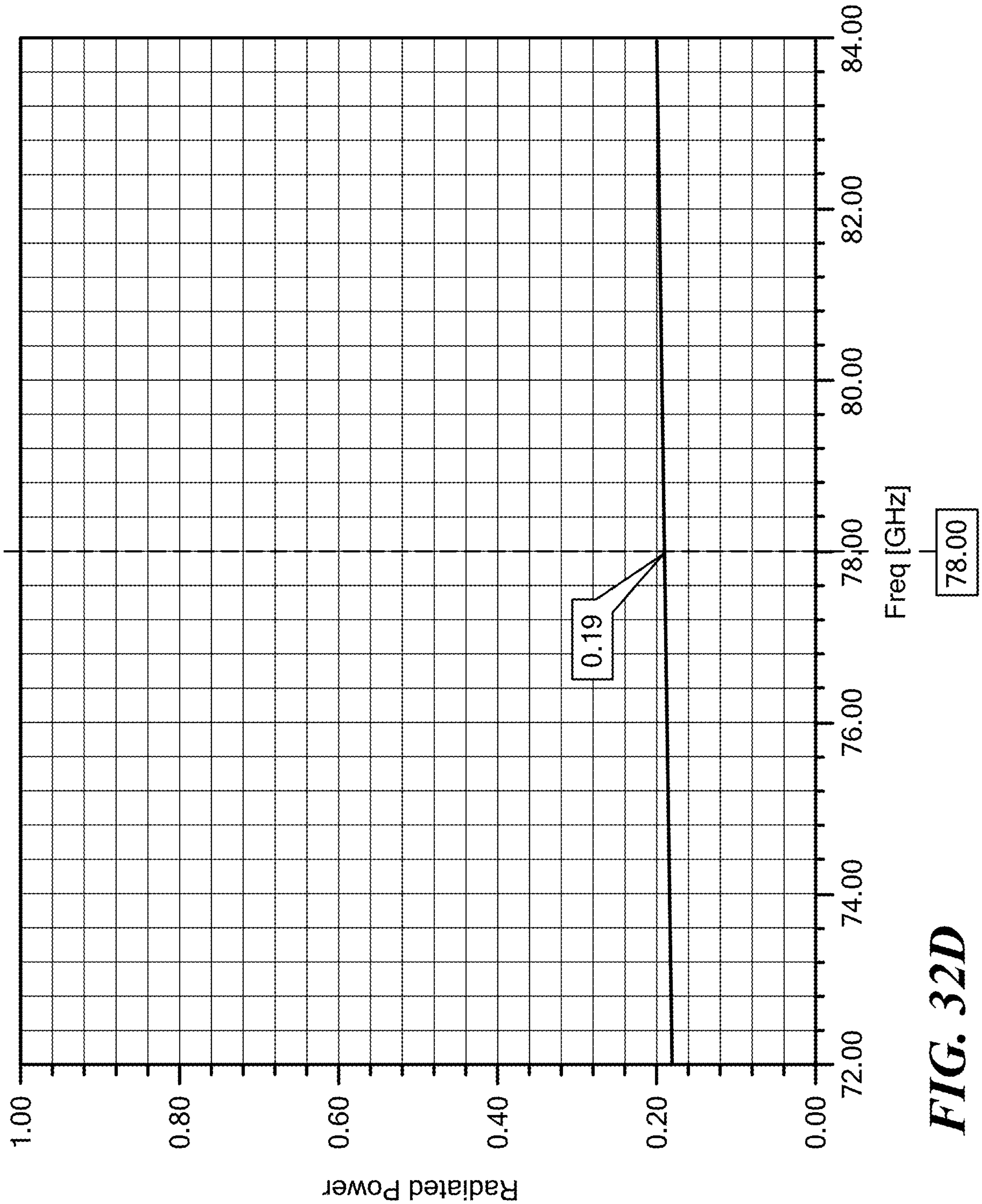

FIG. 32A depicts a rotated isometric transparent view, and FIG. 32B depicts a top down plan view, of an open waveguide bend 1500, and FIGS. 32C and 32D depict related electromagnetic performance characteristics of the embodiment of FIGS. 32A and 33B, which serves to illustrate that a bend 1520 in an open waveguide may be productive of undesirable electromagnetic radiation if left uncorrected. An open waveguide will desirably guide an electromagnetic wave as long as symmetry within the waveguide is maintained. As such, bending the waveguide, in principle, produces an infinite number of modes of different strengths, with some of those modes being undesirable radiating modes. To remedy the situation, one can minimize the stronger unwanted radiating modes produced by the bend by using one or more of the following: strategically placed electromagnetic radiation absorbers; electromagnetic radiation choking mechanisms disposed within the waveguide; structural modifications to the height of the septum within the waveguide, such as by slowly tapering down the height of the septum from its original height to a smaller height within the bend such that the electromagnetic wave is guided by the septum-to-wall distance; structural modifications to inner surfaces of the open waveguide that affect the phase velocity and/or waveguide impedance such that the phase velocity and/or waveguide impedance are constant or substantially constant along a path of the bend; and, other structural modifications to interior features of the trough waveguide within the bend that serve to keep the phase velocity and/or waveguide impedance constant along the bend.

Figure 33:
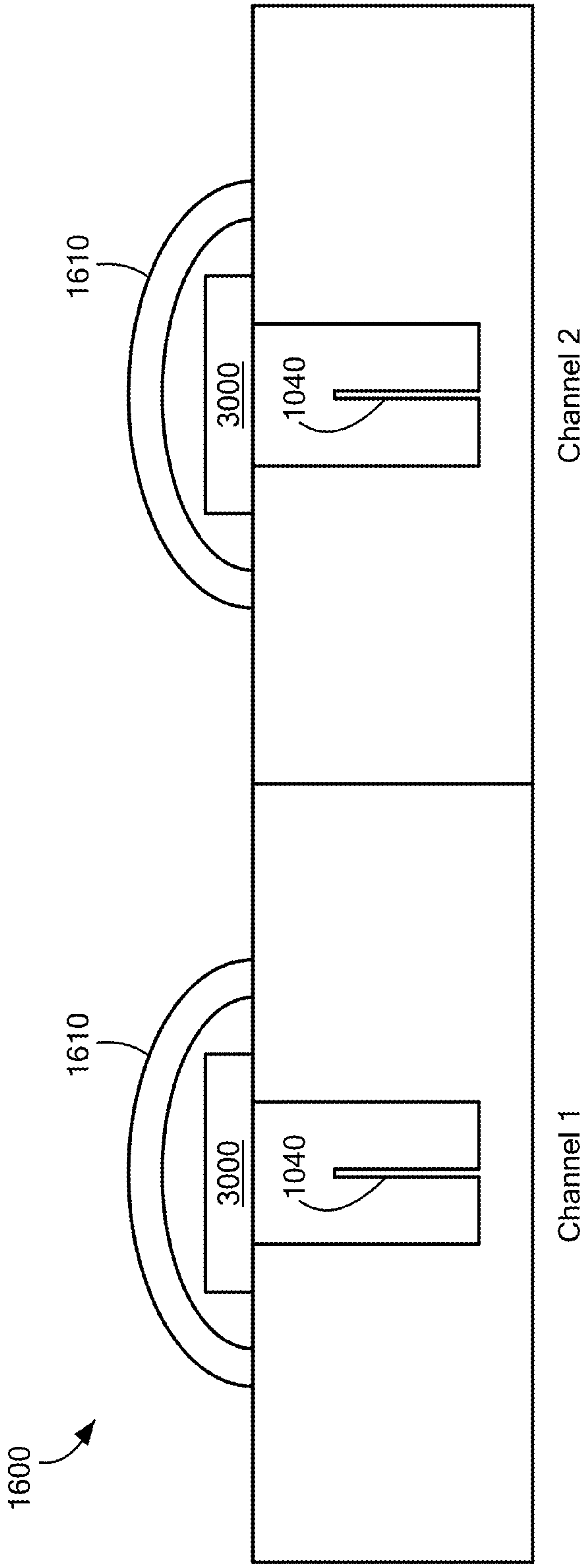
FIG. 33 depicts a block diagram cross-section longitudinal view through a bend in a two-channel open waveguide with electromagnetic radiation absorbers, in accordance with an embodiment.

With reference to FIG. 33 in combination with FIG. 32A, FIG. 33 depicts a block diagram cross-section longitudinal view through a bend in a two-channel open waveguide 1600 with electromagnetic radiation absorbers 1610 disposed over the corresponding dielectric covers 3000 having a dielectric constant, Dk, value greater than 1, which serves to eliminate or substantially eliminate the unwanted electromagnetic radiation from the bend 1520 and improve the channel-to-channel isolation. While example embodiments disclosed herein depict an electromagnetic radiation absorber 1610 disposed along a bend 1520 of an open waveguide 1500, it will be appreciated that electromagnetic radiation absorbers may be strategically placed at other locations in the antenna system as disclosed herein for suppressing undesirable radiation. Radar-absorbing materials that may be used are not limited, and may be in the form of composites, i.e., radar-absorbing materials in combination with a polymer binder. Exemplary radar-absorbing materials can be fibrous, or particulate, or other form. For example, the radar-absorbing materials can be carbon fibers, carbon nanotubes, carbon black, polyaniline, ferrites, or the like. Exemplary polymers for use as a binder may include epoxies, neoprenes, polyesters such as polybutylene terephthalate, or the like. The amount of radar-absorbing material is selected to provide the desired radar absorption without significantly adversely affecting desired properties of the composite, for example processability, and the like, and may be, for example, and amount of 1 to 40 volume percent, or 5 to 30 volume percent, or 10 to 20 volume percent, each based on the total volume of the composite. Other additives as known in the art may be present. An example material suitable as an electromagnetic radiation absorber for a purpose disclosed herein is poly(butylene terephthalate) (PBT) containing 15% by volume carbon fiber.

Figure 34A:
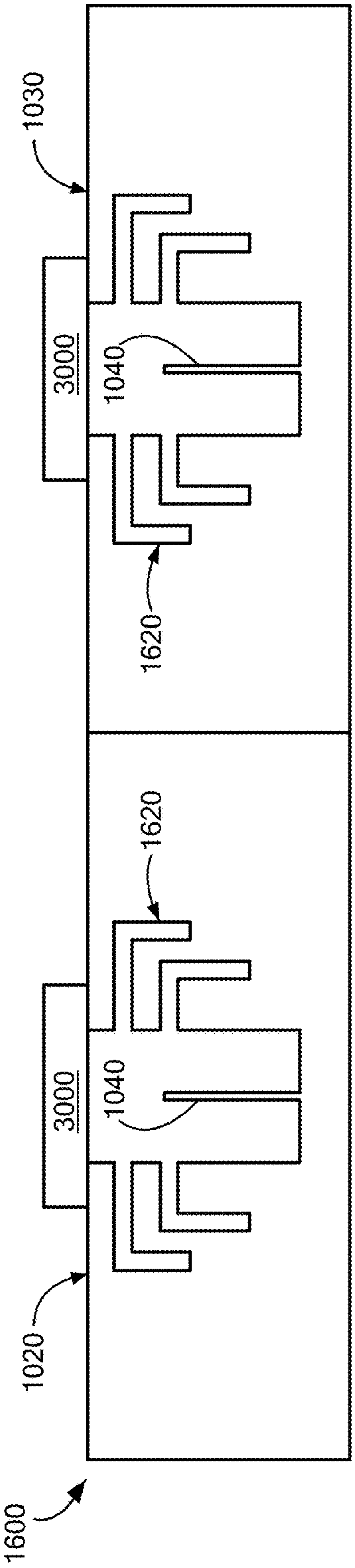
FIGS. 34A and 34B depict two versions of a block diagram cross-section longitudinal view through a bend in a two-channel open waveguide with electromagnetic radiation chokes (quarter wave trenches), in accordance with an embodiment.
Figure 34B:
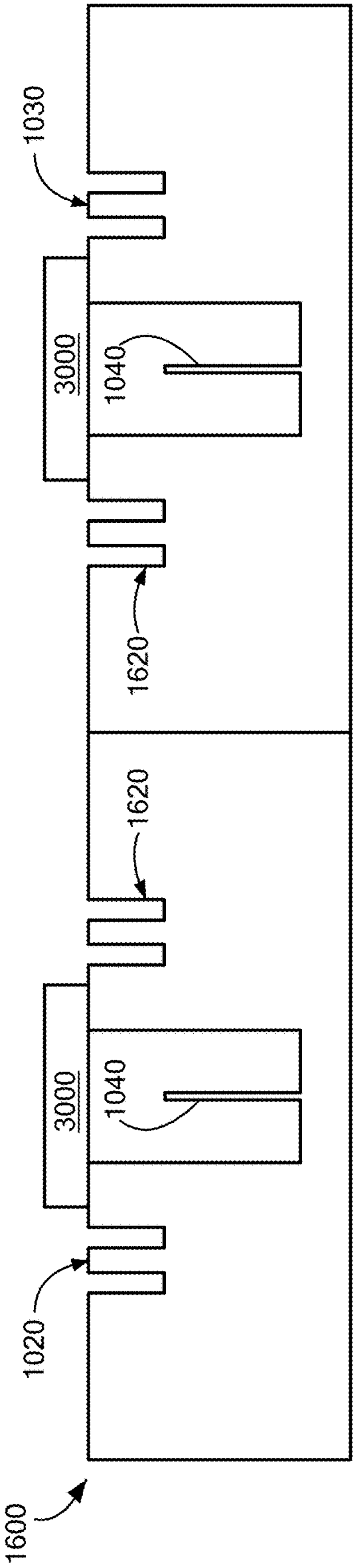

With reference to FIGS. 34A and 34B in combination with FIG. 32A, FIGS. 34A and 34B depict two versions of a block diagram cross-section longitudinal view through a bend 1520 in a two-channel open waveguide 1600 with electromagnetic radiation chokes (quarter wave trenches) 1620, which serves to eliminate or substantially eliminate the unwanted electromagnetic radiation from the bend and improve the channel-to-channel isolation. As depicted, example chokes may be formed within the bend of the open waveguide by creating quarter-wave trenches cut into the sidewalls 1020, 1030 of the waveguide. Since electromagnetic radiation exits the waveguide mainly through a parallel plate mode, suppressing this mode by using quarter-wave choking trenches serves to quench the undesirable radiation. As depicted, the quarter-wave chokes 1620 may be cut horizontally (FIG. 34A), vertically (FIGS. 34A and 34B), or both horizontally and vertically (FIG. 34A), in one or both of the sidewall 1020, 1030 of the open waveguide 1600, which may be in the bend 1520 as described, or strategically located elsewhere in the antenna system as disclosed herein for suppressing undesirable radiation.

Figure 35A:
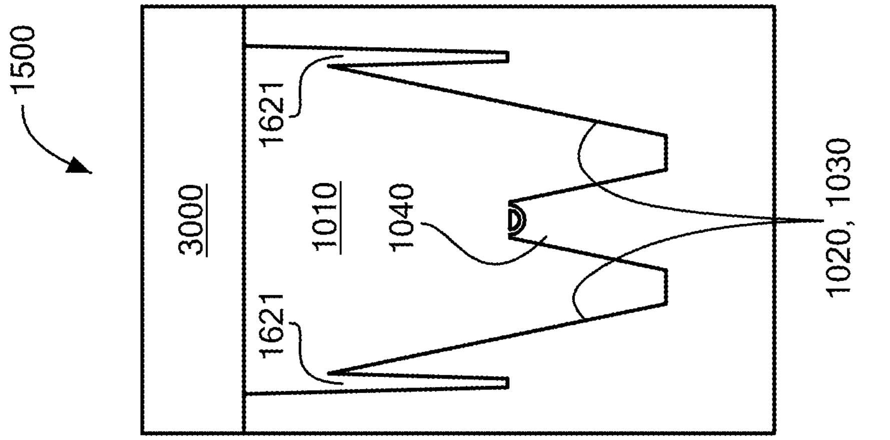
FIGS. 35A, 35B, and 35C, depict three versions of a block diagram cross-section longitudinal view through a bend in a single-channel open waveguide with electromagnetic radiation chokes alternative to those depicted in FIGS. 34A and 34B, in accordance with an embodiment.
Figure 35B:
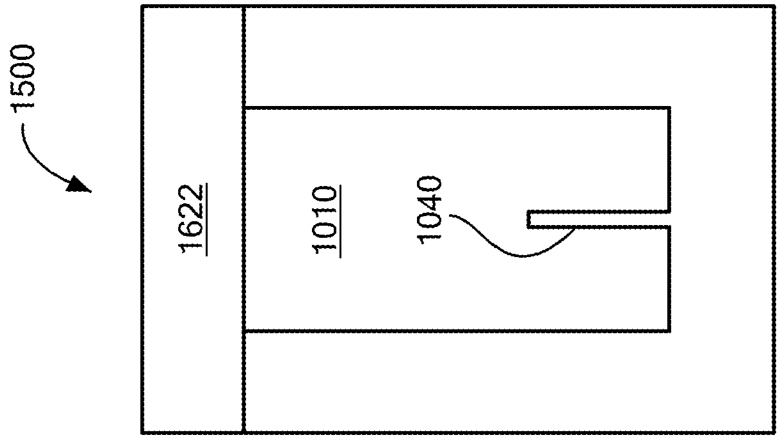
Figure 35C:
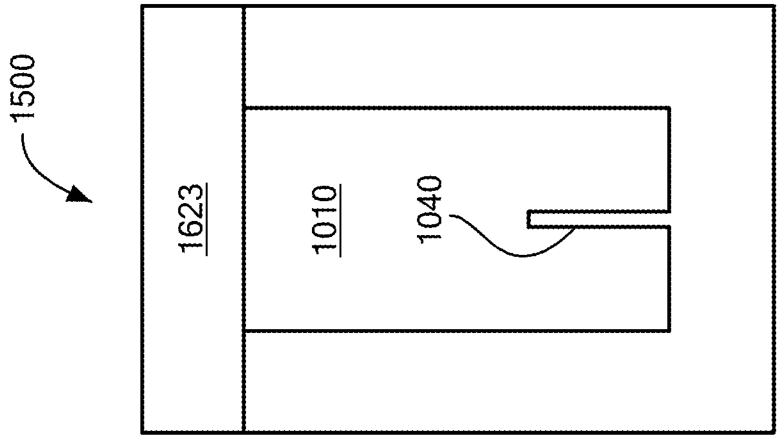

With reference to FIGS. 35A, 35B, and 35C, in combination with FIG. 32A, FIGS. 35A, 35B, and 35C, depict three versions of a block diagram cross-section longitudinal view through a bend 1520 in a single-channel open waveguide 1500 with electromagnetic radiation chokes 1621, 1622, 1623 alternative to those depicted in FIGS. 34A and 34B. Here, the alternative chokes include: quarter-wave trenches 1621 formed in the drafted sidewall 1020, 1030 of the trough 1010 (FIG. 35A), in optional combination with a cover 3000; a Bragg Reflector 1622 dielectric, or other electromagnetic reflectors having Total Internal Reflection properties, used in place of the dielectric cover 3000; and, a dielectric material 1623 having a high dielectric constant (Dk equal to or greater than 6) used in place of the dielectric cover 3000.

Figure 36A:
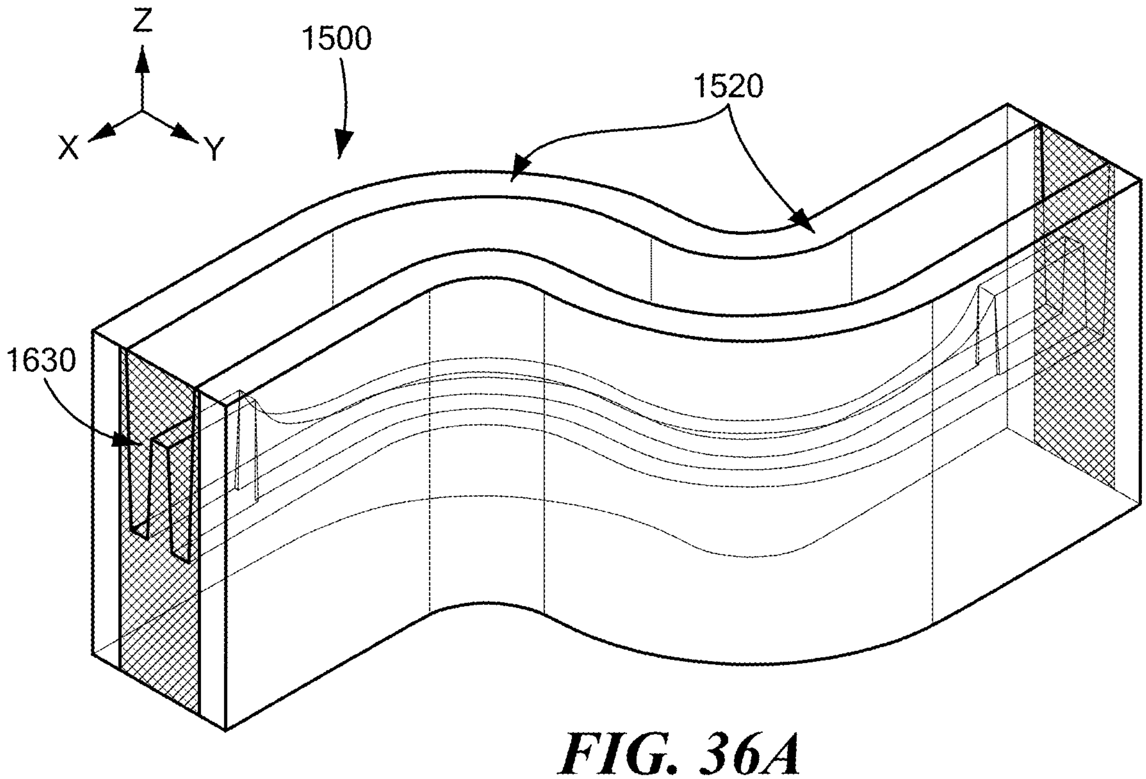
FIG. 36A depicts a rotated isometric transparent view.
Figure 36B:
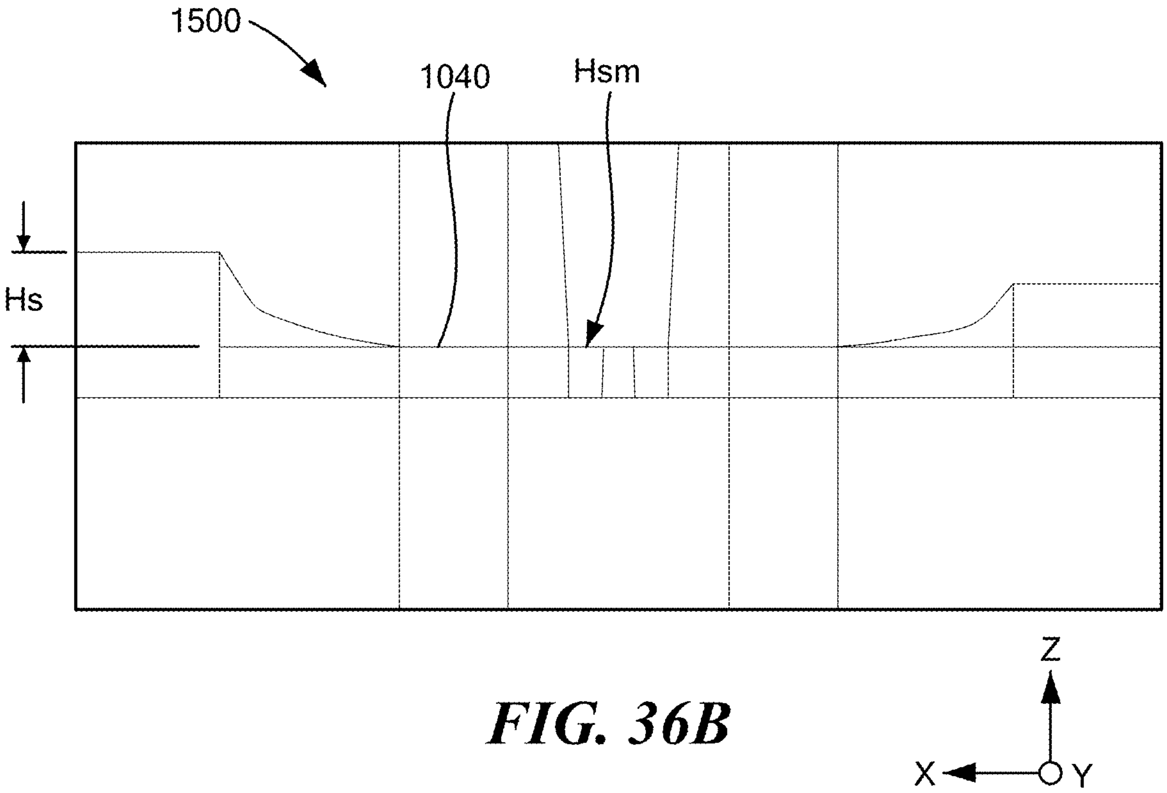
FIG. 36B depicts a side transparent view, of an open waveguide bend having a modified septum within the bend.
Figure 36C:
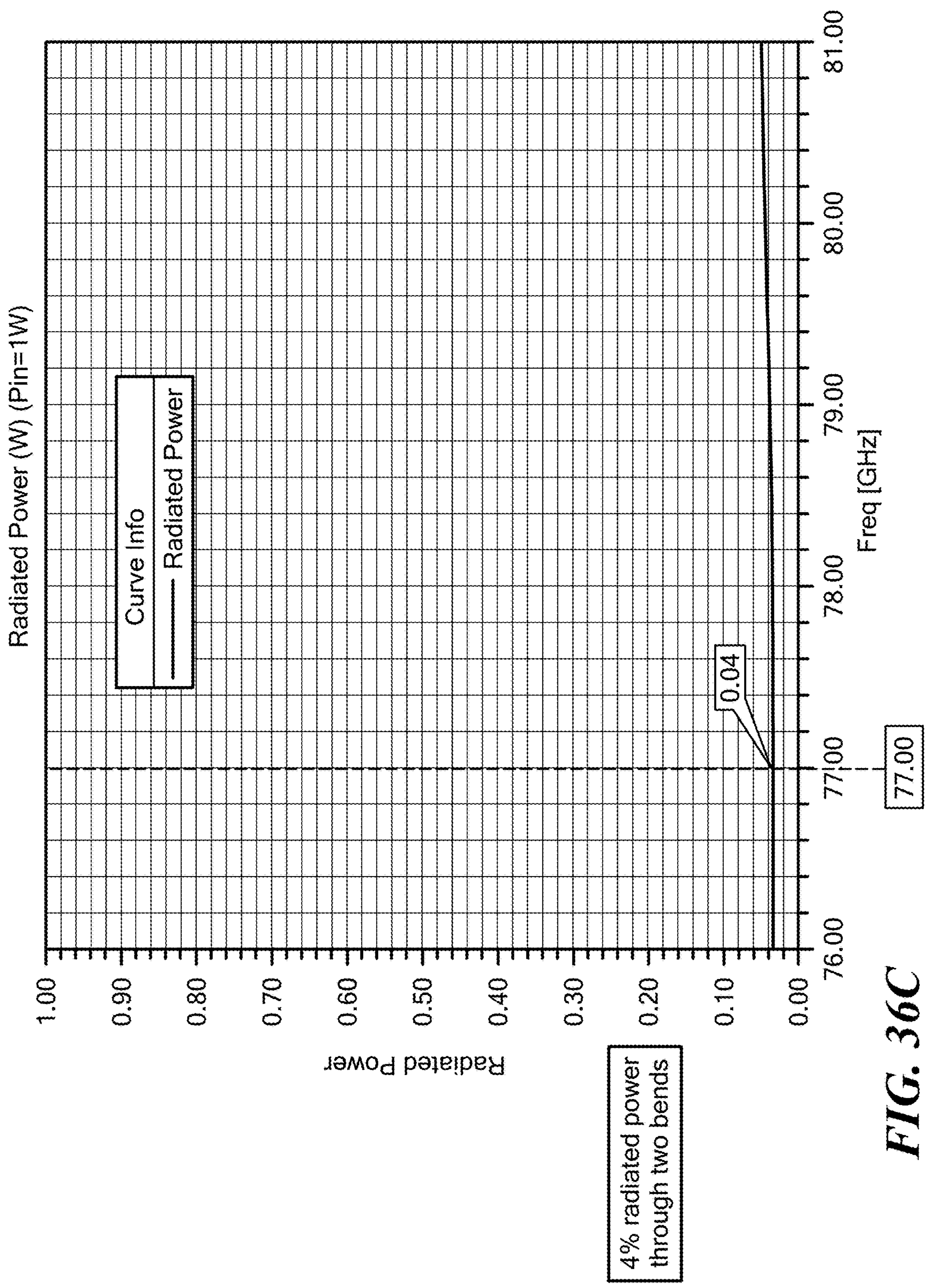
FIGS. 36C and 36D depict related electromagnetic performance characteristics of FIGS. 36A and 36B, in accordance with an embodiment 0
Figure 36D:
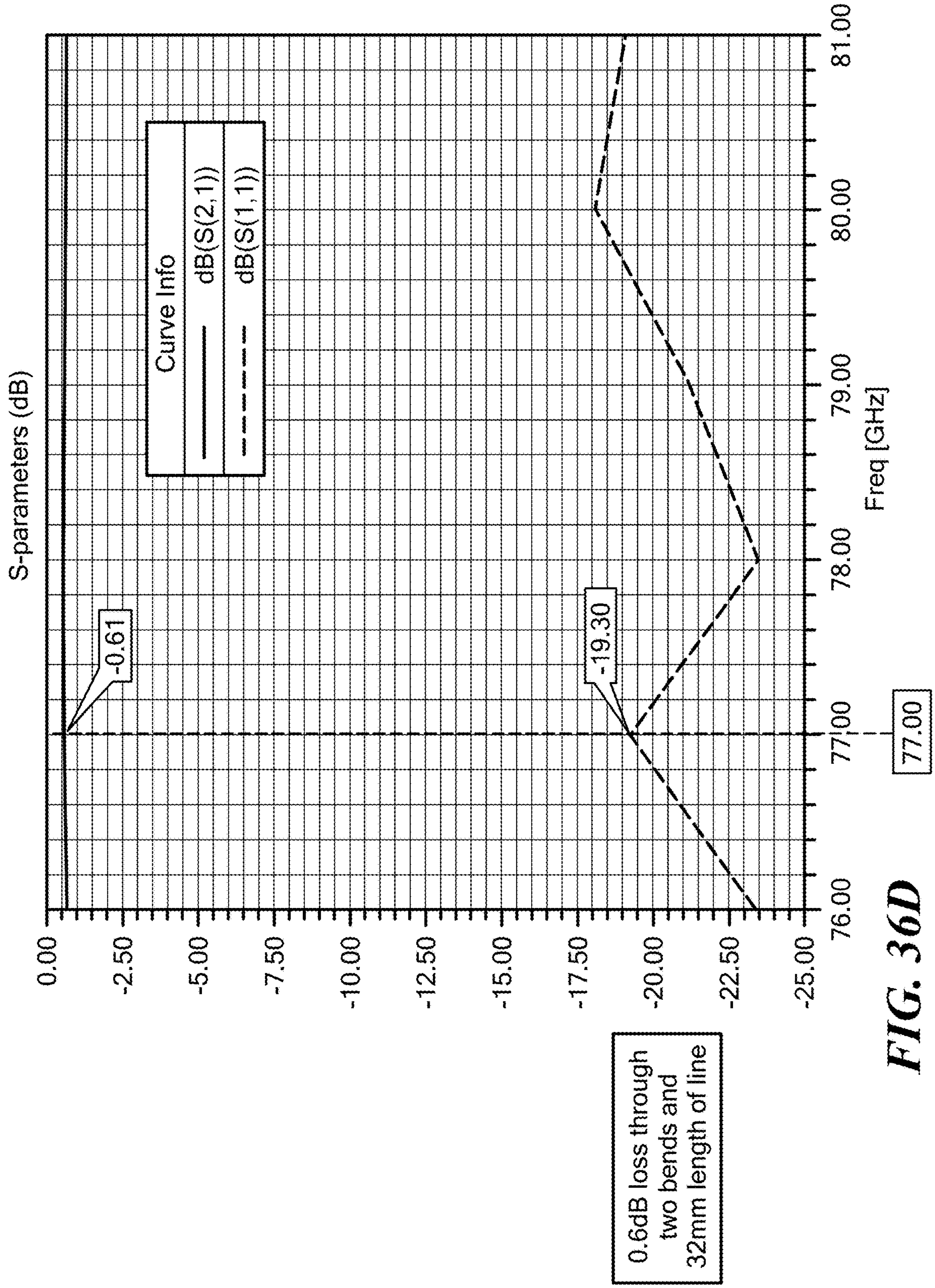

With reference to FIGS. 36A, 36B, 36C, and 36D, in combination with FIG. 32A, FIG. 36A depicts a rotated isometric transparent view, and FIG. 36B depicts a side transparent view, of an open waveguide 1500 with one or more bends 1520 having a modified septum 1040 within the bend 1520, and FIGS. 36C and 36D depict related electromagnetic performance characteristics of FIGS. 36A and 36B. Here, structural modifications are made to the height Hs of the septum 1040 within the waveguide 1500, such as by slowly tapering down the height of the septum from its original height Hs at both ends of the bend 1520 to a smaller height Hsm within the bend 1520 such that the electromagnetic wave is guided by the septum-to-wall distance 1630. An open trough waveguide with a short septum results in a tightly guided trough mode that is just above its cutoff frequency. The resultant mode tightly guides the electromagnetic wave, which radiates minimally around the bends because the mode is tightly confined to the septum and wall.

Figure 37A:
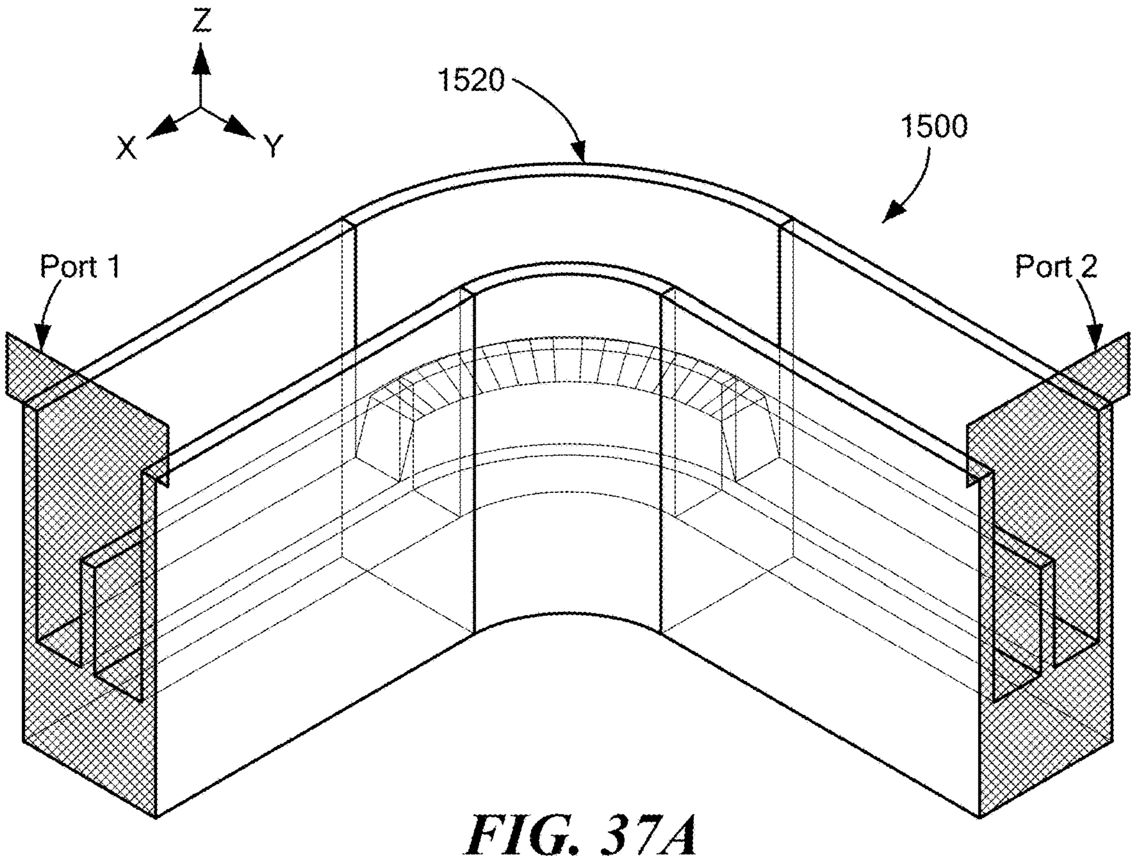
FIG. 37A depicts a rotated isometric transparent view.
Figure 37B:
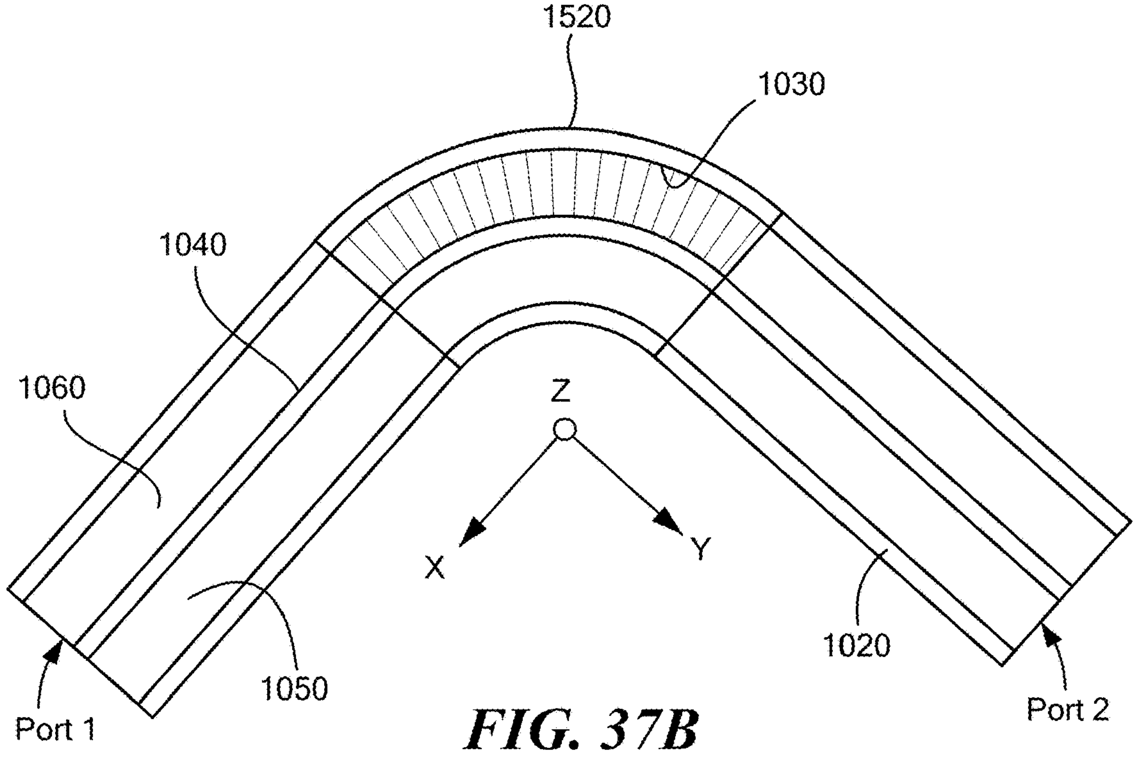
FIG. 37B depicts a top down plan view, of an open waveguide bend having a modified floor structure within the bend.
Figure 37C:
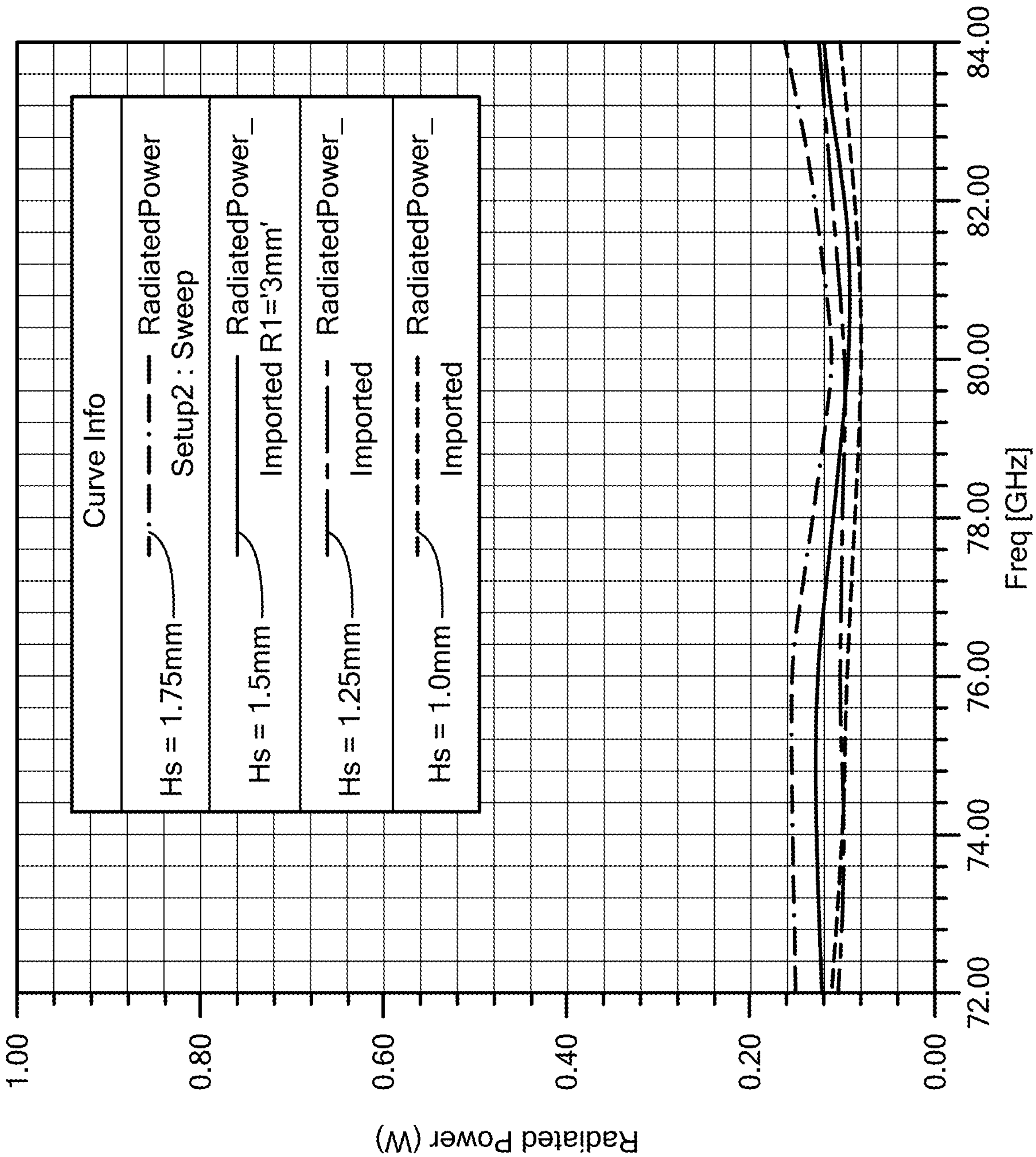
FIGS. 37C and 37D depict related electromagnetic performance characteristics of FIGS. 37A and 37B, in accordance with an embodiment.
Figure 37D:
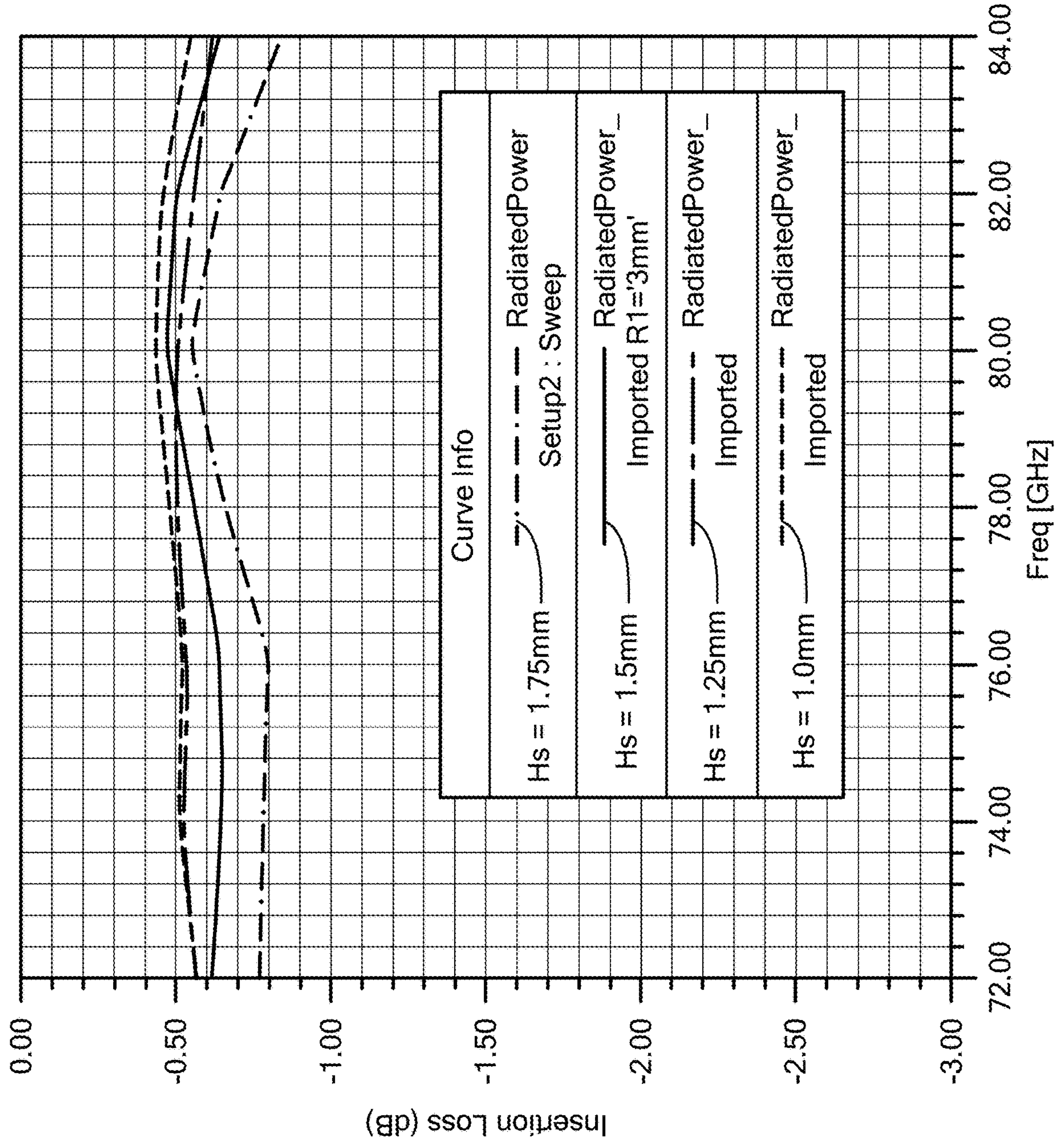

With reference to FIGS. 37A, 37B, 37C, and 37D, in combination with FIG. 32A, FIG. 37A depicts a rotated isometric transparent view, and FIG. 37B a top down plan view, of an open waveguide 1500 with a bend 1520 having modified floor (base) structure 1050, 1060 within the bend 1520, and FIGS. 37C and 37D depict related electromagnetic performance characteristics of FIGS. 37A and 37B. Here, structural modifications are made to inner surfaces of the open waveguide, which affect the phase velocity and/or waveguide impedance such that the phase velocity and/or waveguide impedance are constant or substantially constant along a path of the bend. Since the trough waveguide can be thought of as two open rectangular waveguides with a septum 1040 therebetween (see FIG. 1 for example), the waveguide on the outside of the bend 1520 (represented inf FIG. 37B by the related base reference numeral 1060) will have a longer path to travel than the waveguide on the inside of the bend 1520 (represented inf FIG. 37B by the related base reference numeral 1050). As such, the two waveguide modes do not travel in phase along the bend, producing, each, small amounts of radiation, and arrive at the end of the bend out of phase from each other. However, if the outside waveguide's phase velocity is slowly increased or the inside waveguide's phase velocity is slowly decreased, then both guided waves will travel in phase with their corresponding radiation components cancelling each other. In an embodiment, this is accomplished by slowly tapering the bottom surface (base) 1060 of the waveguide trough 1010 between the septum 1040 and the corresponding side wall 1020, 1030, where the tapering profile will determine the most appropriate impedance as well as the correct compensating phase velocity. In the embodiment depicted in FIG. 37A, the bottom surface 1060 of the waveguide trough 1010 on the outside of the bend 1520 is tapered upward from the septum 1040 toward the outside wall 1030. However, it is contemplated that other taper profiles of either bottom surface 1050, 1060 of the trough 1010 may be suitably employed consistent with a purpose disclosed herein.

Figure 38:
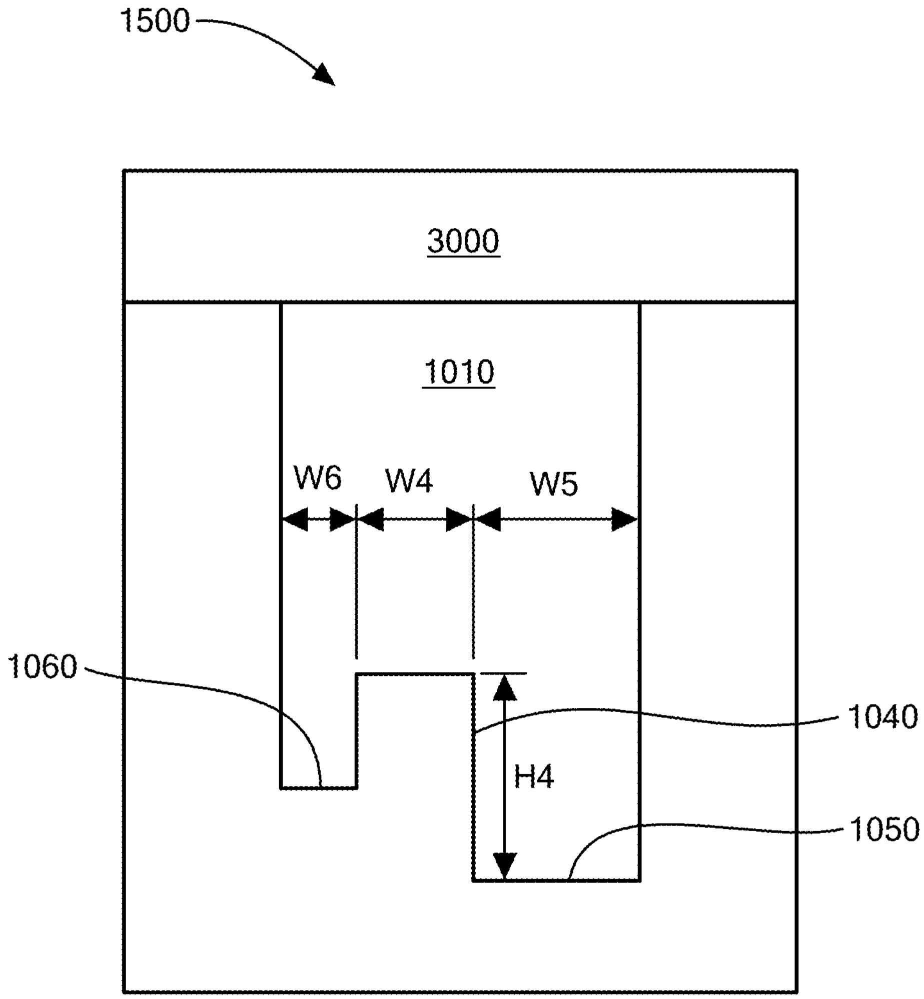
FIG. 38 depicts a block diagram cross-section longitudinal view through a bend of an open waveguide with modified waveguide structure within the bend, in accordance with an embodiment.

With reference to FIG. 38 in combination with FIG. 32A, FIG. 38 depicts a block diagram cross-section longitudinal view through of a bend 1520 of an open waveguide 1500 with modified waveguide structure within the bend 1520. Here, other structural modifications are made to interior features of the trough 1010 of the open waveguide 1500 within the bend 1520 that serve to keep the phase velocity and waveguide impedance constant along the bend 1520. Example ones of such structural modifications may include one or more of the following: a change in floor height of one trough trench (represented by base reference numeral 1050, see FIG. 1A) as compared to the other trough trench (represented by base reference numeral 1060, see FIG. 1A); a change in the width W5 of one trough trench 1050 as compared to the width W6 of the other trough trench 1060; a change in lateral positioning of the septum 1040 within the trough 1010 to add asymmetry to structure of the open waveguide 1500; a change in the thickness W4 of the septum 1040; and, a change in the height H4 of the septum 1040. Such structural modifications may vary along the length of the bend 1520.

Figure 39A:
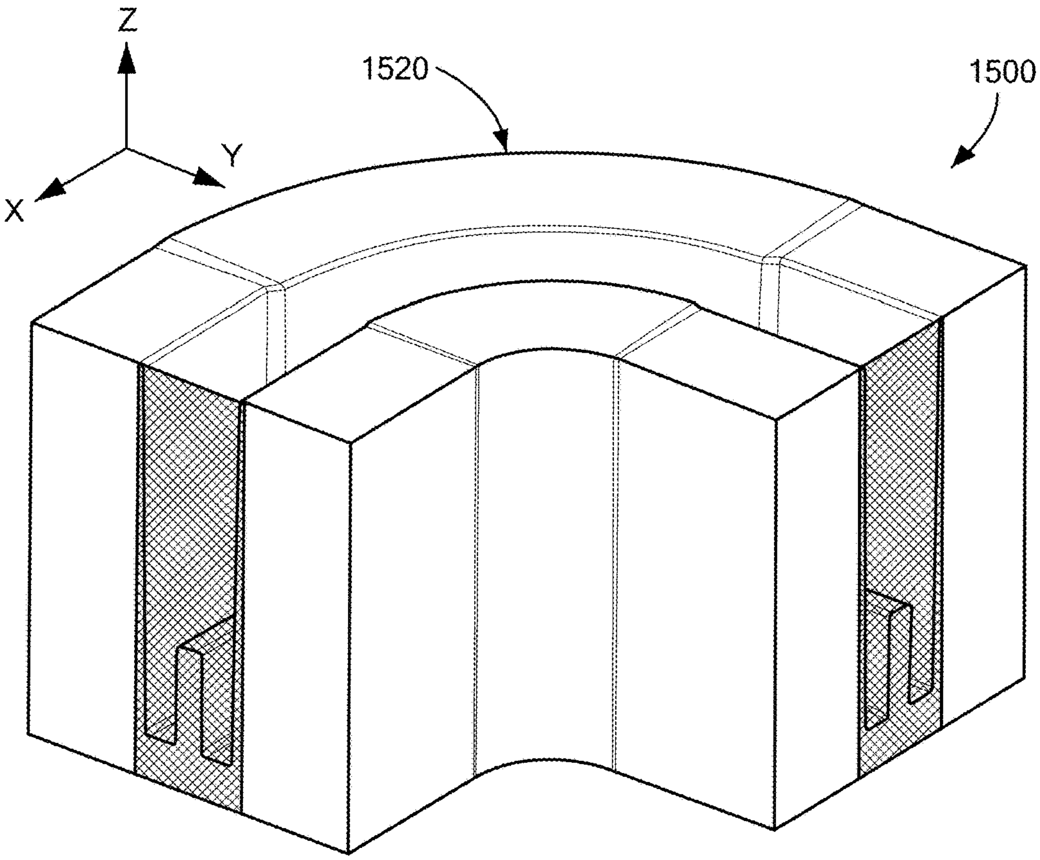
FIG. 39A depicts a rotated isometric transparent view.
Figure 39B:
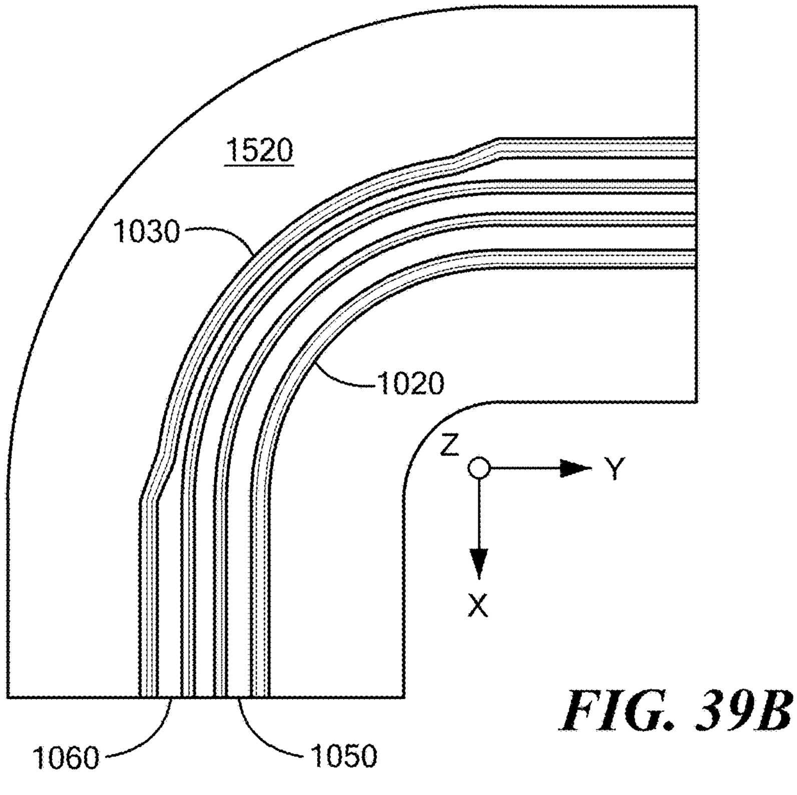
FIG. 39B depicts a top down plan view, of an open waveguide bend having a modified wall structure within the bend.
Figure 39C:
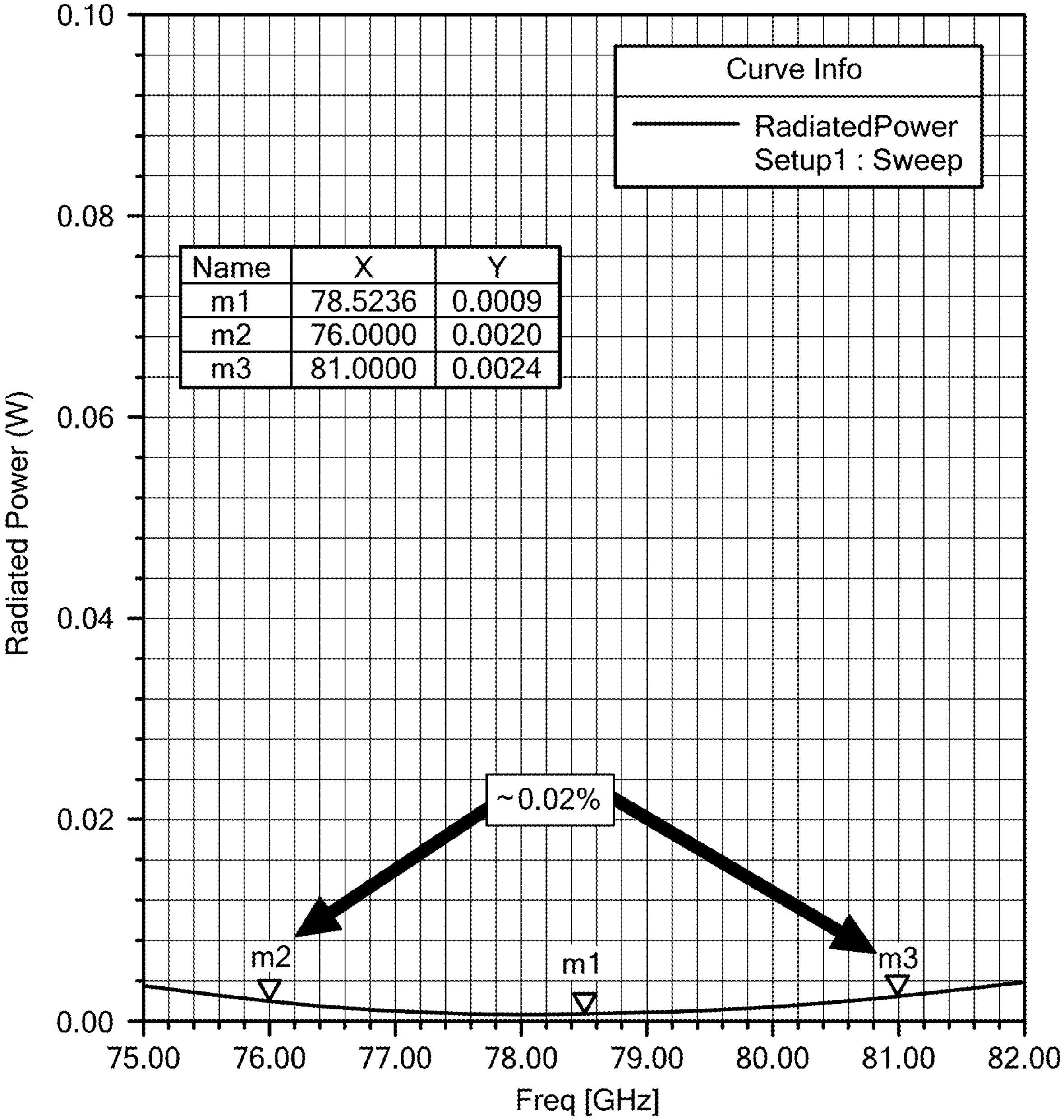
FIGS. 39C and 39D depict related electromagnetic performance characteristics of FIGS. 39A and 39B, in accordance with an embodiment.
Figure 39D:
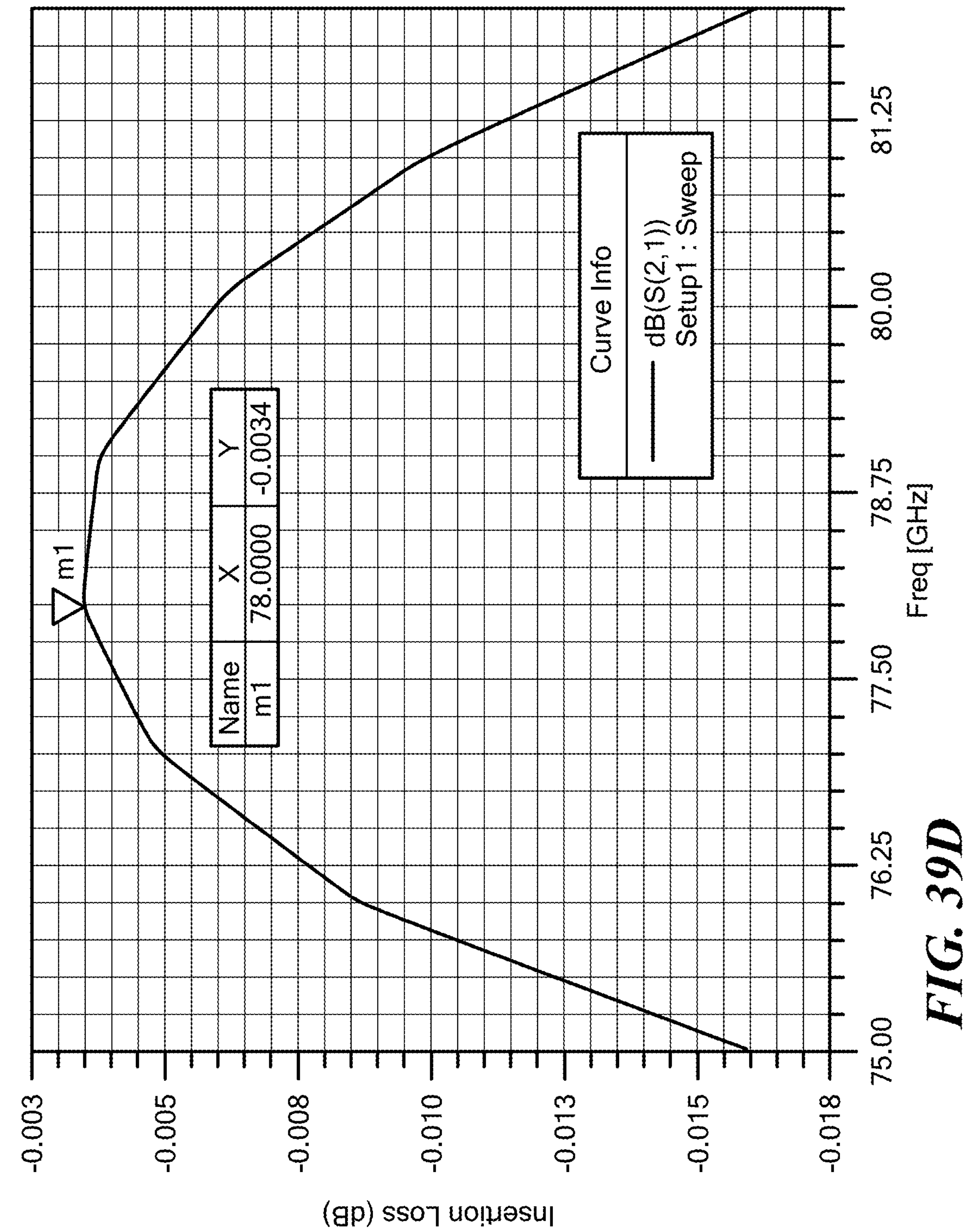

FIG. 39A depicts a rotated isometric transparent view, and FIG. 39B depicts a top down plan view, of an open waveguide 1500 with a bend 1520 having a modified wall structure 1020, 1030 within the bend 1520, and FIGS. 39C and 39D depict related electromagnetic performance characteristics of FIGS. 39A and 39B. As noted above, a modification to the trough waveguide 1500 within the bend 1520 may be used to adjust the EM waves on the inside and the outside of the bend 1520 such that they travel in-phase with each other so that corresponding radiating modes within the bend 1520 cancel each other out. The modification in the bend 1520 acts as a radiation suppressor and is configured to affect the phase velocity and waveguide impedance such that the phase velocity and waveguide impedance are constant or substantially constant along a path length of the at least one bend 1520. As noted above, the trough waveguide 1500, and in particular the trough waveguide bend 1520, may be viewed as two open waveguides, an inside waveguide (represented by reference numeral 1050) at the inside of the bend 1520, and an outside waveguide (represented by reference numeral 1060) at the outside of the bend 1520, where the waveguide on the outside of the bend will have a longer path to travel than the waveguide on the inside of the bend. As such, and without modification as disclosed herein, the two waveguide modes, inside and outside, will not travel along the bend in phase, and will produce undesirable radiation along the bend. However, if the inside waveguide and the outside waveguide phase velocities are adjusted so that both waves travel in phase, their corresponding radiating modes will tend to cancel. Additionally, if an adjustment is made to the impedance of the individual guides, their corresponding radiating modes will tend to cancel each other. Optional ways to do that is to taper the bottom side of the trough, the septum's position within the trough, and the width of the trough, which was discussed above in connection with FIGS. 37A, 37B, and 38, and is discussed further below in connection with FIGS. 40A-40E. In FIGS. 39A and 39B, another way to accomplish the desired effect on the EM phase velocity and impedance within the bend 1520 is to pull in the outer sidewall 1030 to narrow the width of the outside waveguide 1060 within the bend 1520, which is best seen with reference to FIG. 39B. The first sidewall of the at least one bend 1520 is referred to as the inside sidewall 1020; the second sidewall of the at least one bend 1520 is referred to as the outside sidewall 1030; the first base 1050 has a first width between the first sidewall 1020 and the septum 1040; the second base 1060 has a second width between the septum 1040 and the second sidewall 1030; and, the first width is greater than the second width. By creating a width differential between the first width of the first base 1050 on the inside of the bend, and the second width of the second base 1060 on the outside of the bend, an adjustment in accomplished whereby both waves travel in phase with equal wave impedances and their corresponding radiating modes cancel out.

Figures 40A, 40B, 40C:
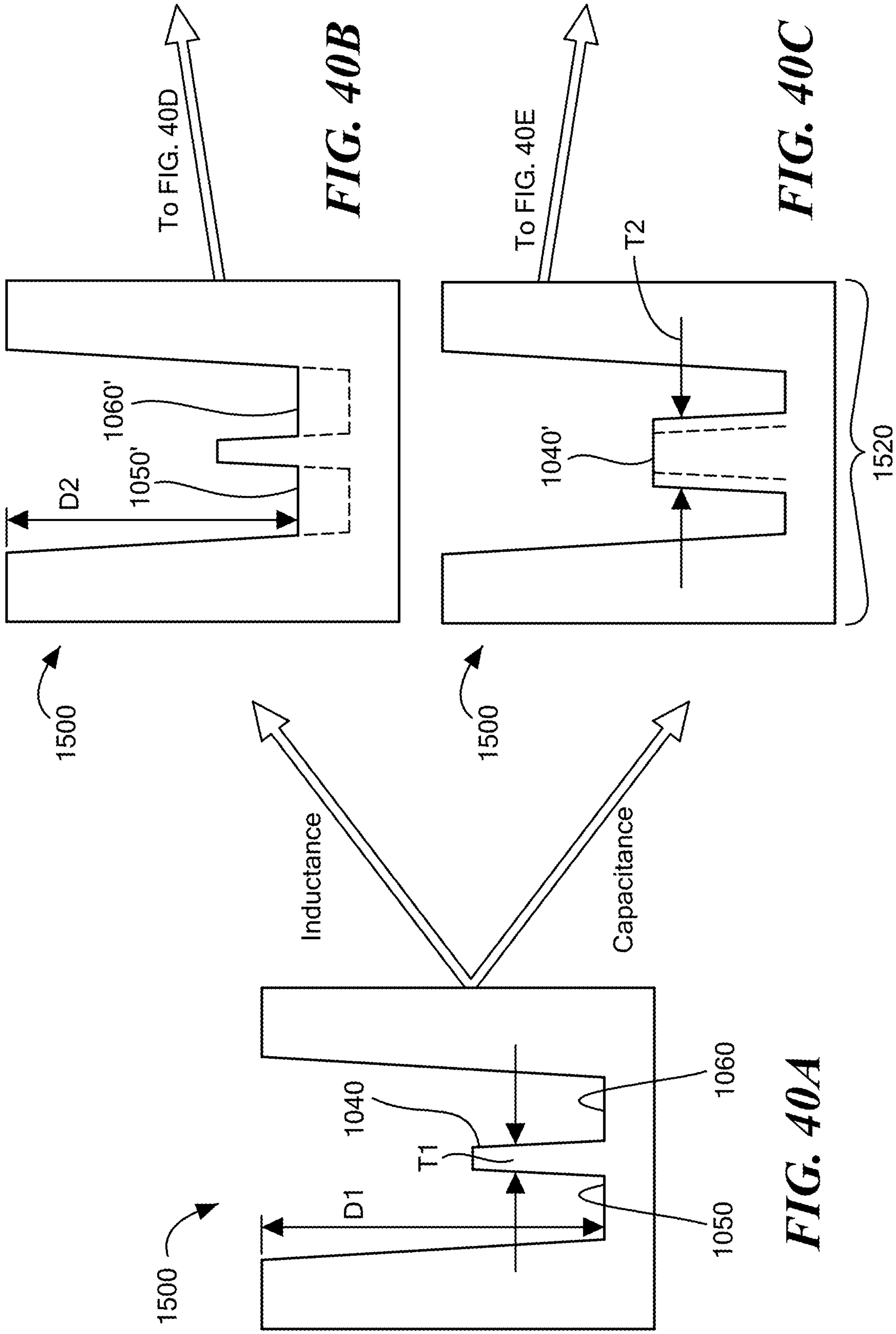
FIG. 40A depicts a block diagram cross-section longitudinal view through a bend of an open waveguide.
FIG. 40B depicts a modified version of FIG. 40A with increased inductance within the bend.
FIG. 40C depicts a modified version of FIG. 40A with increased capacitance within the bend.
Figure 40D:
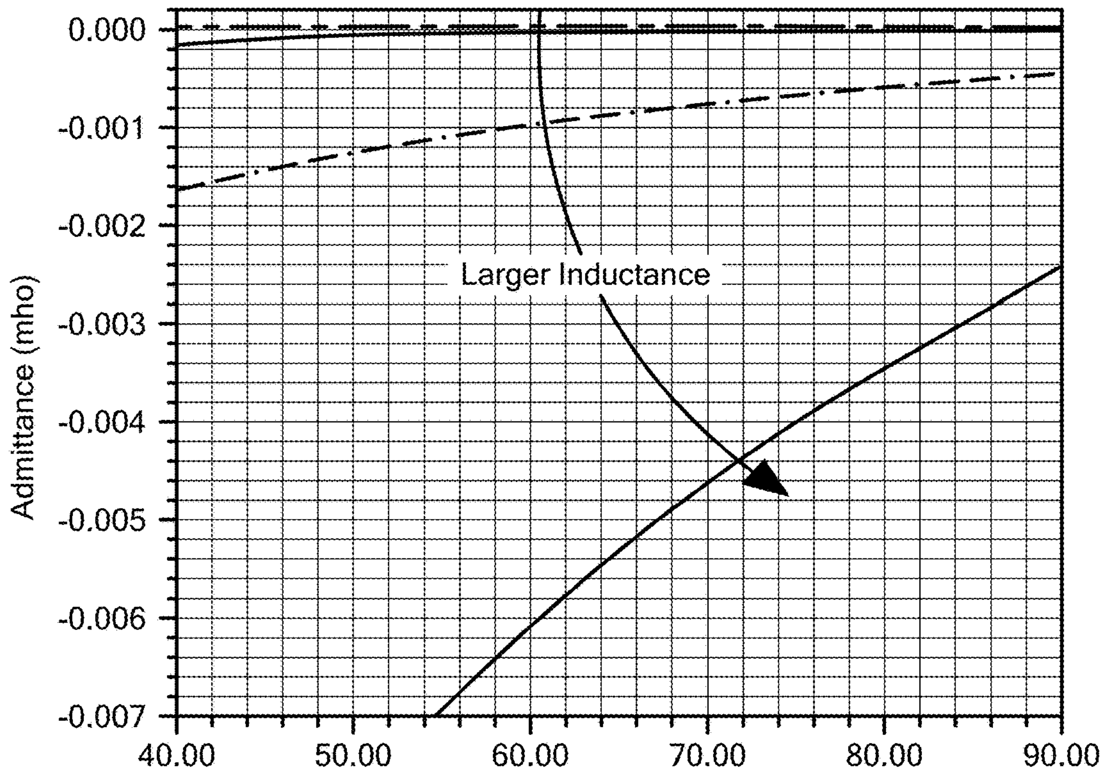
FIGS. 40D and 40E depict related electromagnetic performance characteristics of FIGS. 40B and 40C, respectively, in accordance with an embodiment.
Figure 40E:
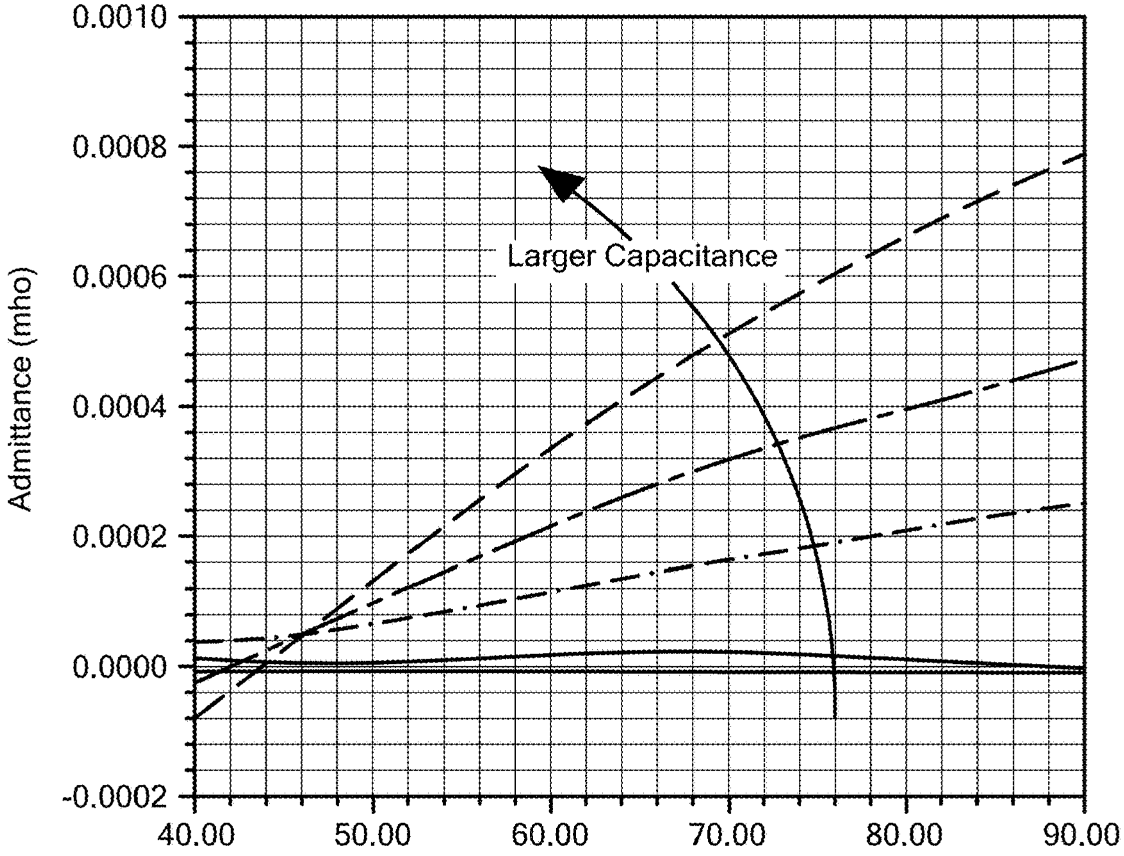

Reference is now made to FIGS. 40A-40E in combination with FIG. 32A, where FIG. 40A depicts a block diagram cross-section longitudinal view through an open waveguide 1500 outside of a bend 1520 of the open waveguide 1500, FIG. 40B depicts a modified version of FIG. 40A with increased inductance within the bend 1520 of the open waveguide 1500, FIG. 40C depicts a modified version of FIG. 40A with increased capacitance within the bend 1520 of the open waveguide 1500, and FIGS. 40D and 40E depict related electromagnetic performance characteristics of FIGS. 40B and 40C, respectively.

In the embodiment depicted by the combination of FIGS. 40A and 40B, the trough waveguide 1500 has a first depth D1 to the first base 1050 and to the second base 1060 outside of the at least one bend (depicted in FIG. 40A), and a second depth D2 to the first base 1050' and to the second base 1060' inside the at least one bend (depicted in FIG. 40B); and, the first depth D1 is greater than the second depth D2. By adjusting the depth of the first base and the second base inside of the bend relative to the respective depths outside of the bend, a change in the inductive impedance of the waveguide may be accomplished, and by providing a matching impedance through inductance within the bend, both inside and outside waves within the bend can be made to travel in phase such that their corresponding radiating modes cancel out.

In the embodiment depicted by the combination of FIGS. 40A and 40C, the septum 1040 has a first wall thickness T1 outside of the at least one bend 1520, and a second wall thickness T2 inside the at least one bend 1520; and, the first wall thickness T1 is less than the second wall thickness T2. By adjusting the wall thickness of the septum 1040' inside of the bend 1520 versus outside of the bend 1520, a change in the capacitance of the waveguide 1500 may be accomplished, and by providing a matching impedance through capacitance within the bend, both inside and outside waves within the bend can be made to travel in phase such that their corresponding radiating modes cancel out.

With collective reference to FIGS. 1A-40C, it will be appreciated that various aspects of an embodiment are disclosed herein, which are in accordance with, but not limited to, at least the following aspects and/or combinations of aspects.

Aspect 1. A waveguide antenna system, comprising: an electromagnetic, EM, transition portion comprising a transition region having a signal feed interface and an open waveguide section, the EM transition portion configured to couple EM energy from the signal feed interface to a guided waveguide mode of EM energy to the open waveguide section via the transition region; and a leaky waveguide antenna portion configured and disposed to radiate electromagnetic energy received from the open waveguide section; wherein the EM transition portion is electromagnetically coupled to the leaky waveguide antenna portion, the EM transition portion being configured to support a transfer of electromagnetic energy from a signal feed structure to the leaky waveguide antenna portion.

Aspect 2. The waveguide antenna system of Aspect 1, wherein: the EM transition portion is configured to support a transfer of electromagnetic energy from a planar signal feed structure to the leaky waveguide antenna portion.

Aspect 3. The waveguide antenna system of any one of Aspects 1 to 2, wherein: the open waveguide section comprises an open trough waveguide.

Aspect 4. The waveguide antenna system of any one of Aspects 1 to 2, wherein: the open waveguide section comprises an open groove waveguide.

Aspect 5. The waveguide antenna system of any one of Aspects 1 to 4, wherein: the open waveguide section is absent of discontinuities along its respective length; the leaky waveguide antenna portion comprises substantial discontinuities along its respective length; and, the open waveguide section is electromagnetically coupled to the leaky waveguide antenna portion with an electromagnetic coupling therebetween where a change in discontinuities transition from the absence of discontinuities of the open waveguide section to the substantial discontinuities of the leaky waveguide antenna portion.

Aspect 6. A waveguide antenna system, comprising: a plurality of the waveguide antenna system of any one of Aspects 1 to 5 configured for antenna-on-package applications.

Aspect 7. A waveguide antenna system, comprising: a plurality of the waveguide antenna system of any one of Aspects 1 to 5 configured for patch-on-printed-circuit-board applications.

Aspect 8. The waveguide antenna system of any one of Aspects 6 to 7, wherein: in a transmit mode and configuration, each open waveguide section is disposed and configured to receive electromagnetic energy from an antenna-on-package component, or a patch-on-printed-circuit-board component, and deliver the electromagnetic energy to a corresponding leaky waveguide antenna portion; and in a receive mode and configuration, each open waveguide section is disposed and configured to receive electromagnetic energy from a corresponding leaky waveguide antenna portion and deliver the electromagnetic energy to an antenna-on-package component, or a patch-on-printed-circuit-board component.

Aspect 9. An open waveguide signal feed system, comprising: a printed circuit board having a signal feed and a signal feed output; an open waveguide having a signal feed input port; a transition region disposed between and in signal communication with the signal feed output and the signal feed input port; wherein the signal feed comprises a microstrip, a coplanar waveguide, or a stripline; wherein the signal feed output comprises a patch or a probe.

Aspect 10. The open waveguide signal feed system of Aspect 9, wherein: the transition region comprises an enclosed waveguide.

Aspect 11. The open waveguide signal feed system of Aspect 9, wherein: the transition region comprises an edge feed between the signal feed output and the signal feed input port.

Aspect 12. The open waveguide signal feed system of Aspect 9, wherein: the transition region comprises an aperture at the signal feed output that is electromagnetically coupled directly to the signal feed input port.

Aspect 13. An open waveguide section, comprising: at least one bend in a trough waveguide, the at least one bend being in a direction of propagation of an electromagnetic wave in the trough waveguide, the trough waveguide comprising a trough having first and second opposing sidewalls, a septum disposed therebetween, a first base disposed between the first sidewall and the septum, and a second base disposed between the septum and the second sidewall, wherein all surfaces internal to the trough of at least the first sidewall, the second sidewall, the septum, the first base, and the second base, are electrically conductive; and an electromagnetic radiation suppressor strategically configured and disposed to suppress undesirable electromagnetic radiation that may emanate from the at least one bend in the absence of such electromagnetic radiation suppressor.

Aspect 14. The open waveguide section of Aspect 13, wherein: the electromagnetic radiation suppressor comprises an electromagnetic radiation absorbing material disposed over an upper open end of the at least one bend of the trough waveguide.

Aspect 15. The open waveguide section of Aspect 13, wherein: the electromagnetic radiation suppressor comprises an electromagnetic choking mechanism disposed within the at least one bend of the trough waveguide.

Aspect 16. The open waveguide section of Aspect 15, wherein: the electromagnetic choking mechanism comprises at least one quarter-wavelength trench cut into each of the first and second sidewalls of the trough.

Aspect 17. The open waveguide section of Aspect 16, wherein: the at least one quarter-wavelength trench comprises at least one pair of symmetrically arranged trenches disposed in the first and second sidewalls of the trough.

Aspect 18. The open waveguide section of any one of Aspects 16 to 17, wherein: the at least one quarter-wavelength trench comprises a horizontal portion and a contiguous vertical portion.

Aspect 19. The open waveguide section of any one of Aspects 16 to 17, wherein: the first and second sidewalls of the trough have angled sidewalls, and the at least one quarter-wavelength trench is formed in each corresponding angled sidewall.

Aspect 20. The open waveguide section of Aspect 15, wherein: the electromagnetic choking mechanism comprises an electromagnetic reflector having Total Internal Reflection, TIR, properties in the form of a cover disposed over the upper open end of the at least one bend of the trough waveguide, and extending across the at least one bend of the trough from the first sidewall to the second sidewall, the TIR reflector being comprised of a dielectric material having a varying dielectric constant along a direction normal to the cover which produces total internal reflection.

Aspect 21. The open waveguide section of Aspect 15, wherein: the electromagnetic choking mechanism comprises a dielectric medium disposed over the upper open end of the at least one bend of the trough waveguide, and extending across the at least one bend of the trough from the first sidewall to the second sidewall, the dielectric medium being comprised of a dielectric material having a dielectric constant greater than 6.

Aspect 22. The open waveguide section of Aspect 13, wherein: the electromagnetic radiation suppressor comprises a modified septum having a reduced height within the at least one bend that is lower that an original height of the septum outside of the at least one bend.

Aspect 23. The open waveguide section of Aspect 22, wherein: the modified septum gradually tapers down from the original height to the reduced height.

Aspect 24. The open waveguide section of Aspect 13, wherein: the electromagnetic radiation suppressor comprises a modified inner surface of the trough within the at least one bend that is configured to affect the phase velocity and/or waveguide impedance such that the phase velocity and/or waveguide impedance are constant or substantially constant along a path length of the at least one bend.

Aspect 25. The open waveguide section of Aspect 24, wherein: the modified inner surface of the trough comprises a tapered bottom surface of the waveguide trough between the septum and at least one of the first sidewall and the second sidewall.

Aspect 26. The open waveguide section of Aspect 25, wherein: the tapered bottom surface is tapered upward from the septum toward the outside wall on an outside of the at least one bend.

Aspect 27. The open waveguide section of Aspect 24, wherein: the modified inner surface of the trough comprises a height differential between the first base of the trough and the second base of the trough.

Aspect 28. The open waveguide section of Aspect 24, wherein the trough comprises a first trough portion between the first sidewall and the septum, and a second trough portion between the second sidewall and the septum, wherein the first trough portion is disposed on an inside curvature of the at least one bend and the second trough portion is disposed on an outside curvature of the at least one bend, and further wherein: the modified inner surface of the trough comprises a width differential between the first trough portion and the second trough portion.

Aspect 29. The open waveguide section of Aspect 24, wherein: the modified inner surface of the trough comprises a lateral positioning of the septum within the at least one bend that is asymmetrical with respect to the first and second sidewalls.

Aspect 30. The open waveguide section of Aspect 24, wherein: the modified inner surface of the trough comprises a thickness of the septum within the at least one bend that is different from a thickness of the septum outside of the at least one bend.

Aspect 31. The open waveguide section of Aspect 24, wherein: the first sidewall is an inside sidewall of the at least one bend; the second sidewall is an outside sidewall of the at least one bend; the first base has a first width between the first sidewall and the septum that defines a first trough portion disposed on an inside curvature of the at least one bend; the second base has a second width between the septum and the second sidewall that defines a second trough portion disposed on an outside curvature of the at least one bend; and the first width is greater than the second width.

Aspect 32. The open waveguide section of Aspect 31, wherein: a cross-section of the second trough portion inside of the at least one bend has a width that is less than the corresponding cross-section width outside of the at least one bend, which serves to increase the capacitance of the second trough portion inside of the at least one bend.

Aspect 33. The open waveguide section of any one of Aspects 31 to 32, wherein: a cross-section of the first trough portion inside of the at least one bend has a width that is greater than the corresponding cross-section width outside of the at least one bend, which serves to decrease the capacitance of the first trough portion inside of the at least one bend.

Aspect 34. The open waveguide section of Aspect 32, wherein: the cross-section width of the second trough portion inside of the at least one bend has a width dimension as low as 200 micrometers or lower.

Aspect 35. The open waveguide section of Aspect 33, wherein: the cross-section width of the first trough portion inside of the at least one bend has width dimension no greater than one-half of a wavelength of an operating frequency of the open waveguide section inside of the at least one bend.

Aspect 36. The open waveguide section of Aspect 24, wherein: the trough waveguide has a first depth to the first base and to the second base, outside of a curvature of the at least one bend, and a second depth to the first base and to the second base, inside of the curvature of the at least one bend; and, the first depth outside of the curvature of the bend is greater than the second depth inside of the curvature of the bend.

Aspect 37. The open waveguide section of any one of Aspects 24 and 36, wherein the trough comprises a first trough portion between the first sidewall and the septum, and a second trough portion between the second sidewall and the septum, and further wherein: a cross-section of the second trough portion inside of the at least one bend has a depth that is less than the corresponding cross-section depth outside of the at least one bend, which serves to increase the impedance of the second trough portion inside of the at least one bend, and to increase the phase velocity of an electromagnetic wave, when present, propagating through the second trough portion.

Aspect 38. The open waveguide section of Aspect 37, wherein: a cross-section of the first trough portion inside of the at least one bend has a depth that is greater than the corresponding cross-section depth outside of the at least one bend, which serves to decrease the impedance of the first trough portion inside of the at least one bend, and to decrease the phase velocity of an electromagnetic wave, when present, propagating through the first trough portion.

Aspect 39. The open waveguide section of Aspect 37, wherein: the cross-section depth of the second trough portion is at least as deep as the septum is high.

Aspect 40. The open waveguide section of Aspect 38, wherein: the cross-section depth of the first trough portion inside of the at least one bend with respect to the cross-section depth of the first trough portion outside of the at least one bend increases by at most one-quarter of a wavelength of an operating frequency of the open waveguide section inside of the at least one bend.

Aspect 41. The open waveguide section of Aspect 24, wherein: the septum has a first wall thickness outside of the at least one bend, and a second wall thickness inside the at least one bend; and the first wall thickness is less than the second wall thickness.

Aspect 42. An open waveguide antenna, comprising: a trough having first and second opposing sidewalls, a septum disposed therebetween, a first base disposed between the first sidewall and the septum, and a second base disposed between the septum and the second sidewall; wherein one or more of surfaces internal to the trough of at least the first sidewall, the second sidewall, the septum, the first base, and the second base, are electrically conductive; wherein the first base has a first sequence of undulations that are longitudinally disposed along a length of the trough; wherein the first sequence of undulations alternatively and sequentially follow a first curved path and a second curved path, the second curved path being asymmetric to the first curved path; wherein the second base has a second sequence of undulations that are longitudinally disposed along the length of the trough; wherein the second sequence of undulations alternatively and sequentially follow the second curved path and the first curved path; wherein the first curved path and the second curved path alternate from one side of the septum to the other side of the septum along the length of the trough.

Aspect 43. The open waveguide antenna of Aspect 42, wherein: all surfaces internal to the trough of the first base and the second base are electrically conductive.

Aspect 44. The open waveguide antenna of Aspect 42, wherein: at least a portion of the first sequence of undulations comprises a dielectric material.

Aspect 45. The open waveguide antenna of Aspect 42, wherein: at least a portion of the second sequence of undulations comprises a dielectric material.

Aspect 46. The open waveguide antenna of any one of Aspects 42 to 45, wherein: the trough is a monolithic non-electrically conductive construct with the electrically conductive surfaces formed thereon.

Aspect 47. The open waveguide antenna of any one of Aspects 42 to 46, wherein: the septum extends upward from the first and second bases.

Aspect 48. The open waveguide antenna of any one of Aspects 42 to 47, wherein: exposed surfaces of the first sidewall, the second sidewall, and the septum, are not parallel to each other along the length of the trough.

Aspect 49. The open waveguide antenna of any one of Aspects 42 to 48, wherein: the septum has a height that is less than a height of either the first sidewall or the second sidewall.

Aspect 50. The open waveguide antenna of any one of Aspects 42 to 49, wherein: the septum is centrally disposed between the first sidewall and the second sidewall.

Aspect 51. The open waveguide antenna of any one of Aspects 42 to 50, wherein: the first sequence of undulations and the second sequence of undulations are asymmetric about the septum.

Aspect 52. The open waveguide antenna of any one of Aspects 42 to 51, wherein: the first sequence of undulations alternate in elevation between the first curved path and the second curved path along the length of the trough.

Aspect 53. The open waveguide antenna of any one of Aspects 42 to 52, wherein: the second sequence of undulations alternate in elevation between the second curved path and the first curved path along the length of the trough.

Aspect 54. The open waveguide antenna of any one of Aspects 42 to 53, wherein: as observed in a sideview of the trough, the first curved path is a first waveform with alternating peaks and valleys, the first waveform being a composite of a smooth waveform multiplied by a square wave.

Aspect 55. The open waveguide antenna of Aspect 54, wherein: as observed in a sideview of the conductive trough, the second curved path is a second waveform with alternating peaks and valleys, the second waveform being a composite of a smooth waveform multiplied by a square wave.

Aspect 56. The open waveguide antenna of Aspect 55, wherein: the second smooth waveform and the first smooth waveform have different elevations in both peaks and valleys at all points between and inboard of the ends of the trough.

Aspect 57. The open waveguide antenna of any one of Aspects 42 to 56, further comprising: a dielectric cover disposed over, covering, and extending at least a portion of the length of the trough, and extending across the trough from the first sidewall to the second sidewall, the dielectric cover comprised of a dielectric material having a dielectric constant greater than one.

Aspect 58. The open waveguide antenna of Aspect 57, wherein: an upper outer surface of the dielectric cover has a longitudinal indentation that extends along the length of the trough.

Aspect 59. The open waveguide antenna of Aspect 58, wherein: the longitudinal indentation is centrally disposed along the length of the trough.

Aspect 60. The open waveguide antenna of any one of Aspects 58 to 59, wherein: the longitudinal indentation has a concave cross section profile.

Aspect 61. The open waveguide antenna of Aspect 60, wherein: the concave cross section profile is representable by a polynomial curve.

Aspect 62. The open waveguide antenna of Aspect 57, wherein: an upper outer surface of the dielectric cover has a longitudinal protrusion that extends along the length of the trough.

Aspect 63. The open waveguide antenna of Aspect 62, wherein: the longitudinal protrusion is centrally disposed along the length of the trough.

Aspect 64. The open waveguide antenna of any one of Aspects 62 to 63, wherein: the longitudinal protrusion has a convex cross section profile.

Aspect 65. The open waveguide antenna of Aspect 64, wherein: the convex cross section profile is representable by a polynomial curve.

Aspect 66. The open waveguide antenna of Aspect 57, wherein: a lower inner surface of the dielectric cover has a longitudinal indentation that extends along the length of the trough.

Aspect 67. The open waveguide antenna of Aspect 66, wherein: the longitudinal indentation is centrally disposed along the length of the trough.

Aspect 68. The open waveguide antenna of any one of Aspects 66 to 67, wherein: the longitudinal indentation has a concave cross section profile.

Aspect 69. The open waveguide antenna of Aspect 68, wherein: the concave cross section profile is representable by a polynomial curve.

Aspect 70. The open waveguide antenna of Aspect 57, wherein: a lower inner surface of the dielectric cover has a longitudinal protrusion that extends along the length of the trough.

Aspect 71. The open waveguide antenna of Aspect 70, wherein: the longitudinal protrusion is centrally disposed along the length of the trough.

Aspect 72. The open waveguide antenna of any one of Aspects 70 to 71, wherein: the longitudinal protrusion has a convex cross section profile.

Aspect 73. The open waveguide antenna of Aspect 72, wherein: the convex cross section profile is representable by a polynomial curve.

Aspect 74. The open waveguide antenna of any one of Aspects 42 to 73 having a moldable construct, wherein: the moldable construct comprises one or more of: (i) positive fabrication features that do not allow flat surface features to stick during a barrel electroplating process; (ii) one or more screw locations incorporated in the construct; (iii) a shelled construct to reduce material consumption and warpage; (iv) integrally formed recesses to reduce sticking tendency during electroplating; (v) a molding draft angle equal to or greater than 2-degrees provided on the top side; (vi) a molding draft angle of equal to or greater than 4-degrees provided on the bottom side; and, (vii) a molding parting line located proximate the bottom face.

Aspect 75. The open waveguide antenna of any one of Aspects 42 to 73, wherein: the trough is a diecast construct.

Aspect 76. The open waveguide antenna of any one of Aspects 42 to 73, wherein: the trough is an injection molded plastic construct.

Aspect 77. The open waveguide antenna of Aspect 76, wherein: the injection molded plastic construct is metallized to provide electrically conductive surfaces thereon.

Aspect 78. An open waveguide antenna system comprising the open waveguide antenna of any one of Aspects 42 to 77, the open waveguide antenna system further comprising: a signal feed port disposed at one end of the trough; and an electrical short circuit disposed at a second opposing end of the trough.

Aspect 79. The open waveguide antenna system of Aspect 78, further comprising: an electrically conductive surface disposed proximate an upper end of the trough; wherein the electrical short circuit is electrically connected to the electrically conductive surface; and wherein the electrically conductive surface has an aperture configured and disposed to expose the upper end of the trough for electromagnetic coupling therewith.

Aspect 80. The open waveguide antenna system of any one of Aspects 78 to 79, wherein: a patch-to-trough guide transition is configured such that the patch E-polarization is parallel with the septum.

Aspect 81. The open waveguide antenna system of any one of Aspects 78 to 79, wherein: a patch-to-trough guide transition is configured such that the patch E-polarization is perpendicular to the septum.

Aspect 82. A multi-channel open waveguide antenna, comprising: a plurality of the open waveguide antenna of any one of Aspects 42 to 63 arranged in a side-by-side configuration with a center-to-center spacing of adjacent troughs being equal to or greater than $\lambda/2$, and equal to or less than 10 times $\lambda$, where $\lambda$ is a wavelength at an operational frequency of the multi-channel open waveguide antenna.

Aspect 83. The multi-channel open waveguide antenna of Aspect 82, wherein: the side-by-side configuration is a multi-monolithic construct.

Aspect 84. The multi-channel open waveguide antenna of any one of Aspects 82 to 83, wherein: the side-by-side configuration comprises a plurality of receiver channels and a plurality of transmitter channels.

Aspect 85. The multi-channel open waveguide antenna of Aspect 84, wherein: the plurality of receiver channels comprises at least 4 receiver channels.

Aspect 86. The multi-channel open waveguide antenna of Aspect 84, wherein: the plurality of transmitter channels comprises at least 3 transmitter channels.

Aspect 87. An open waveguide antenna system, comprising: a signal feed; an EM transition portion comprising a signal feed interface disposed at a first end of the EM transition portion and in EM communication with the signal feed, and an open waveguide section having a second end opposing the first end; and, an open waveguide antenna according to any one of Aspects 42 to 61, disposed in EM communication with the second end of the EM transition portion; wherein the EM transition portion is configured to couple EM energy from the signal feed to the signal feed interface to a guided waveguide mode of EM energy to the open waveguide section and to the open waveguide antenna.

Aspect 88. The open waveguide antenna system of Aspect 87, wherein: the signal feed comprises any one of: an antenna-in-package; a circuit board structure; a patch; a signal probe; a signal loop; and, a signal aperture.

Aspect 89. An open waveguide antenna system, comprising: an antenna on package; an open waveguide antenna according to any one of Aspects 42 to 61; an EM transition disposed in EM signal communication with and between the antenna on package and the open waveguide antenna.

Aspect 90. The open waveguide antenna system of Aspect 89, wherein: the EM transition comprises a ridge waveguide.

Aspect 91. The open waveguide antenna system of Aspect 89, wherein: the EM transition comprises a rectangular waveguide.

Aspect 92. The open waveguide antenna system of Aspect 89, wherein: the EM transition comprises a waveguide bend.

Some embodiments disclosed herein may have one or more of the following advantages: simultaneously achieving high gain, with minimal feed and transition losses; ability to tailor a given antenna pattern and high bandwidth; less sensitivity to small manufacturing variations than prior art DRA-with-dielectric-waveguide systems; and, a highly efficient antenna system formed by the strategic merging of an open waveguide section and a leaky waveguide antenna portion resulting in an antenna system applicable for modern multiple input multiple output (MIMO) automotive radar antennas.

As used herein, the phrase "equal to about" is intended to account for manufacturing tolerances and/or insubstantial deviations from a nominal value that do not detract from a purpose disclosed herein and falling within a scope of the appended claims.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element such as a layer, film, region, substrate, or other described feature is referred to as being "on" or in "engagement with" another element, it can be directly on or engaged with the other element, or intervening elements may also be present. In contrast, when an element is referred to as being "directly on" or "directly engaged with" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The use of the terms "top", "bottom", "up", "down", "left", "right", "front", "back", etc., or any reference to orientation, do not denote a limitation of structure, as the structure may be viewed from more than one orientation, but rather denote a relative structural relationship between one or more of the associated features as disclosed herein. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

The invention claimed is:

1. An open waveguide antenna, comprising:

a trough having first and second opposing sidewalls, a septum disposed therebetween, a first base disposed between the first sidewall and the septum, and a second base disposed between the septum and the second sidewall;

wherein one or more of surfaces internal to the trough of at least the first sidewall, the second sidewall, the septum, the first base, and the second base, are electrically conductive;

wherein the first base has a first sequence of undulations that are longitudinally disposed along a length of the trough;

wherein the first sequence of undulations alternatively and sequentially follow a first curved path and a second curved path, the second curved path being asymmetric to the first curved path;

wherein the second base has a second sequence of undulations that are longitudinally disposed along the length of the trough;

wherein the second sequence of undulations alternatively and sequentially follow the second curved path and the first curved path;

wherein the first curved path and the second curved path alternate from one side of the septum to the other side of the septum along the length of the trough.

2. The open waveguide antenna of claim 1, further comprising:

a dielectric cover disposed over, covering, and extending at least a portion of the length of the trough, and extending across the trough from the first sidewall to the second sidewall, the dielectric cover comprised of a dielectric material having a dielectric constant greater than one.

3. The open waveguide antenna of claim 1 having a moldable construct, wherein:

the moldable construct comprises one or more of: (i) positive fabrication features that do not allow flat surface features to stick during a barrel electroplating process; (ii) one or more screw locations incorporated in the construct; (iii) a shelled construct to reduce material consumption and warpage; (iv) integrally formed recesses to reduce sticking tendency during electroplating; (v) a molding draft angle equal to or greater than 2-degrees provided on the top side; (vi) a molding draft angle of equal to or greater than 4-degrees provided on the bottom side; and, (vii) a molding parting line located proximate the bottom face.

4. A multi-channel open waveguide antenna, comprising:

a plurality of the open waveguide antenna of claim 1 arranged in a side-by-side configuration with a center-to-center spacing of adjacent troughs being equal to or greater than λ/2, and equal to or less than 10 times λ, where λ is a wavelength at an operational frequency of the multi-channel open waveguide antenna.

5. An open waveguide antenna system, comprising:

a signal feed;

an EM transition portion comprising a signal feed interface disposed at a first end of the EM transition portion and in EM communication with the signal feed, and an open waveguide section having a second end opposing the first end; and, an open waveguide antenna according to claim 1, disposed in EM communication with the second end of the EM transition portion;

wherein the EM transition portion is configured to couple EM energy from the signal feed to the signal feed interface to a guided waveguide mode of EM energy to the open waveguide section and to the open waveguide antenna.

6. An open waveguide antenna system, comprising:

an antenna on package;

an open waveguide antenna according to claim 1;

an EM transition disposed in EM signal communication with and between the antenna on package and the open waveguide antenna.

7. The waveguide antenna system of claim 6, wherein:

the substantial discontinuities of the leaky waveguide antenna portion comprise discrete dielectric radiating elements that have varying dielectric constants along a direction of propagation of an EM wave within the leaky waveguide antenna portion, the dielectric radiating elements being disposed on a base of the leaky waveguide antenna portion.

8. The waveguide antenna system of claim 7, wherein: each discrete dielectric radiating element is separated from each other by air to provide individual radiating elements.

9. The waveguide antenna system of claim 7, wherein: each discrete dielectric radiating element is conjoined via an intervening dielectric medium to provide a single unitary construct.

10. The waveguide antenna system of claim 9, wherein: each discrete dielectric radiating element is composed of a plurality of dielectric materials having different dielectric constant, Dk, values that vary in the direction of propagation of the EM wave; and the intervening dielectric medium has a dielectric constant value, Dk4, that is different from a Dk value of any one of the plurality of dielectric materials of the discrete radiating element.

11. The waveguide antenna system of claim 10, wherein:

Dk4 is less than the Dk value of any one of the plurality of dielectric materials of the discrete radiating element.

12. The waveguide antenna system of claim 7, wherein:

each discrete dielectric radiating element is composed of a plurality of dielectric materials having different dielectric constant, Dk, values that vary in the direction of propagation of the EM wave.

13. The waveguide antenna system of claim 12, wherein:

the different Dk values vary according to the following sequential pattern of discrete dielectric constant values, Dk1-Dk2-Dk3-Dk2-Dk1, wherein Dk1, Dk2, and Dk3, are different dielectric constant values relative to each other.

14. The waveguide antenna system of claim 13, wherein:

Dk1 is less than Dk2, and Dk2 is less than Dk3.

* * * * *